US 6,567,367 B2

United States Patent
Ohno et al.

(10) Patent No.: US 6,567,367 B2
(45) Date of Patent: May 20, 2003

(54) MULTILEVEL RECORDING AND REPRODUCTION METHOD AND PHASE CHANGE MULTILEVEL RECORDING MEDIUM

(75) Inventors: Takashi Ohno, Kanagawa (JP); Michikazu Horie, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/842,035

(22) Filed: Apr. 26, 2001

(65) Prior Publication Data

US 2001/0036143 A1 Nov. 1, 2001

Related U.S. Application Data

(63) Continuation of application No. PCT/JP99/05881, filed on Oct. 25, 1999.

(30) Foreign Application Priority Data

Oct. 26, 1998 (JP) .......................... 10-304290
Jul. 9, 1999 (JP) .......................... 11-196386

(51) Int. Cl.[7] .............................. G11B 7/00
(52) U.S. Cl. .................. 369/116; 369/47.51; 369/275.3
(58) Field of Search ................ 369/275.1, 116, 369/275.2, 275.3, 275.4, 47.51

(56) References Cited

U.S. PATENT DOCUMENTS

| | | | |
|---|---|---|---|
| 5,136,573 A | | 8/1992 | Kobayashi |
| 5,144,615 A | * | 9/1992 | Kobayashi ............... 369/275.3 |
| 5,572,502 A | | 11/1996 | Naruse et al. |
| 5,646,930 A | * | 7/1997 | Furumiya ............... 369/275.3 |
| 5,965,323 A | * | 10/1999 | Takahashi et al. ....... 369/275.2 |
| 5,995,472 A | * | 11/1999 | Fujii et al. ............... 369/275.3 |
| 6,004,646 A | | 12/1999 | Ohno et al. |
| 6,115,352 A | | 9/2000 | Ohno et al. |
| 6,143,468 A | | 11/2000 | Ohno et al. |
| 6,177,166 B1 | | 1/2001 | Ohno et al. |
| 6,294,310 B1 | | 9/2001 | Ohno et al. |
| 2001/0049074 A1 | | 12/2001 | Ohno et al. |

FOREIGN PATENT DOCUMENTS

| | | | |
|---|---|---|---|
| JP | 1-524441 | 9/1989 | |
| JP | 4-103033 | 4/1992 | |
| JP | 5-205274 | 8/1993 | |
| JP | 8-147698 | 6/1996 | |
| JP | 8-329540 | * 12/1996 | .............. 369/275.3 |
| JP | 9-7224 | 1/1997 | |
| JP | 10-112028 | 4/1998 | |
| JP | 10-124925 | 5/1998 | |
| JP | 11-25456 | 1/1999 | |

OTHER PUBLICATIONS

L. P. Shi, et al., Jpn. J. Appl. Phys., vol. 38, Part 1, No. 3B, pps. 1645–1648, "Study of The Partial Crystallization Properties of Phase–Change Optical Recording Disks", Mar. 1999.

* cited by examiner

*Primary Examiner*—Nabil Hindi
(74) *Attorney, Agent, or Firm*—Oblon, Spivak, McClelland, Maier & Neustadt, P.C.

(57) ABSTRACT

A multilevel recording method based on a principle utilizing a phase change medium. The method radiates a recording energy beam against an information recording medium having a recording layer to locally melt the recording layer. The recording layer is adapted to produce a phase change between a crystalline state and an amorphous state upon being radiated with an energy beam. An amorphous mark is formed by cooling during a solidifying process to record information in the medium. The size of the amorphous mark is controlled mainly by a competition between a recrystallization process and an amorphization process during the solidifying process. An intensity of reflected light from a reproducing light beam radiated region is controlled in three or more multiple recording levels according to an optical characteristic difference between a crystalline region and an amorphous region and their areas.

36 Claims, 52 Drawing Sheets

MULTILEVEL RECORDING AND REPRODUCTION METHOD AND PHASE CHANGE MULTILEVEL RECORDING MEDIUM

Application is a Continuation of Int'l PCT application No: PCT/JP99/05881 filed on Oct. 25, 1999 Which was not published in English

FIELD OF THE INVENTION

The present invention relates to a multilevel recording and reproduction method and a phase change multilevel recording medium.

BACKGROUND ART

As the volume of information increases in recent years, there are growing demands for recording media capable of reading (reproducing) and writing a large amount of data with high density and at high speed. Optical recording media, particularly optical discs, are expected to meet such demands. The optical discs are available in two different types: a write-once type that allows the user to record data only once, and a rewritable type that allows the user to record and erase data as many times as they wish. Examples of the rewritable optical disc include a magnetooptical medium that utilizes a magneto-optical effect and a phase-change medium that utilizes a change in reflected light intensity accompanying a reversible crystalline state change.

The phase change medium can be written and erased by simply modulating the power of a laser beam without requiring an external magnetic field and thus has the advantage of being able to reduce the size of a recording and reproducing apparatus. It is also possible to enhance the recording density by using a light source with a shorter wavelength without specially changing the material of a recording layer of media which are currently recorded and erased with a light source with a commonly used wavelength of about 800 nm.

In the currently available rewritable phase change recording media, the crystalline state is taken as an unrecorded/erased state, and amorphous mark is formed. The amorphous mark is formed typically by heating the recording layer to a temperature higher than the melting point and quickly cooling it. Erasure (crystallization) is done by heating the recording layer to a temperature higher than the crystallization temperature of the recording layer, but lower than a temperature just above the melting point or the melting point itself. In a so-called one-beam overwritable phase change medium, the erasure and re-recording processes can be performed only by modulating the intensity of one focused light beam. In the 1-beam overwritable phase change medium, the layer configuration of the recording medium and the circuit configuration of the drive become simple Hence, this medium draws attention as a possible medium for use in an inexpensive, high-density, large-capacity recording system.

As described above, the phase change medium can increase the recording density by shortening the wavelength of a focused light beam to reduce its diameter and therefore the size of recorded marks. At present, laser diodes with a wavelength of 780 nm and an output of about 50 mW are widely available at low prices and applied to a phase change recording technology for rewritable compact discs, for example. Laser diodes with 630–660 nm are also available recently and a rewritable DVD is nearing the practical use along with the development of a high-output red laser diodes with an output of about 30 mW. With the demands for a higher density continuing, attempts to realize the recording density about two to three times that of the DVD by using a blue laser (about 400 nm) diode are actively under way though at a very preliminary stage of development.

There is naturally a limit to the recording density, however, if an increase in density of the phase change medium depends simply on the shortening of the wavelength of the light source. There are many problems to be solved as to the longevities of the laser diodes with short wavelengths and high outputs, and it will take time before such high-output laser diodes, though experimentally successful, can be put to practical use. Further, as the spot becomes smaller in size, problems arise, for example, an increased influence of tilt of the surface of a focused point and a reduced focus offset margin due to a shallower focal depth. Another question whether the amorphous marks, when they become smaller than 0.01 $\mu$m, can remain stable, has not been solved yet.

An effort to increase the recording density of a magnetooptical recording medium dependent solely on the miniaturization of the read/write beams will naturally encounter a limitation due to the optical resolution capability (limit). In a phase change medium in particular, a so-called magnetic super-resolution phenomenon cannot be expected. Although there are some proposals on a super-resolution phenomenon utilizing a change in refractive index due to temperature changes, this method has an intrinsic problem that the recorded marks will deteriorate over repeated reading operations.

Spotlighted as one of the methods that transcend the limitation of the optical resolution capability (limit) and allow for an increased density beyond the optical resolution limit is a multilevel recording. This is a technology for a read-only compact disc which, rather than modulating the mark length, controls the depths of pits in a substrate in multiple levels to express the modulation in multiple values ("15GB and No Blue Laser", Data Storage, April 1994 issue, cover story and pp27–32).

Such a multilevel recording that expresses the modulation in multiple values is realized in principle by controlling a continuous change in the reflected light intensity (modulation) in a finite number of discrete levels. It is a natural course of events to apply to the multilevel recording the phase change medium that performs information read and write operations by using a chance in the reflected light intensity.

However, no recording medium is currently available that takes advantage of the phase change recording to realize the capability of actually performing such a recording in multilevel levels, or preferably overwriting repetitively. This is because both the phase change medium and the recording method that record data at a plurality of modulation levels with good reproducibility are still in the development stage. Typically, the recording levels are two states-crystal and amorphous states-or three states at most (JP-A 61-3324, 62-259229 and 10-124925).

There is also an effort to control an average optical characteristic in multiple levels by changing a mixture ratio of different crystalline states or of crystalline and amorphous states.

However, an optical characteristic difference among different crystalline states is too small to identify and it is difficult to control the mixture ratio of crystalline and amorphous states in multiple levels with good reproducibility. Obtaining the four or more levels with good reproducibility is not easy. Such a mixed state is unstable and the amorphous portion easily transforms into crystal, gibing rise to a problem of poor stability of recorded information over time.

DISCLOSURE OF THE INVENTION

The problems described above can be solved by causing a recrystallization to occur in the recording layer during the solidifying of she recording layer melted by the recording beam and by using the recrystallization in controlling the size of the amorphous mark in multiple levels.

In summary, this invention includes the following inventions.

(1) A multilevel recording/reproducing method comprising the steps of: radiating a recording energy beam against an information recording medium having a recording layer to locally melt the recording layer, the recording layer being adapted to produce a phase change between a crystalline state and an amorphous state upon being radiated with an energy beam; and forming an amorphous mark by cooling during a solidifying process to record information in the medium; wherein the size of the amorphous mark is controlled mainly by a competition between a recrystallization process and an amorphization process during the solidifying process; wherein an intensity of reflected light from a reproducing light beam radiated region is controlled in three or more multiple recording levels according to an optical characteristic difference between a crystalline region and a amorphous region and their areas.

(2) A method according to item (1), wherein a recording energy beam is radiated onto a region formed with the amorphous mark to melt the recording layer and thereby erase the amorphous mark and, during the solidifying process, an amorphous region and a recrystallized region are newly formed to overwrite the amorphous mark.

(3) A method according to item (1) or (2), wherein the recording energy beam and the reproducing energy beam have spot diameters on a recording layer surface of 2 $\mu$m or less.

(4) A method according to item (3), wherein the recording and reproducing light beams have elliptical spots on the recording layer surface with their major axes oriented in a direction substantially perpendicular to the direction of beam scan.

(5) A method according to any one of items (1) to (4), wherein when the recording energy beam is scanned relative to the recording medium to form melted regions to form amorphous marks along the scanning direction, the size of the amorphous mark is controlled by changing a width, with respect to the scanning direction, of the amorphous mark and the width of the amorphous mark is made smaller than the width, with respect to the scanning direction, of the reproducing energy beam at any of the multiple recording levels.

(6) A method according to any one of items (1) to (5), wherein when the recording energy beam is scanned relative to the recording medium to form melted regions to form amorphous marks along the scanning direction, the size of the amorphous mark is controlled by changing a length, with respect to the scanning direction, of the amorphous mark and the length of the amorphous mark is made smaller than the length, with respect to the scanning direction, of the reproducing energy beam at any of the multiple recording levels.

(7) A method according to any one of items (1) to (6), wherein when a transition is made from one recording level section to another, the transition passes, without fail, through a recording level section that corresponds to a crystalline state.

(8) A method according to item (7), wherein the amorphous marks are isolated, surrounded by a crystalline region and intervals between reflected light intensity peaks corresponding to the isolated amorphous marks are made constant at a reference length T.

(9) A method according to item (8), wherein the interval between isolated reflected light intensity peaks is an integer times the reference length T, and a multilevel recording is performed by using two variables consisting of a peak-to-peak interval LT (L is n kinds of integers) and an m-step recording level.

(10) A method according to item (7), wherein the recording label section has a trapezoidal waveform with n kinds of lengths, and at least one of the length of the trapezoidal section and an interval between the trapezoidal sections is modulated.

(11) A method according to any one of items (1) to (6) wherein when a transition is made from one recording level section to another, the transition is made continuously without passing through the reference recording level.

(12) A method according to any one of items (1) to (11), wherein a part or all of a recording energy beam radiation time in one recording level section is divided into one or more recording pulse sections and one or more interrupt sections, the power of the recording energy beam in the recording level section is set to a power Pw strong enough to melt the recording layer during the recording pulse section and to a power Pb, including 0, smaller than Pw during the interrupt section, and the size of the amorphous mark is controlled by changing a radiation pattern of the recording energy beam in the radiation time.

(13) A method according to item (12), wherein the power Pb of the recording energy beam radiated during the interrupt section meets a condition of 0<Pb<0.2 Pw.

(14) A method according to item (12) or (13), wherein the radiation pattern of the recording energy beam in the radiation time is changed by changing the magnitudes of Pb and Pw.

(15) A method according to any one of items (1) to (14), wherein the radiation pattern of the recording energy beam in the radiation time Is changed by changing the lengths of the recording pulse section and/or the interrupt section.

(16) A method according to any one of items (1) to (16), wherein a diameter $r_b$ of the reproducing light beam is set equal to a spatial length Ts of the recording section or more.

(17) A method according to item (16), wherein a part or all of a recording energy beam radiation time for forming one recording level section is divided into one recording pulse section and one interrupt section accompanying the recording pulse section before or after it, the power of the recording energy beam in the recording level section is set to a power Pw strong enough to melt the recording layer during the recording pulse section and to a power Pb, including 0, smaller than Pw during the interrupt section, and the size of the amorphous mark is controlled by changing Pw, Pb, the recording pulse section length and/or the interrupt section length.

(18) A method according to item (17), wherein a length of the recording level section is constant at a reference length T and the size of the amorphous mark is controlled by changing a duty ratio of the recording pulse section to the recording level section.

(19) A method according to any one of items (1) to (18), wherein the number of recording levels is four or more.

(20) A method according to any one of items (1) to (19), wherein a reflected light intensity range including a strongest reflected light intensity Rc and a weakest reflected light intensity Ra is divided into m sub-ranges (m>1), the m sub-ranges are set so that a sub-range having a maximum reflected light intensity includes the strongest reflected light intensity Rc and a sub-range having a minimum reflected light intensity includes the weakest reflected light intensity Ra, and which level a reflected light intensity obtained corresponds to is determined by checking which of the m sub-ranges the reflected light intensity belongs to.

(21) A method according to item (20), wherein the m sub-ranges have equal magnitudes to each other in the reflected light intensity.

(22) A method according to item (20), wherein the magnitude of each of them sub-ranges increases as the sub-range comes closer to Rc.

(23) A multilevel recording medium having a recording layer, wherein the recording layer changes its phase between a crystalline state and an amorphous state upon being radiated with an energy beam, and a recrystallization from a melted state in the recording layer proceeds substantially by a crystalline growth from a crystalline region.

(24) A medium according to item (23), wherein the recording layer has an alloy composition containing Sb.

(25) A medium according to item (24), having an SbTe alloy composition containing Sb in excess of an eutectic point.

(26) A medium according to item (24), wherein the recording layer includes the following composition

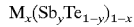
$$M_x(Sb_yTe_{1-y})_{1-x}$$

where $0<x\leq 0.2$, $0.6\leq y$, and M is at least one element selected from the group consisting of In, Ga, Zn, Ge, Sn, Si, Cu, Au, Ag, Pd, Pt, Pb, Bi, Cr, Co, O, S, N, Se, Ta, Nb, V, Zr, Hf and rare earth metals.

(27) A medium according to item (26), wherein the recording layer includes the following composition

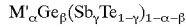
$$M'_\alpha Ge_\beta (Sb_\gamma Te_{1-\gamma})_{1-\alpha-\beta}$$

where M' is In and/or Ga, $0.001\leq\alpha\leq 0.1$, $0.001\leq\beta\leq 0.15$, and $0.65\leq\gamma\leq 0.85$.

(28) A medium according to any one of item (23) to (27), wherein protective layers are provided over and under the recording layer, and a reflection layer is provided over that surface of one of the protective layers which is on the opposite side of the recording layer.

(29) A medium according to item (28), wherein the recording layer has a thickness of 1 nm to 30 nm, the dielectric protective layer provided between the recording layer and the reflection layer has a thickness of 60 nm or less, and the reflection layer is an alloy comprising Al, Ag or Au mainly.

(30) A medium according to item (28) or (29), wherein the reflection layer has a sheet resistivity of 0.1 to 0.6 Ω/□.

(31) A medium according to any one of items (23) to (30), used in the method of item (18), wherein the reflected light intensity exhibits a substantially linear change responsive to a change in the duty ratio used.

(32) A medium according to anyone of items (23) to (31), used in the method of item (18), wherein when the duty ratio is 95% or more, the amorphous mark is not formed.

(33) A medium according to item (31) or (32), wherein when the duty ratio at which the minimum reflected light intensity Ra is obtained is Da (%) and the duty ration at which the maximum reflected light intensity Rc is obtained is Dc (%), then Dc−Da>50%

BEST MODE FOR IMPLEMENTING THE INVENTION

Figure 1:
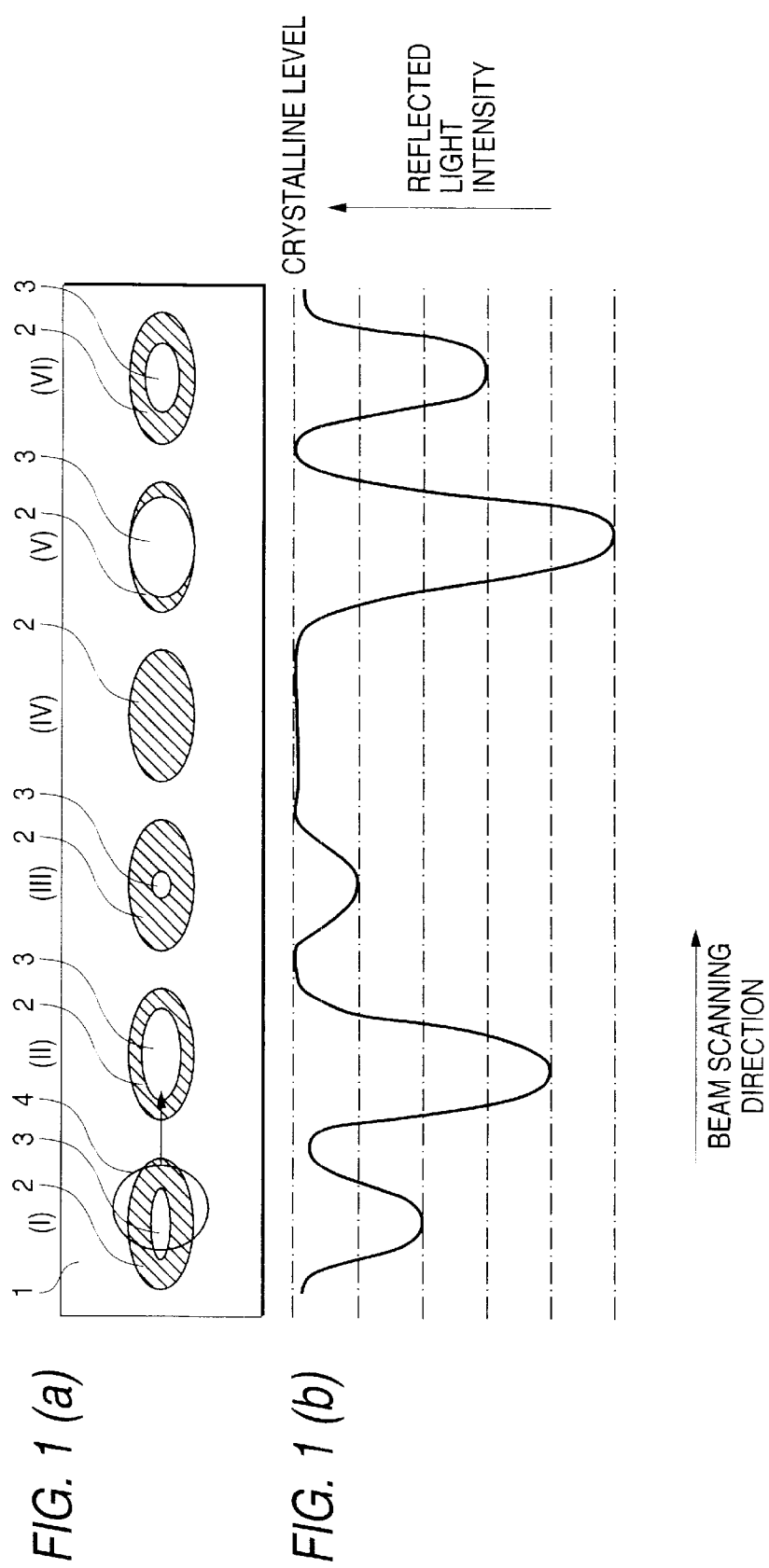
FIG. 1 schematically illustrates an example of recrystallization during the process of forming an amorphous mark and a resulting intensity of reflected light.

First, the multilevel recording and reproducing method according to the present invention will be described.

The recording and reproducing according to this invention is accomplished as by radiating an energy beam while rotating a normally disc-shaped information recording medium to scan the energy beam relative to the medium. The multilevel recording according to this invention involves radiating a recording energy beam against an information recording medium, which has a recording layer that changes its phase between a crystalline state and an amorphous state upon being irradiated with the energy beam, to locally melt the recording layer and then cooling the recording layer during a solidifying process to form an amorphous mark. During this process, an unrecorded state or erased state corresponds to the crystalline state. This invention adopts a fundamental principle in which the recrystallization phenomenon initiated by crystalline growth in a crystalline region during the process of forming an amorphous mark by the above-described cooling is actively used to control the area of the amorphous mark when it finally completes solidification. In this respect, the multilevel recording/reproducing method of this invention is totally different from the conventional multilevel recording methods described in the known reference documents cited above.

The process of forming the amorphous mark according to this invention will be described in detail. Here, the crystalline state is taken as an unrecorded state. First, a recording energy beam is radiated to locally melt the recording layer. Then, virtually removing a heat source as by sufficiently lowering the intensity of the energy beam can cool the melted region as a result of heat conduction to peripheral portions within the recording layer, heat conduction to other layers such as protective layer and reflection layer in contact with the recording layer and heat conduction to other than the recording layer such as substrate. Because the recording is performed normally by moving the recording energy beam relative to the medium, the cooling of a melted region is initiated as the energy beam moves away from the melted region.

One of general conditions for forming an amorphous state is that when the cooling speed of the temperature of the melted region per unit time exceeds a predetermined value (critical cooling speed), the melted region re-solidifies while keeping a random array of atoms as it was in a liquid state. This critical cooling speed in the phase change recording medium used in this invention is estimated at 1 to 100 Kelvin/nanosecond. If the cooling speed of the entire melted region is lower than the critical cooling speed, the rapid cooling can recrystallize the entire region.

This invention causes the recrystallization during the solidifying of the melted region and actively utilized it. That is, this invention makes active use of the recrystallization capability of the recording layer during the melting/solidifying process and thereby eliminates the need for separately recrystallizing a part of the amorphous mark, which has already been solidified and formed, in controlling the size of the mark. It does not control the area of an amorphous mark by controlling the area of the melted region only. This invention, however, may be accompanied by an operation of partially crystallizing the already formed amorphous mark by using a separate energy beam, or by the operation of controlling the area of the melted region.

In this invention, the crystalline state is taken as an unrecorded state and thus the peripheral portion of the melted region is normally in a crystalline state, so that recrystallization during the re-solidification normally proceeds from the peripheral crystalline region. In this invention, a balance of competition between the crystalline growth speed in the peripheral crystalline region and the cooling speed of the melted region determines the size of a recrystallized region in the peripheral portion. In this invention, the phenomenon in which the melted region recrystallizes during its re-solidification process is called a "self-recrystallization."

Figure 2:
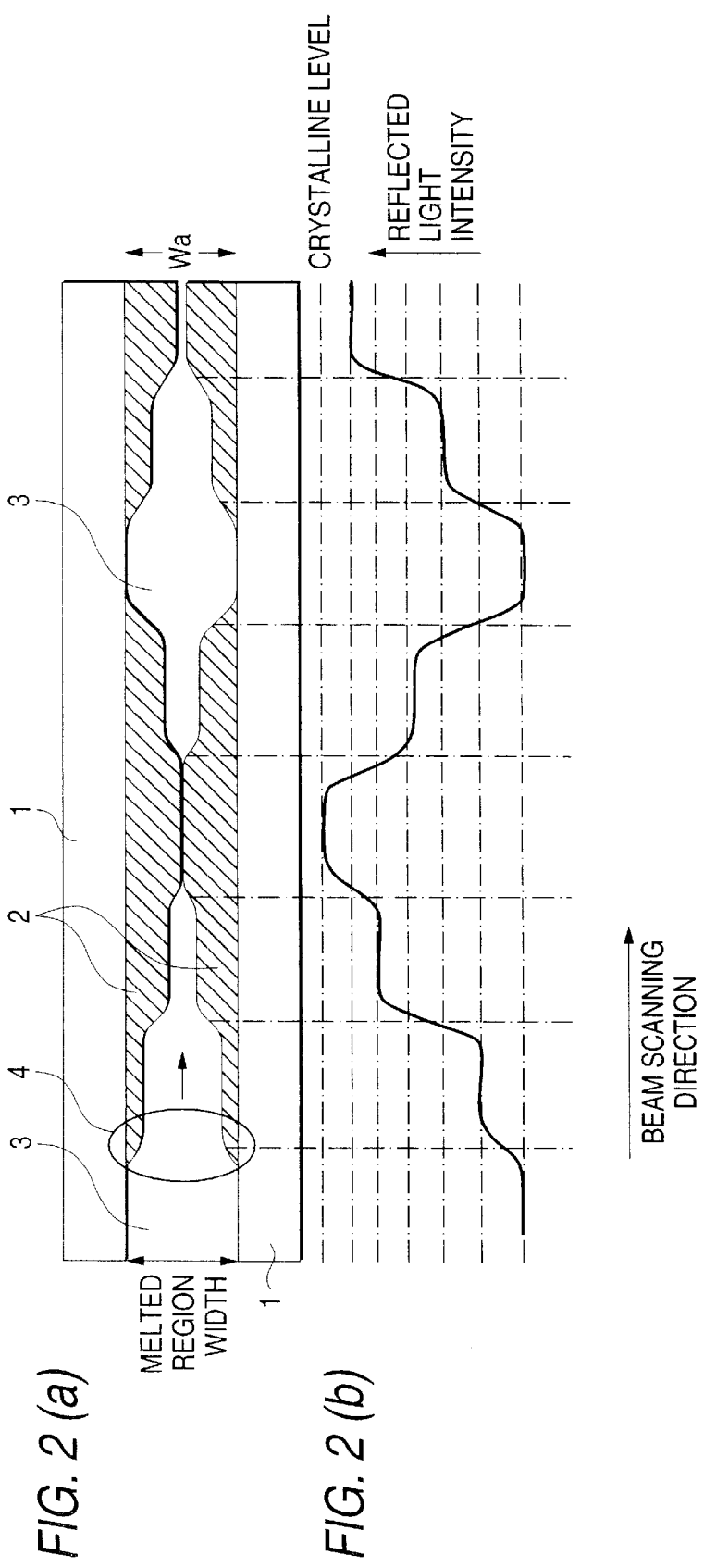
FIG. 2 schematically illustrates another example of recrystallization during the process of forming an amorphous mark and a resulting intensity of reflected light.

FIG. 1 schematically shows how the recrystallization occurs during the process of forming an isolated amorphous mark, and an intensity of reflected light. FIG. 2 schematically shows how the recrystallization is initiated during the process of forming a continuous amorphous mark with only the width of the recrystallized region changed, and an intensity of reflected light. In FIG. 1 and FIG. 2, a region 1 of unrecorded crystalline state (initial crystallized region) and a region 2 of crystalline state formed by the self-recrystallization (recrystallized region) are shown in different patterns or shades for convenience. Strictly speaking, the above two crystalline states may often not be the same in terms of crystalline growth size and orientation. In this invention these two crystalline states are preferably undistinguishable optically because even a slight difference in the reflected light intensity due to the crystalline state difference can cause noise in the reproduced signal. Hence, the reflected light intensities of the two crystalline states should be matched within a range of ±30%, more preferably ±10%.

As described earlier, the sizes of the recrystallized region 2 and the amorphous mark 3 are determined by the balance between the crystalline growth speed in a region melted by the radiation of an energy beam and the cooling speed of the melted region. Hence, in this invention, by controlling this balance, amorphous marks with different widths and lengths are formed as shown at (I) to (VI) of FIG. 1(a) and continuous amorphous marks with a changing width with respect to the beam scanning direction are formed as shown in FIG. 2(a).

The methods of controlling the size of amorphous mark when the recording energy beam is scanned over the medium, as shown in FIG. 1(a) and FIG. 2(a), include one that changes the width of the amorphous mark with respect to the direction of scanning (FIG. 1(a) and FIG. 2(a)) and one that changes the length of amorphous mark with respect to the scanning direction (FIG. 1(a)). In the case of the former, the width of the amorphous mark should preferably be set smaller than the width of the reproducing light beam on the recording layer surface with respect to the scanning direction at any of the multilevel recording levels. In the case of the latter, the length of the amorphous mark should preferably be set smaller than the length of the reproducing light beam on the recording layer surface with respect to the scanning direction at any of the multilevel recording levels. As a result, correct multilevel reproduction can be made. In the former case, however, too small an amorphous mark increases crosstalk and therefore the amorphous mare width is normally set equal to or more than one-half the width of the reproducing light beam on the recording layer surface with respect to the scanning direction.

In either case, the intensity of light reflected from the radiation region of the reproducing light beam (the region inside the outline 4 of the reproducing light beam in FIGS. 1 and 2) in this invention takes a variety of values according to the optical characteristic difference between, and the areas of, the amorphous region inside the beam radiation region of, the amorphous mark 3 and the crystalline region 2 inside the beam radiation region comprising the initial crystallized region and the recrystallized region.

The number of amorphous marks within the radiation region (spot) of the reproducing light beam on the recording layer surface need only be a finite number, i.e., one or more. When there are two or more amorphous marks in the spot, they as a whole may be taken as one recording level section and a single reflected light intensity level be generated from one radiation region. Alternatively, individual amorphous marks may each be taken to represent a recording level section and the reflected light intensity level be generated from each of the sections. The latter corresponds to a case where the spatial length of one recording level section is smaller than the size of the spot. This is preferable in terms of realizing an increased density.

The size of the amorphous mark is normally set to 0.01 nm or more. Too small an amorphous mark may result in a loss of stability. On the other hand, the size of the amorphous mark should normally be 10 $\mu$m or less. When the mark is too large, a higher density becomes difficult to achieve.

If the melted region or amorphous mark in a recording level section becomes discontinuous to an extent that the mark can be optically distinguished as two discrete marks by the reproducing light beam, a satisfactory reproduction may be lost. However, it is possible to make active use of the discontinuity, only detectable below the limit of optical resolution capability, in adjusting the average reflected light intensity. The size of the amorphous mark in the recording level section need not be constant but may vary as long as the variations are below the optical resolution capability (limit). The only requirement is that the amorphous mark forms a uniform reflected light intensity in an optically distinguishable range. This is because if the mark is discontinuous or uneven to a degree sufficiently smaller than the optical resolution capability (limit) of the reproducing light beam, the intensity of the reproduced light is made uniform within the reproduced light beam. The amorphous mark is determined to be discontinuous or uneven in size when it is smaller than the diameter $r_b$ of the reproducing light beam. In more concrete terms, if we let $\lambda$ be the wavelength of the reproducing light beam and NA be a numerical aperture of the focusing object lens, the size needs to be smaller than about 0.5 $\lambda$/NA, particularly 0.1 $\lambda$/NA, for the amorphous mark to be determined as discontinuous or uneven.

For recording, a focused energy beam is normally used, i.e., a itch beam or electron beam is used. A light beam is preferably used. The size of the beam is typically 2 $\mu$m or less, more preferably 1 $\lambda$m or less on the recording layer surface. Too large a beam diameter will make an improvement in density difficult. Reading is done most easily and preferably by a method based on the detection of a reflected light intensity difference. The reproducing beam spot is preferably about the size of or slightly larger than the amorphous mark size, preferably the mark width. Because the reflected light is influenced by both of the amorphous mark itself and the peripheral crystalline region due to the optical resolution capability (limit), the reflected light intensity approaches that obtained when the entire surface is in the amorphous state as the ratio of the amorphous mark within the reproduced light beam spot increases.

Figure 3:
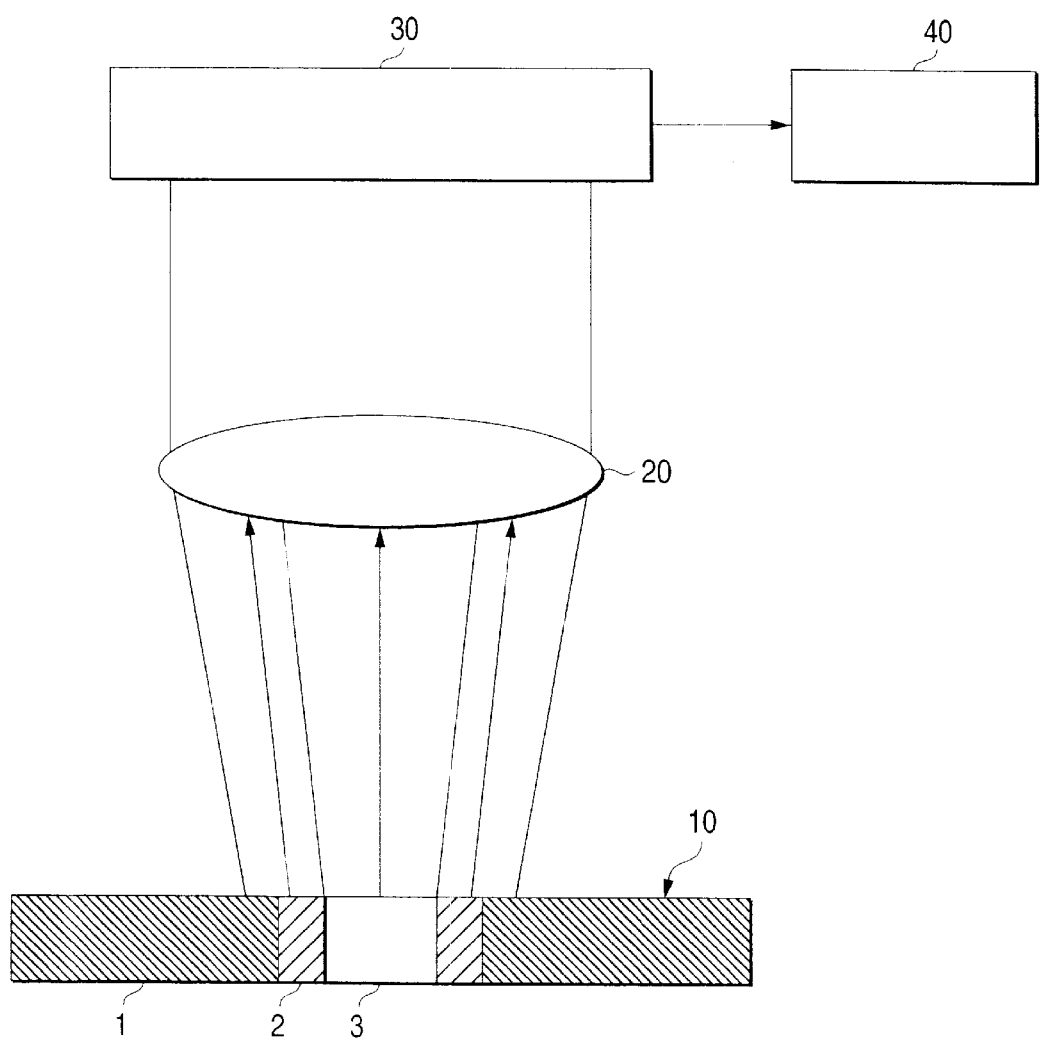
FIG. 3 is a schematic cross section showing a positional relation between a medium and an optical system for reproduction.

That is, in a schematic cross section of FIG. 3 illustrating the positional relation between a medium and a reading optical system, the reflected light intensity of the reading light beam as detected by a light detector 30 is determined by the area ratio between the crystalline region (sum of region 1 and region 2) within the focused light beam soot and the amorphous region (amorphous mark 3) in the spot. Basically, the reflected light intensity is obtained by integrating the reflected light rays from each point in the beam spot were focused by the objective. The reference due to phase difference between the reflected light from the crystalline state and the reflected light from the amorphous state is considered in determining the sum of the reflected light returning to the objective 20. Based on this sum, a reproduced signal 40 is obtained. What matters in the multilevel recording in this invention is to precisely control the area ratio between the crystalline region and the amorphous region within the reading beam spot so as to obtain a desired reflected light intensity. Here, when the reading light bean is a Gaussian beam such as laser beam, its diameter $r_0$ is defined as a position where the intensity decreases $1/e^2$ from the intensity at the beam center.

It is preferred in simplifying the apparatus that the recording energy beam and the reproducing energy beam be both light beams, particularly those with a spot diameter on the recording layer surface of 2 μm or less. These energy beans allow the application of the phase change recording technology using the modulation between the conventional crystalline/amorphous 2-value levels.

The light source used for a light beam normally is a laser beam, particularly a semiconductor laser beam. In this case, a Gaussian beam focused by an objective with a NA (numerical aperture) of 0.4 or larger is preferably used. The light beams for the reading and writing have the same wavelengths, and the semiconductor laser usually uses a wavelength of about 600 to 800 nm. For higher density it is advantageous to use a shorter wavelength and a higher Ng, and a blue laser with a wavelength of around 400 nm and a near-field optical system with a NA of 1.0 or more may be used. When a laser beam is used, a high frequency may be superimposed to control noise.

The shape of the spot of the Gaussian focused light beam is normally elliptical. In this invention, when an elliptical beam is used for writing and/or reading, the major axis of the ellipse is preferably set substantially perpendicular to the beam scanning direction. This can reduce the mark length and thus realize an increased density and also increase the control range of the width of the amorphous mark.

The elliptical light beam described above increases the optical resolution capability (limit) in the beam scanning direction, which in turn facilitates the separation between individual recording levels and shortens the length of each recording level section.

In the explanation that follows, it is assumed that the same focused light beam is used for both writing and reading operations unless otherwise specifically noted.

When the recording layer is combined with a protective layer to form the recording medium in a multilayer structure, the reflected light intensity from the amorphous state through the multilayer structure is lower than that of the crystalline state although the apparent reflected light intensity from the amorphous state and the crystalline state can be changed arbitrarily to some extent. The reflected light intensity therefore changes as shown in FIGS. 1(b) and 2(b) depending on whether the length or width of the amorphous mark shown in FIGS. 1(a) and 2(a) is large or small. By controlling the reflected light intensity at a more-than-two finite number of intensity levels, the multilevel recording having three or more recording levels can be performed. A preferred number of recording levels is four or more. Adopting too large a number of levels is unrealistic and its normal range is 100 or less, more preferably 50 or less. A signal amplitude (an amplitude of change in reflected light intensity) normalized by taking the reflected light intensity of the crystalline state as a reference is defined as a modulation. Here, suppose the strongest reflected light intensity is Rc and the weakest one is Ra. It is preferred that the Rc value representing the erased state use a reflected light intensity level $Rc_0$ obtained when the whole region within the beam spot during reading is in a crystalline state (hereinafter this level may be referred to as a crystalline level) because this is the most stable intensity as a reference for the reflected light. In this case, the modulation is preferably set at 0.5 or higher to make the reflected light intensity levels more clearly distinguishable.

In this invention, the actually reproduced signal waveform is not necessarily a perfect rectangular wave as shown in FIGS. 1(a) and 2(b). For example, in a conceptual diagram of FIG. 1 illustrating an actual signal waveform 111 and a conceptual rectangular waveform 112 for comparison, the actually reproduced signal waveform is normally dull as indicated by the signal waveform 111 because of the optical resolution limit of the reproducing light beam. In the following, we will explain about a multilevel level detection principle based on rectangular waveforms which does not consider the dullness of the waveforms.

In this invention, there are the following two possible recording methods according to how the recording level section is defined.

The first method is to always have a reference recording level section arranged between recording level sections that represent the corresponding reflected light intensity levels so that the reflected light intensity corresponding to each amorphous mark has a multilevel level. The reference recording level section normally uses the crystalline level as its reflected light intensity level.

Figure 4:
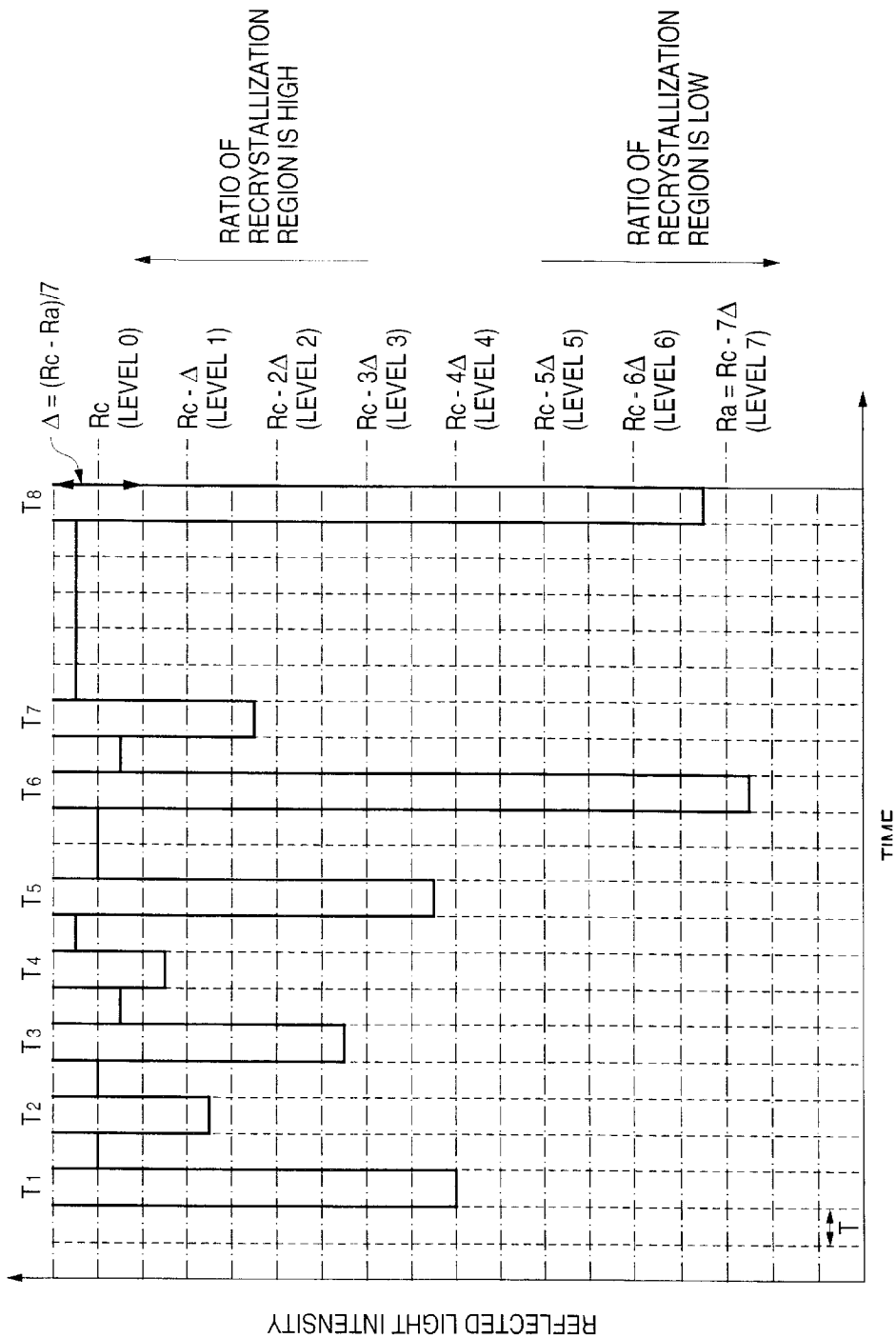
FIG. 4 schematically illustrates an example array of reflected light intensity levels for each record level section.
Figure 5:
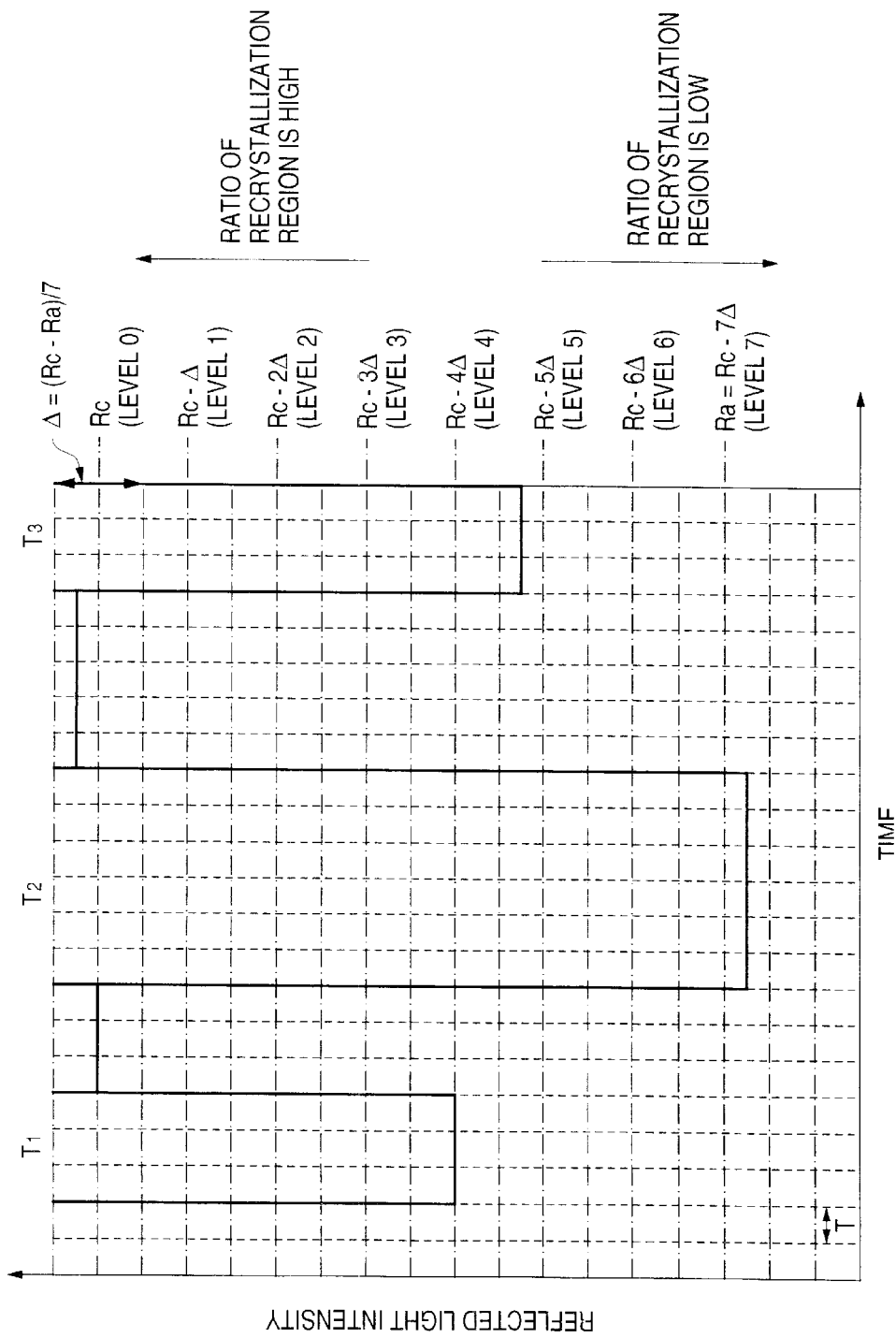
FIG. 5 schematically illustrates another example array of reflected light intensity levels for each record level section.

FIGS. 4 and 5 are schematic diagrams showing an example array of reflected light intensity levels for respective recording level sections according to the first method. In either diagram, there are eight reflected light intensity levels, level 0, level 1, . . . , level 7 in the order of decreasing magnitude Level 0 represents a crystalline level. Between the adjacent recording level sections $T_1$–$T_3$ there always is a crystalline level as the reference recording level section. That is, in a transition space from one recording level section to another, a recording level section corresponding to the crystalline state is provided without fail. In this case, the amorphous marks are isolated, enclosed by the region of crystalline state.

In the case of FIG. 4, the length of each recording level section is set constant at a reference length T to provide the advantage of being able to facilitate the detection.

The use of the method shown in FIG. 4 can alleviate the influences of the dull waveform caused by the optical resolution capability (limit) and, by returning once to the reference level before going to the next multilevel level, reduces the problem of an accurate recrystallization process being disturbed by the heat conduction of the preceding and subsequent amorphous marks formed. But the recording density is difficult to improve To enhance the recording density, the multilevel recording may be performed by changing the interval between isolated peaks of waveform in a range an integer times the reference length T and by using two variables: a peak-to-peak interval LT (L is one of n integers) and a recording level that can be changed in m steps.

This method can be extended into a more general method which changes the isolated peak waveform into a trapezoidal waveform having a length LT and modulates the length of the mark and/or space to represent the modulation of he amorphous mark in a multilevel level during the general mark length recording, as shown in FIG. 5. That is, in this method, a reference recording level is always disposed between the recording level sections; the recording level sections are represented by trapezoidal waveforms having n different lengths; and at least one of the length of the trapezoidal section and the length of the reference recording level section disposed between the trapezoidal sections is modulated. In FIG. 5, the recording level sections $T_1$–$T_3$ have lengths integers Limes the reference section T (3T, 5T and 3T in that order), and the lengths of these rectangular recording sections and the lengths of the crystalline level sections present between the recording sections are modulated.

The above first method always passes through the reference recording level when it moves from one recording level to another. As a result accurate marks can be formed.

Figure 6:
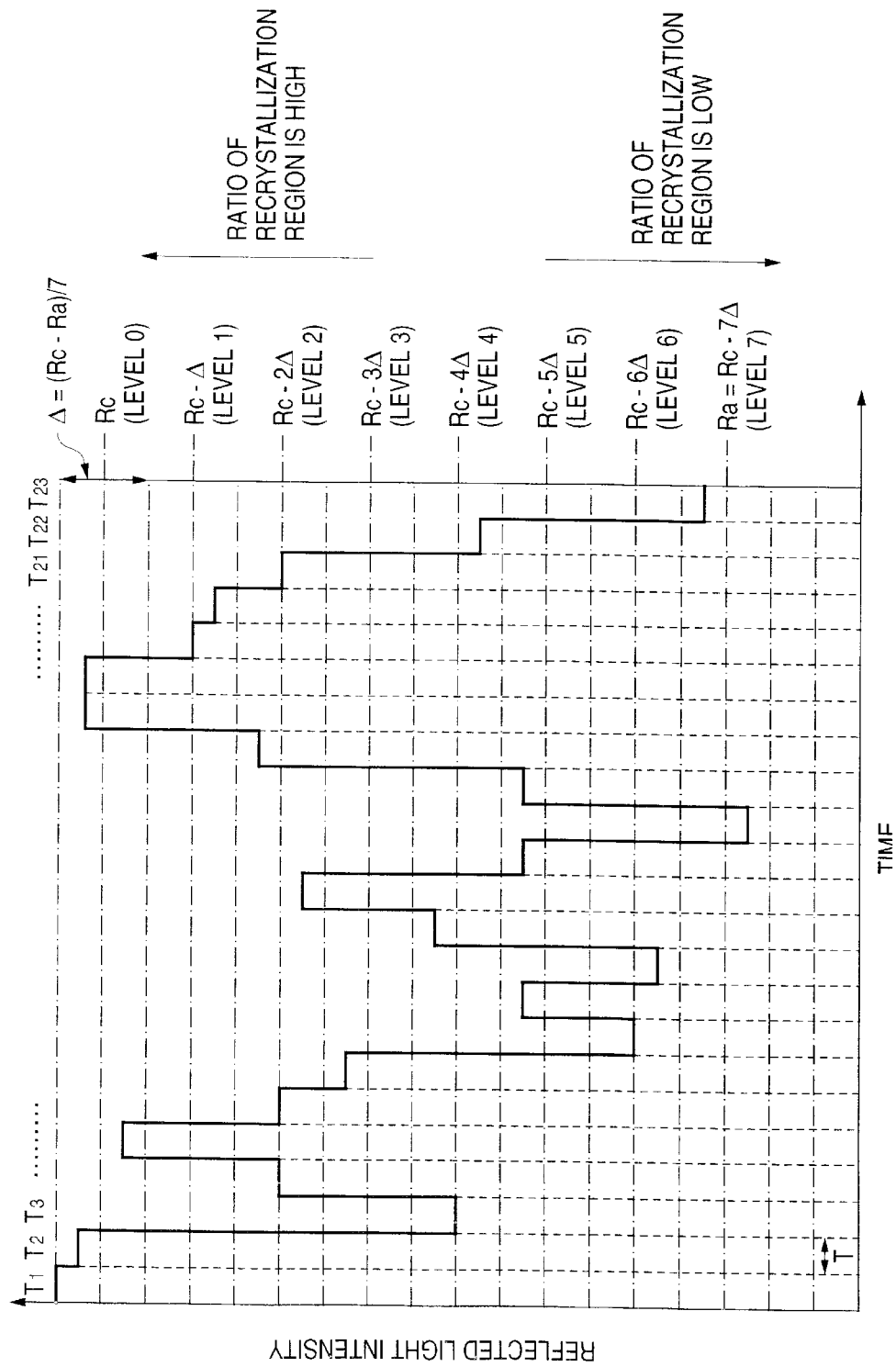
FIG. 6 schematicaly illustrates still another example array of reflected light intensity levels for each record level section.

To make further improvements in the recording density, a second method is preferably used, in which, as shown in FIG. 6, a continuous transition is made from one recording level section corresponding to one reflected light intensity level to another section without passing through the reference recording level section.

FIG. 6 is a schematic diagram showing an example array of reflected light intensity levels for individual recording level sections according to the second method. There are eight reflected light intensity levels, level 0, level 1, . . . , level 7 in the order of decreasing magnitude. Level 0 represents a crystalline level. In the recording level sections $T_1$–$T_{23}$, a continuous-transition is made from one recording level section to the next adjacent recording level section without passing through the reference recording level. In FIGS. 4 and 5 the crystalline level is used for the reference recording level section and, in FIG. 6 too, there are recording level sections with the crystalline level. The method of FIG. 6, however, differs from the method of FIGS. 4 and 5 in that the crystalline level is treated as one recording level in the same way as other recording levels and that the level transition does not necessarily pass through the crystalline level.

The second method has the advantage of being able to perform a higher density recording. It should be noted, however, that the size of the amorphous mark needs to be controlled more accurately than in the first method.

The method of determining the reflected light intensity level typically involves dividing a predetermined range of reflected light intensity into m sub-ranges (m>1) and checking which sub-range an obtained reflected light intensity belongs to. In this case, it is desirable in increasing the dynamic range to set the m sub-ranges such that the sub-range having the strongest reflected light intensity in the predetermined range includes the strongest reflected light intensity Rc in the medium and that the sub-range having the weakest reflected light intensity in the predetermined range includes the weakest reflected light intensity Ra in the medium.

The reflected light intensity width $\Delta i$ is an integer of 1 to m) of each sub-range is preferably set equal in size for any i because this can simplify the reproducing apparatus. For example, a preferable level decision method may, as shown in FIGS. 4 to 6, provide m sub-ranges of equal reflected light intensity widths Δ of Δ=(Rc−Ra)/(m−1) which are separated at boundaries of (Rc−kΔ)±1/2Δ (k is an integer from 0 to m−1) and may check which of these sub-ranges an obtained reflected light intensity belongs to. Further, it should be noted that the greater recrystallized region, i.e., the higher reflected light intensity the recording level section has, the more difficult it is to control the recrystallization process. Hence, in increasing the redundancy for variations of the reflected light intensity caused by recrystallization fluctuations it is effective to set a larger Ai as the region comes closer to Rc.

During the reading, it is preferred to determine, in synchronism with the recording level section, to which reflected light intensity level the reflected light intensity R belongs. To this end, a timing detection mark is preferably recorded for every predetermined number of recording level sections. The reflected light intensity of this timing detection mark may be of any value between Ra and Rc. Or, it is preferably set outside the Rc-to-Ra range. Further, to avoid being affected by the waveform dullness of the adjacent amorphous marks, the length of the amorphous mark being formed should preferably be set somewhat longer than required.

The radiation pattern of the recording energy beam that enables the precise control of the amorphous mark size for realizing the above-described multilevel recording will be described as follows.

If the recording energy beam size is constant and its intensity is modulated, the size of the amorphous mark is governed mainly by the following two factors.

(1) Area of the melted region that will form the amorphous state: Then the recording energy beam is strong, the temperature of the recording layer becomes high, resulting in an increased area of the melted region.

(2) Cooling speed of the melted region: The area of the recrystallized region when the melted region re-solidifies is determined by the cooling speed during the resolidifying process The higher the cooling speed, the narrower the recrystallized region will be.

In this invention, in forming one amorphous mark at least two beams with different powers, large and small, are preferably used, rather than radiating a single-power recording energy beam, with the sized and radiation times of these beams controlled to adjust the cooling speed of the melted region formed in the recording layer, i.e., the sizes of one or more recrystallized regions.

In more concrete terms, it is preferred that a part or all of the radiation time of the recording energy beam in one recording level section be divided into one or more recording pulse sections during which a beam with a power Pw strong enough to melt the recording layer is radiated and one or more interrupt sections during which a beam with a weak power is radiated.

Figure 7:
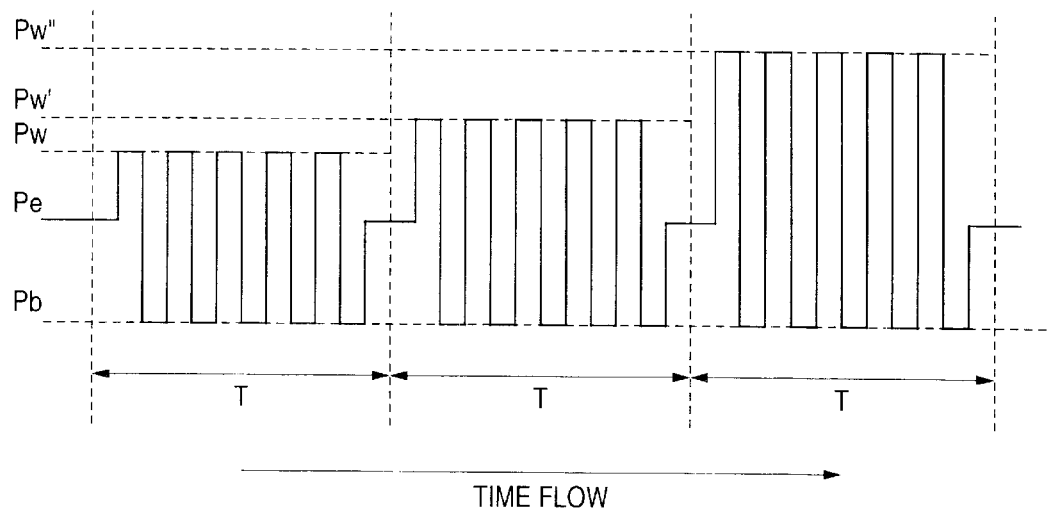
FIG. 7 is an explanatory diagram showing an example radiation pattern of an energy beam used in this invention.
Figure 7:
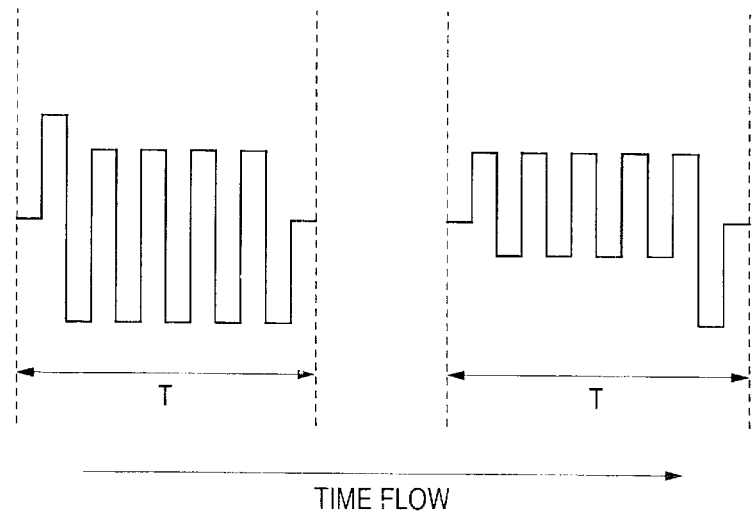

In this case, the power Pw and the radiation time length Tw in the recording pulse sections are considered to control the size of the melted region, and the power Pb and the time length Tb in the interrupt sections are considered to control the cooling speed. By changing the radiation pattern including Pw, Pb, Tw, Tb, the number of recording pulse sections and the number of interrupt sections, the size of the amorphous mark is controlled. FIG. 7 shows radiation patterns of the energy beam in one recording level section T. In either case of FIGS. 7(a), 7(b) and 7(c), one recording level section T has a plurality of recording pulse sections and interrupt sections to enable a more precise control of the amorphous mark width.

FIG. 7(a) represents a case where three powers Pw, Pb, Pe are used to form an amorphous mark. Pw is a power strong enough to me, the recording layer, and Pb is a power which does no heat the recording layer above the melting point (Pw >Pb). Pb is particularly associated with the cooling speed. The cooling speed can be increased with a lower Pb. The condition for producing a good cooling effect is normally Ph$\leq$0 5 Pe, preferably Pb$\leq$0.2 Pe. Pb is normally 2 mW or less but can also be set to zero as long as this does not pose any problem to the focusing and tracking servo. More preferably, Pb is set equal to the power of the reading light beam Pr. Pe is a power necessary to completely recrystallize the amorphous mark and normally set in a range of $0.3 \leq Pe/Pw \leq 1.0$. Too high Pe will make the melted portion of the recording layer too large to be recrystallized, thus forming an amorphous mark in the end. Pe is practically a power to heat the recording layer above the crystallization temperature in the solid phase near the melting point. Here Pe is used to achieve the reflected light intensity level of the crystalline state and not used to recrystallize a part of the preceding amorphous mark that was already formed. The recrystallization itself is realized strictly by the self-recrystallization controlled as by Pb. FIG. 7 represents a case in which the size of the amorphous mark is controlled by changing only Pb in the radiation pattern of the recording energy beam. In the figure, as the beam moves from the left recording level section to the right recording level section, Pw increases to Pw' and Pw". In this case, as the Pw increases, the cooling speed of the melted region decreases, so that the amorphous marks can be made smaller toward the right recording level section in the figure.

The first and subsequent pulses may be differentiated by setting Pw of only the first pulse to an increased value (FIG. 7(*b*)). Or, Pb may be decreased at only the rear end of the mark to differentiate the intermediate interrupt sections and the interrupt section at the rear end of the mark (FIG. 7(*c*)). These methods are effective in adjusting the rear-end shapes of the marks. When the influence of the thermal interference from the marks before and after one recording level mark is to be compensated for, adjusting Pw of the first pulse at the front end of the mark and Pb of the last interrupt section at the rear end of the mark according to the preceding and subsequent recording levels is effective in shortening the length of the mark, i.e., the length of one recording level section T, to increase the density.

To generate the crystalline level, a beam with an erase power Pe need only be radiated. A more precise control may be obtained by not just radiating only Pe over the entire section T but also providing sections of different powers at the front and rear ends of the mark.

To change the size of the amorphous mark, the values of Pb and Pw maybe changed or the values of Tb and Tw also changed. The latter is preferred because changing the time is simpler.

Although the example of FIG. 7 uses the erase power Pe in addition to the two powers of Pb and Pw, this invention can realize the multilevel recording by actively using the "self-recrystallization", by not using the power Pe, and by performing modulation between the power Pw that melts the recording layer and the bias power Pb that limits the temperature rise in the recording layer to below the crystallization temperature in the solid phase. As a result, the recording power control circuit can be simplified further. This is identical to setting Pe=Pw in FIGS. 7(*a*), (*b*) and (*c*). In this case, too, Pw and Tw are considered to control the area of the melted region and Pb and Tb are considered to control the cooling speed of the melted region during the solidifying process. For example, radiating only the Pw power uniformly over one recording section causes the entire melted region to be crystallized by the self-recrystallization, thus generating the crystalline level.

In the above case, Pb is preferably low at a level that will virtually not cause any physical change to the recording layer. It is normally set in a range of $0 \leq Pb \leq 0.2$ Pw. More preferably, it is set substantially equal to the reading power Pr. Specifically, it is preferably set at 0<Pb<2 mW. In performing an overwrite, it is necessary to melt all the regions once regardless of the ON/OFF of Pw and thus setting the section of off-pulse Pb longer than necessary is not so preferable. The length of the interupt section Tb is preferably equal to or less than approximately the energy beam diameter.

Figure 8:
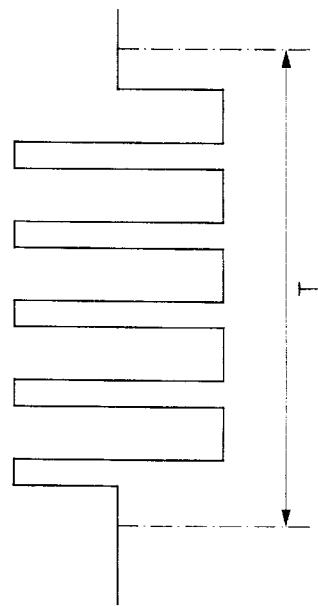
FIG. 8 is an explanatory diagram showing another example radiation pattern of an energy beam used in this invention.
Figure 8:
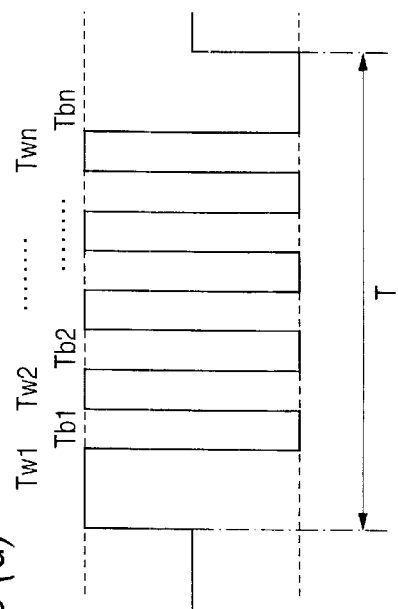
Figure 8:
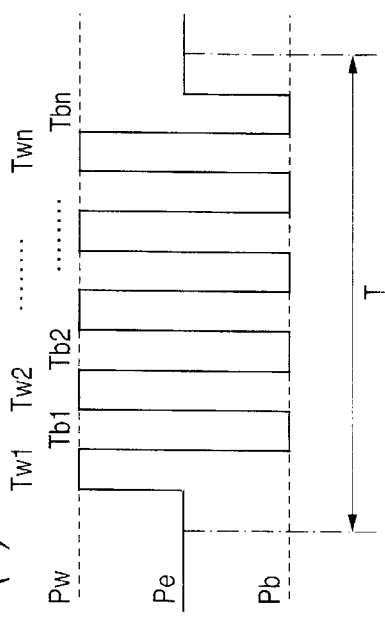
Figure 8:
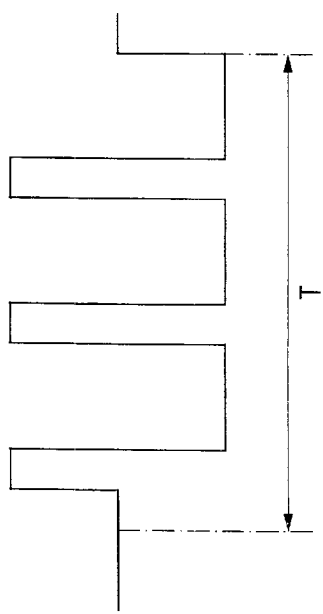

FIG. 8 shows another example of the radiation pattern of the energy beam according to this invention. In FIG. 8, the recording pulse section in the recording level section T is divided into n sub-sections (time durations of these sub-sections are $Tw_1, Tw_2, \ldots, Tw_n$) each of which is followed by an interrupt sub-section (time durations of these interrupt sub-sections are $Tb_1, Tb_2, \ldots, Tb_n$). In FIG. 8(*a*), the repeating cycles of the recording pulse sub-sections and the interrupt sub-sections are set equal. In FIG. 8(*b*), the ratio between the recording pulse sub-sections and the interrupt sub-sections is changed from that of FIG. 8(*a*). FIG. 8(*c*) represents an example in which the repeating cycle is also changed. In the case of FIG. 8, too, the beam can be radiated by replacing Pe with Pw as described earlier.

While in this invention the recording pulse sub-section lengths Tw and the interrupt sub-section lengths Tb may be changed for each pulse and interrupt section, it is effective to make only the front and rear ends of the mark different from others, as shown in FIG. 8(*d*). That is, only the first recording pulse sub-section is set somewhat longer than others by setting $Tw_1 > Tw_2 = Tw_3 = Tw_4 = \ldots = Tw_n$ and only the last interrupt sub-section is set somewhat longer than others by setting $Tb_n > Tb_1 = Tb_2 = Tb_3 = \ldots = Tb_{n-1}$. This is advantageous as it allows the front and rear ends of the mark to be controlled more accurately. Adjusting the recording pulse sub-section length and the interrupt sub-section length at the front and rear ends of the mark to compensate for the influence of thermal interference from the preceding and subsequent marks is effective in shortening the mark length, i.e., one recording level section T, and thereby increasing the density.

Figure 9:
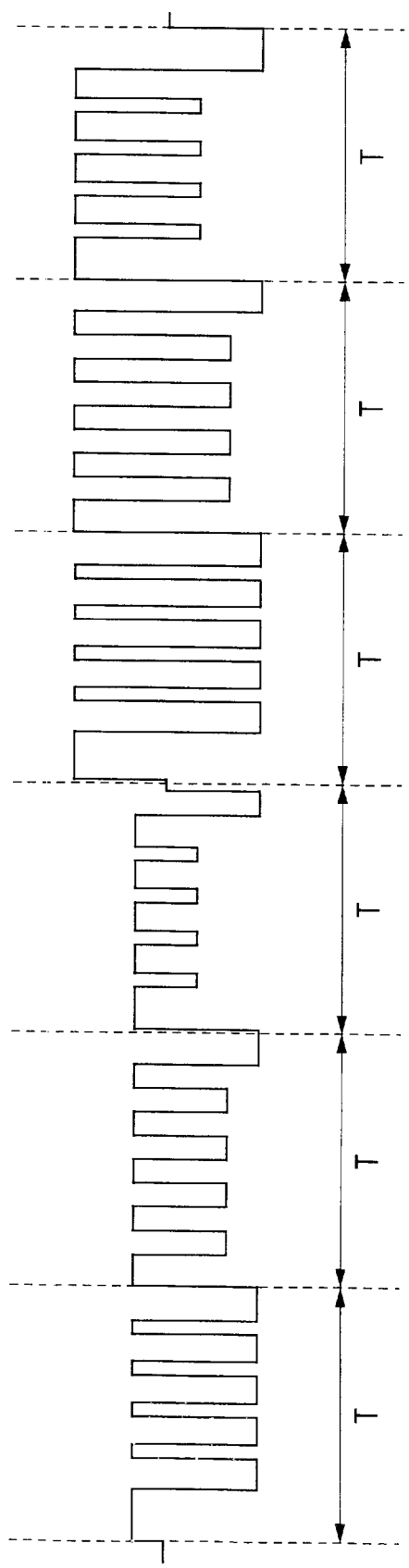
FIG. 9 is an explanatory diagram showing still another example radiation pattern of an energy beam used in this invention.

FIG. 9 shows another example of radiation pattern of the energy beam according to this invention. The radiation pattern of FIG. 9 is generated by a combination of the recording power control of FIG. 7 and the recording pulse section length/interrupt section length control of FIG. 8. Such a complex control is effective in making corrections according the preceding and subsequent recording levels when the mark length is shortened. In the case of the second method that performs continuous transition from each recording level, in particular, there is significant influence of thermal interference from a preceding level to a subsequent level, so that a series of radiation patterns needs to be controlled according to the combination of the two successive levels. For example, when performing an 8-level multilevel recording, it is preferred that 8×8=64 recording pulse patterns be stored in a ROM memory to generate a desired radiation pattern.

There are cases in the past where radiation patterns similar to those of this invention have been used for controlling the amorphous mark length in the phase change optical recording, especially the mark length modulation recording. But they are used to keep the reflected light intensity (modulation) in the amorphous mark positions constant as practically as possible, and to this end the control is performed mainly to make the recrystallized region as small as possible. The radiation patterns of this invention, on the other hand, are used to actively utilize and control the recrystallization process in each amorphous mark.

In this invention, for higher density recording, the spatial length Ts of the recording level section is preferably smaller than the length $r_b$ of the reading light beam spot. In this case, the length T of one recording level section is preferably made constant in terms of both time and space because it is difficult to intentionally detect a change in length of such short recording level sections. Further, the diameter of the recording energy beam is preferably set substantially equal to that of the reading beam. It is noted, however, that when the length Ts of one recording level section is too small, the recording level may be optically unidentifiable. So, Ts is preferably larger than $(\frac{1}{4})r_b$.

As the method of radiating the recording energy beam in such a very short recording level section, the above-described radiation method can be used. In terms of ease of control it is preferred that a part or all of the recording energy beam radiation time for forming one recording level section be divided into one recording pulse section and a interrupt section provided before and/or after that recording pulse section; that the power of the recording energy beam in the recording level section be set to a power Pw strong enough to melt the recording layer during the recording pulse section and to a power Pb smaller than Pw and including 0 during the interrupt section; and that Pw, Pb, the recording pulse section length and/or the interrupt section length be changed. As for the radiation pattern, what is described above applies. The power Pb should preferably be set as close to 0 as possible to easily suppress the self-recrystallization.

Figure 23:
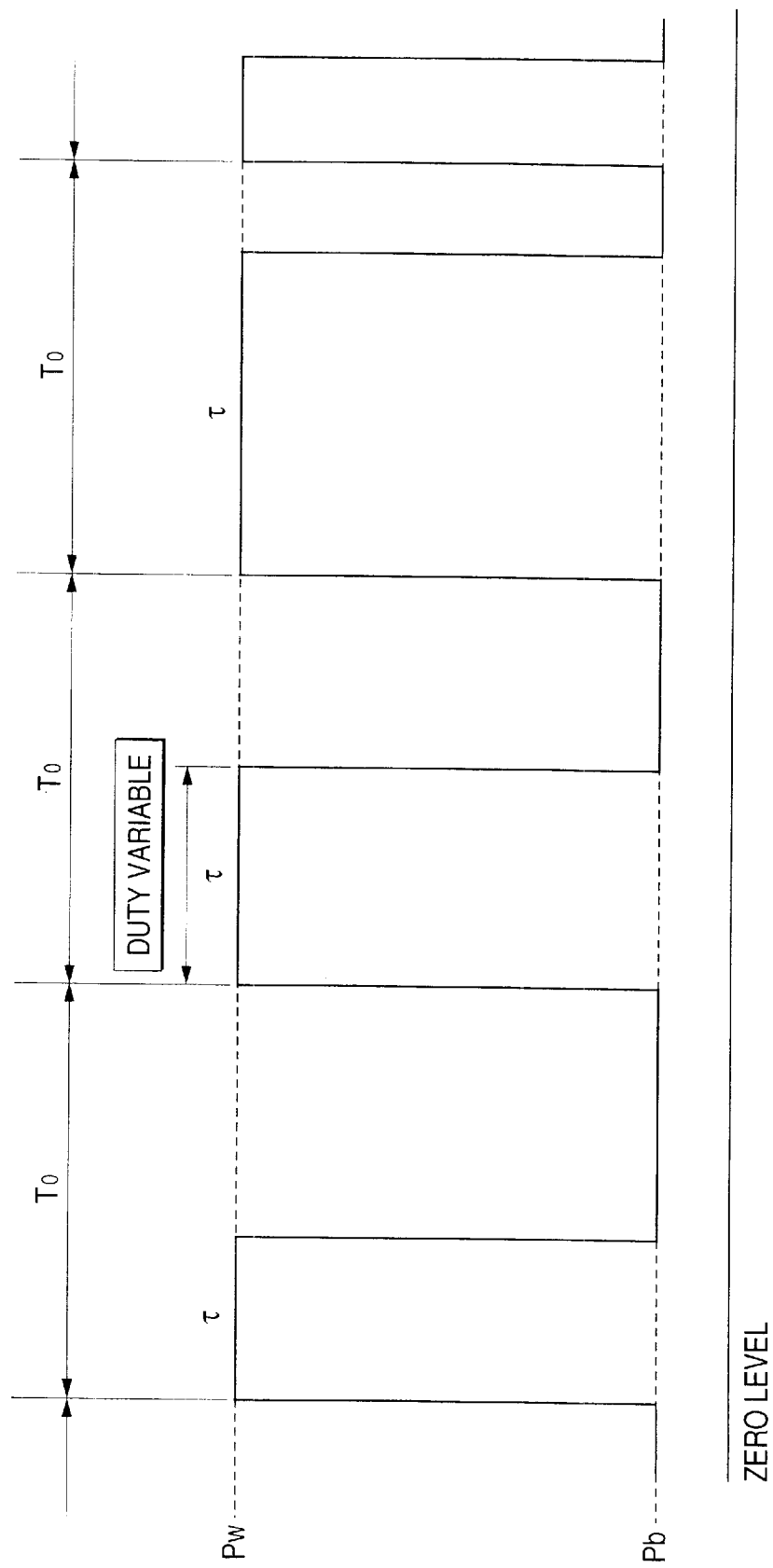
FIG. 23 is an explanatory diagram showing a preferred example of radiation pattern of an energy beam in this invention.

More preferably, as shown in the radiation pattern of FIG. 23, the length of the recording level section is set constant at To and a duty ratio, a ratio of the recording pulse section to the recording level section, is changed to control the size of the amorphous mark. This renders the energy beam control easy and is preferable. In this case, when the duty ratio of the recording pulse section is 100%, it is further preferred that the "self-recrystallization" is performed to restore the reflected light intensity substantially to that of the initial crystallized state. That is, only two powers of Pw and Pb are used as the energy beam power.

In FIG. 23, as the duty ratio of the recording pulse section τ is increased, an increased melted region increases the area of the amorphous mark, reducing the reflected light intensity first. However, as the duty ratio is further increased, the reflected light intensity passes the minimum point and thereafter increases monotonously. This is because as the interrupt section is shortened, the cooling speed of the melted region decreases, which in turn increases the recrystallized region. When the recording method of FIG. 23 is employed, it is particularly desirable that the section in which the reflected light intensity monotonously increases along with the duty ratio be used to control the reflected light intensity in multiple levels by only the duty ratio. In this case, it is preferable to use a medium whose reflected light intensity changes substantially in proportion to the duty ratio.

If we let Da (%) and Dc (%) denote duty ratios at which the minimum reflected light intensity Ra and the maximum reflected light intensity Rc are produced, respectively, the medium used should preferably has a characteristic of Dc−Da ≦50%. When the Dc−Da value is too small, the reflected light intensity change corresponding to a change in the duty ratio becomes too sharp, rendering the control difficult. In practice, the medium used should preferably be such that the melted region is substantially perfectly recrystallized at the recording pulse duty ratio of 95% or higher. Further, when a range between Rc and Ra is divided into m sub-ranges to perform a multilevel recording with (m+1) levels, (Dc−Da)/(m+1)≧5 (%) is preferably set. In this case, one level shift is matched with a duty ratio change of 5% on average. This prevents data from being recorded at different reflected light intensity levels as a result of a small duty ratio change. It is particularly preferred that at least 3% duty ratio change be assigned to each transition between different levels.

When the ratio of the recrystallized region becomes very high, the area of the amorphous mark is difficult to control accurately, making it more likely for the reflected light intensities obtained at the same duty ratios to vary. In this case, the recording pulse power Pw may additionally be changed according to the recording level to control the area of the melted region. That is, for higher than a certain duty ratio, the Pw is preferably set somewhat smaller than what is needed to reduce the area of the melted region itself. This method is effective in providing a plurality of recording pulse sections when forming an amorphous mark somewhat larger than the reading light beam.

Figure 24:
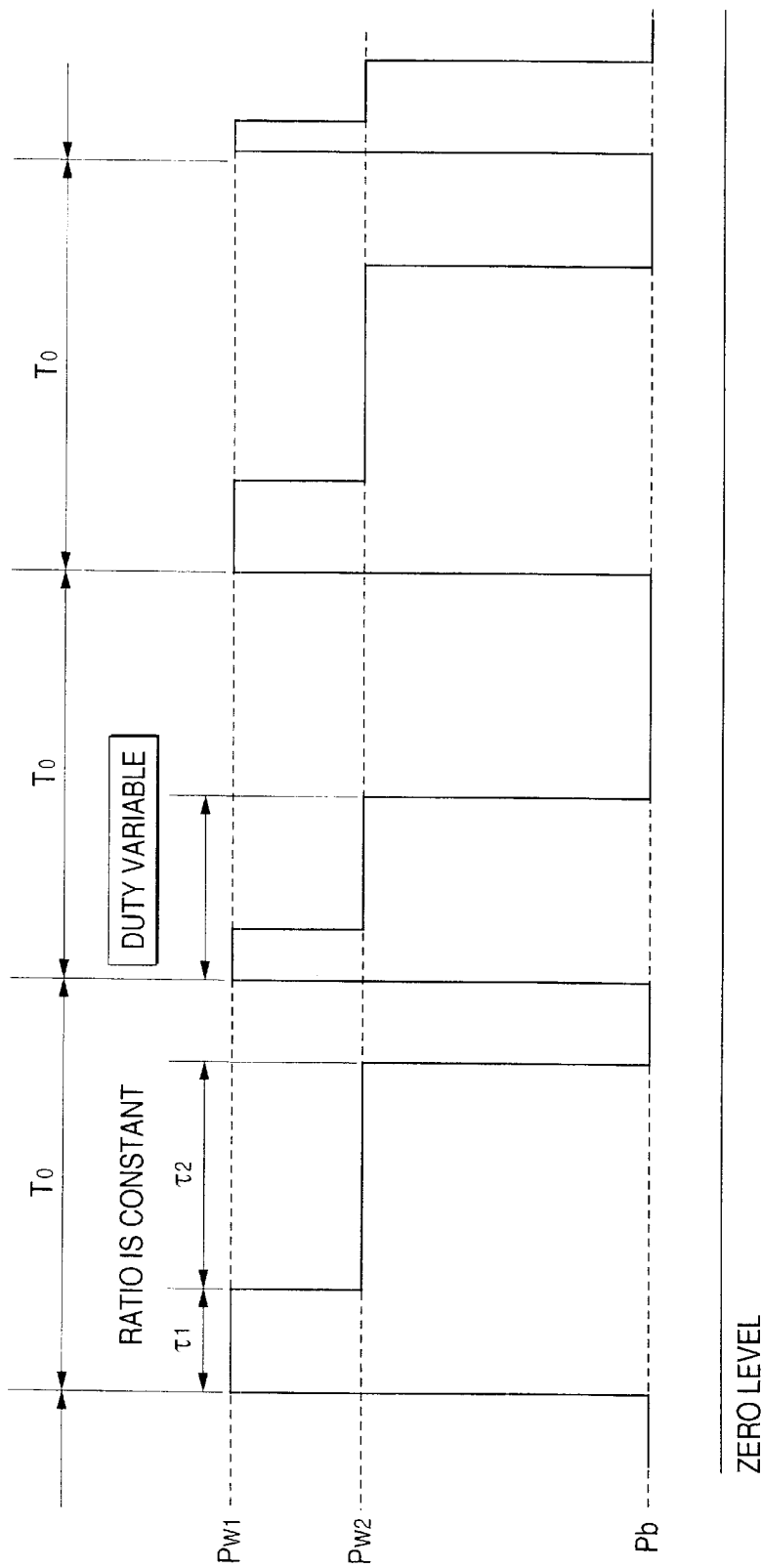
FIG. 24 is an explanatory diagram showing another preferred example of radiation pattern of an energy beam in this invention.
Figure 25:
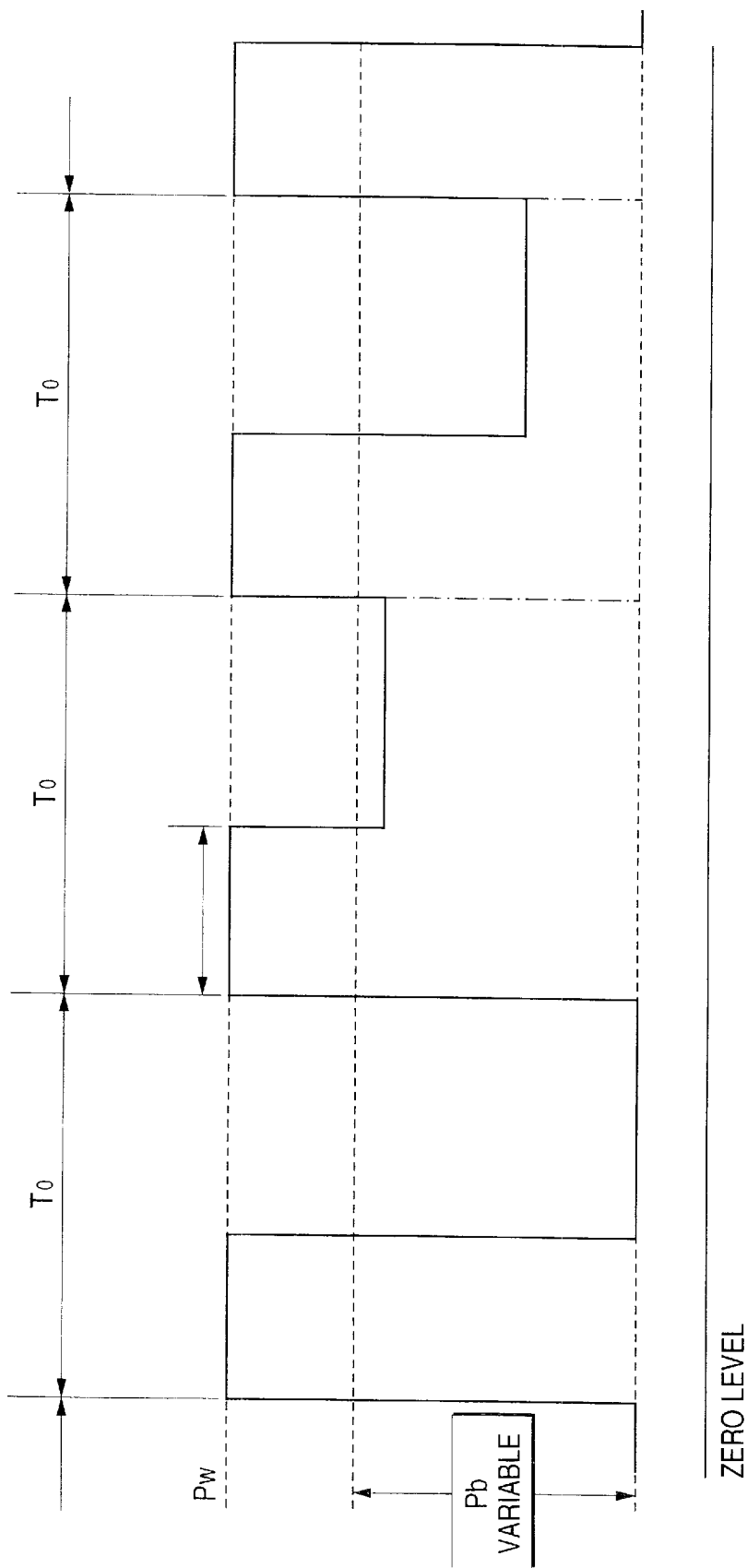
FIG. 25 is an explanatory diagram showing still another preferred example of radiation pattern of an energy beam in this invention.

Alternatively, as shown in the radiation pattern of FIG. 24, the recording pulse section may further be divided into two successive sections and the duty ratio of $(\tau_1+\tau_2)$ may be changed in the To period while keeping a $\tau_1/\tau_2$ ratio constant where $\tau_1$ is a duration in which the power $Pw_1$ is radiated in the preceding section and $\tau_2$ is a duration in which the power Pw is radiated in the subsequent section. In this case, Pw has a role of mainly controlling the shape and area of the melted region and $Pw_2$ a role of mainly controlling the cooling speed of the melted region. Although it is possible to fix one of $\tau_1$ and $\tau_2$ and change only the other, it is desirable from the standpoint of ease of control to hold the ratio between $Pw_1$ and $Pw_2$ constant. If the setting is made so that the contribution of the lower power $Pw_2$ increases as the duty ratio becomes high, it is possible to suppress an increase in the area of the melted region. Further, as shown in the radiation pattern of FIG. 25, the value of Pb may be changed to control the recrystallized region.

Figure 26:
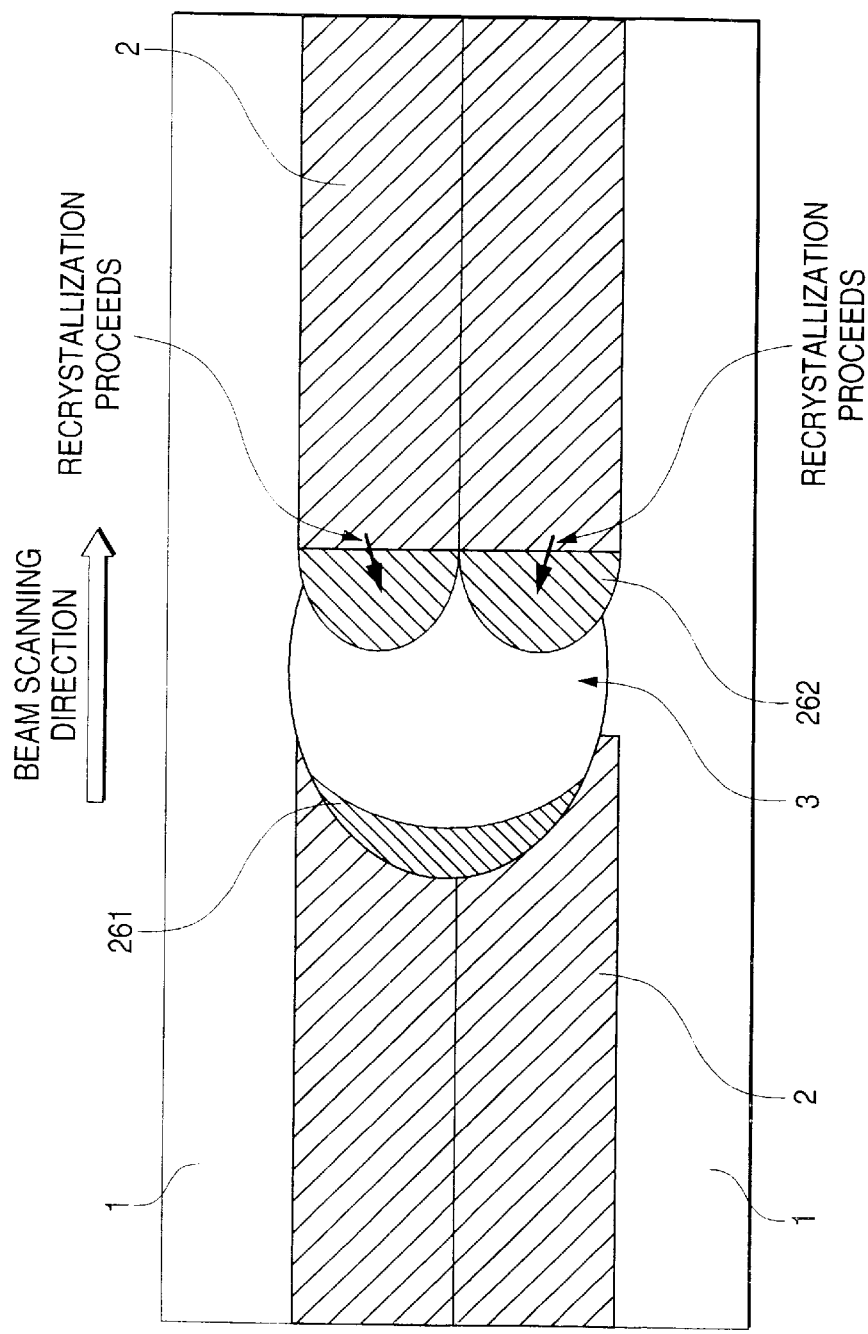
FIG. 26 is a schematic diagram showing a shape of an amorphous mark and a process of forming it.
Figure 27:
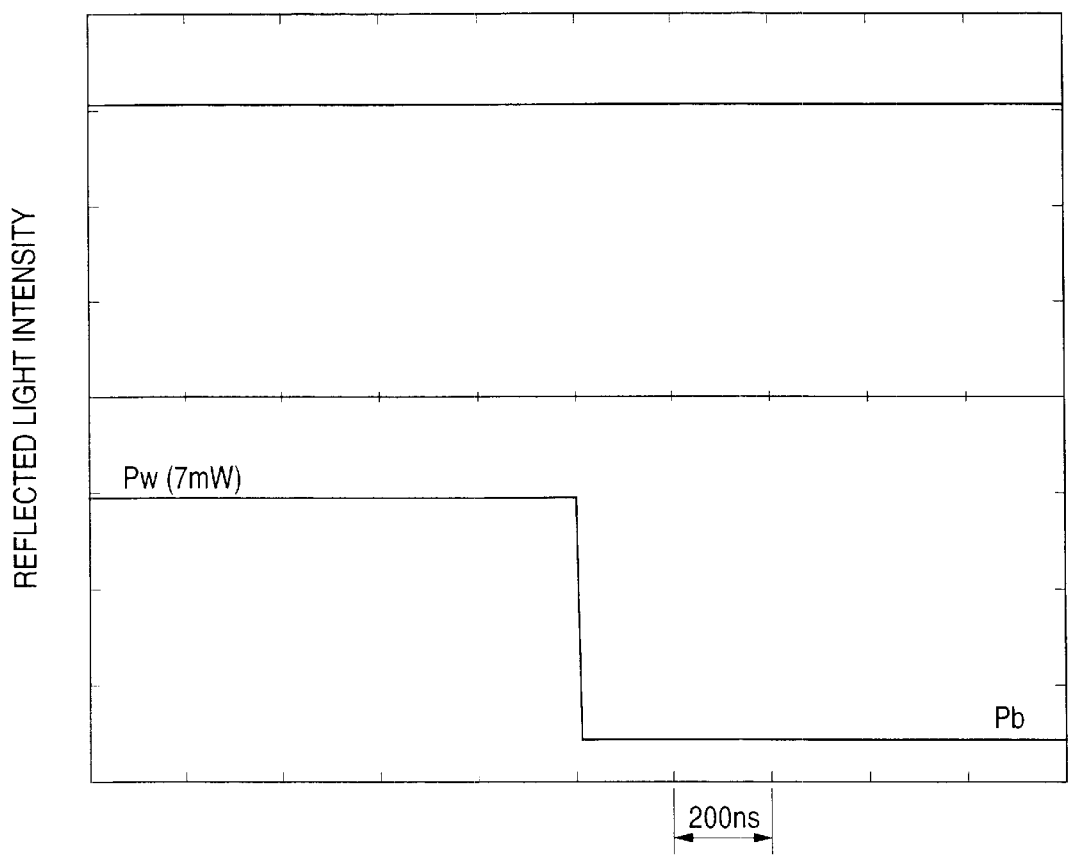
FIG. 27 is a diagram showing a radiation pattern and a reflected light intensity in Example 3.
Figure 28:
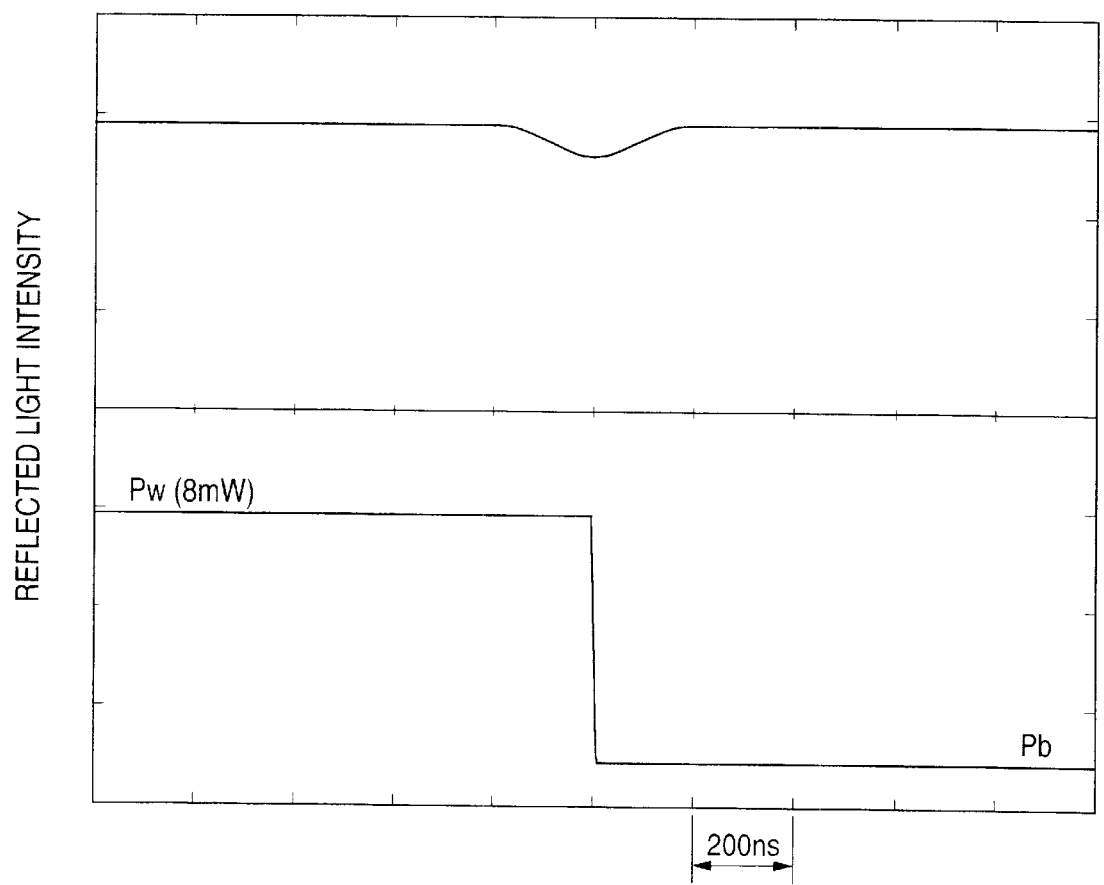
FIG. 28 is a diagram showing a radiation pattern and a reflected light intensity in Example 3.
Figure 29:
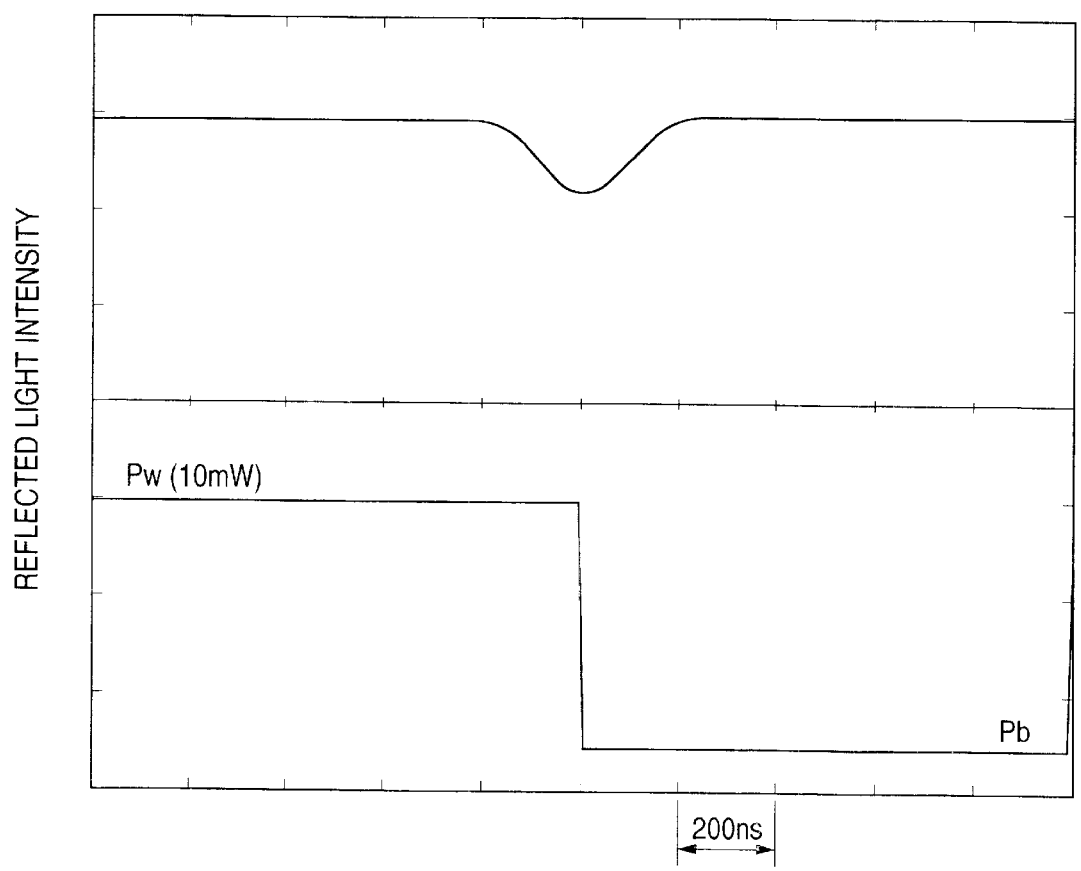
FIG. 29 is a diagram showing a radiation pattern and a reflected light intensity in Example 3.
Figure 30:
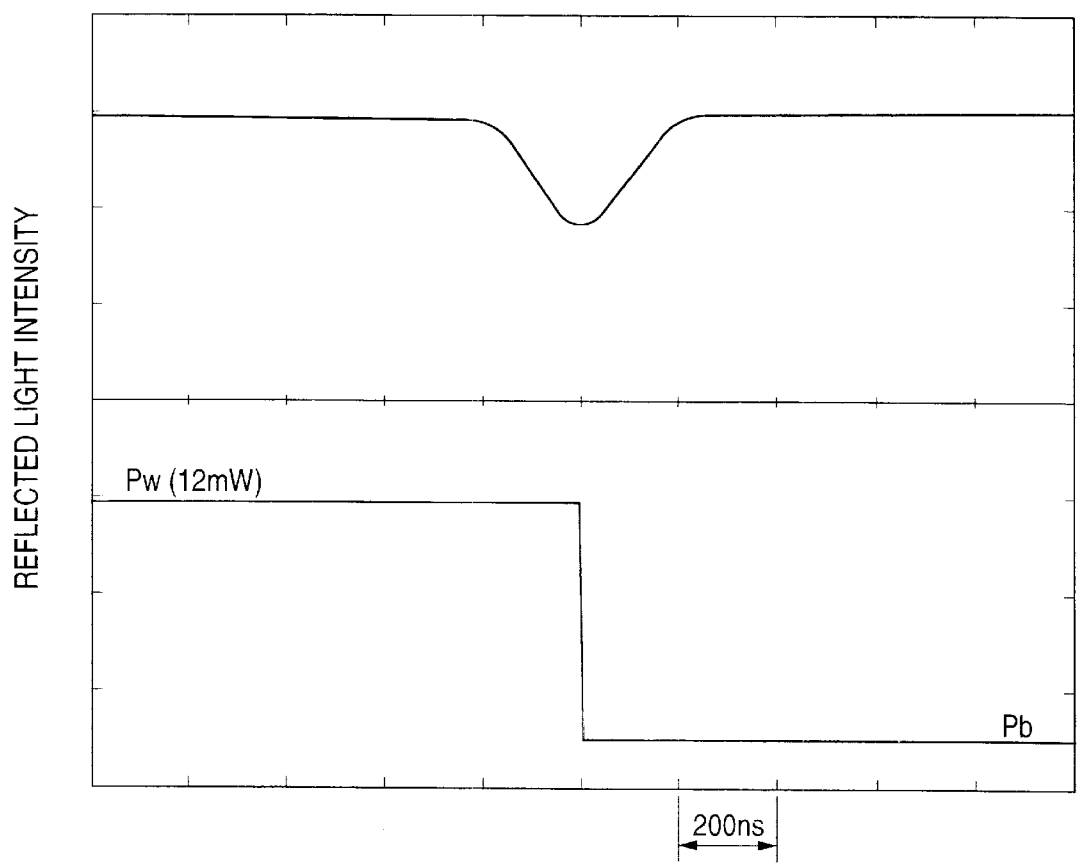
FIG. 30 is a diagram showing a radiation pattern and a reflected light intensity in Example 3.
Figure 31:
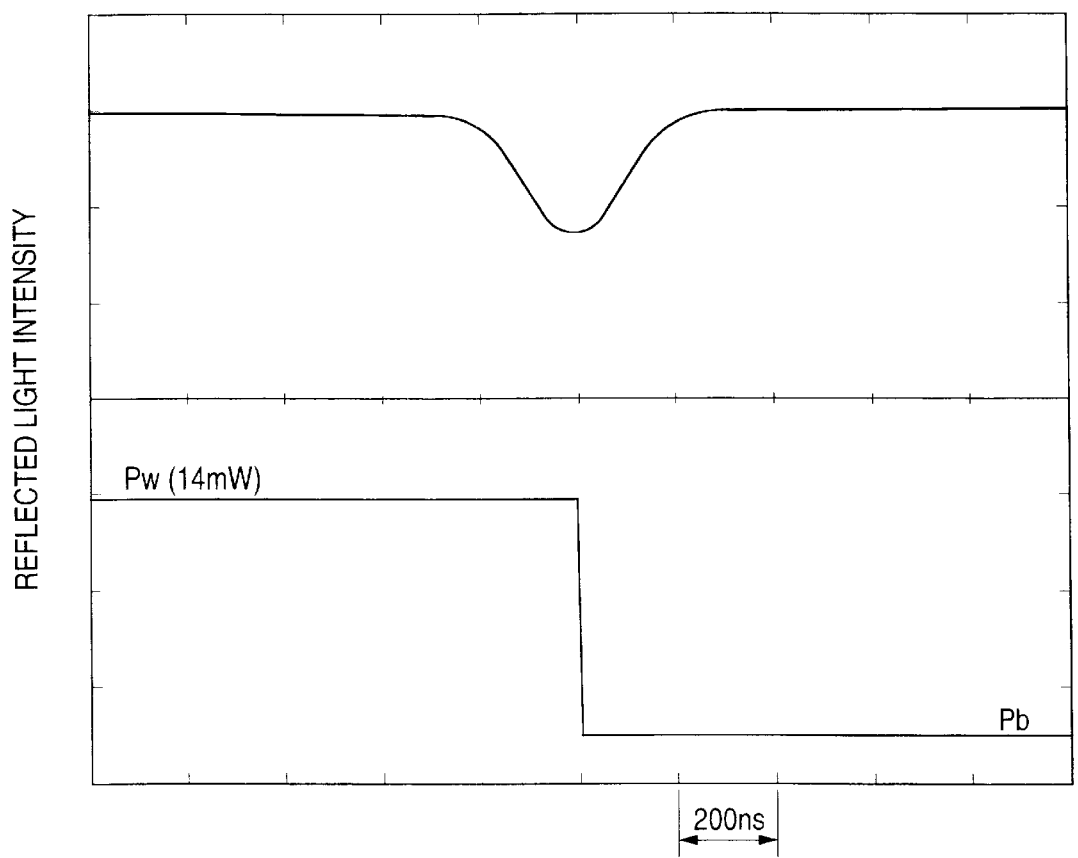
FIG. 31 is a diagram showing a radiation pattern and a reflected light intensity in Example 3.
Figure 32:
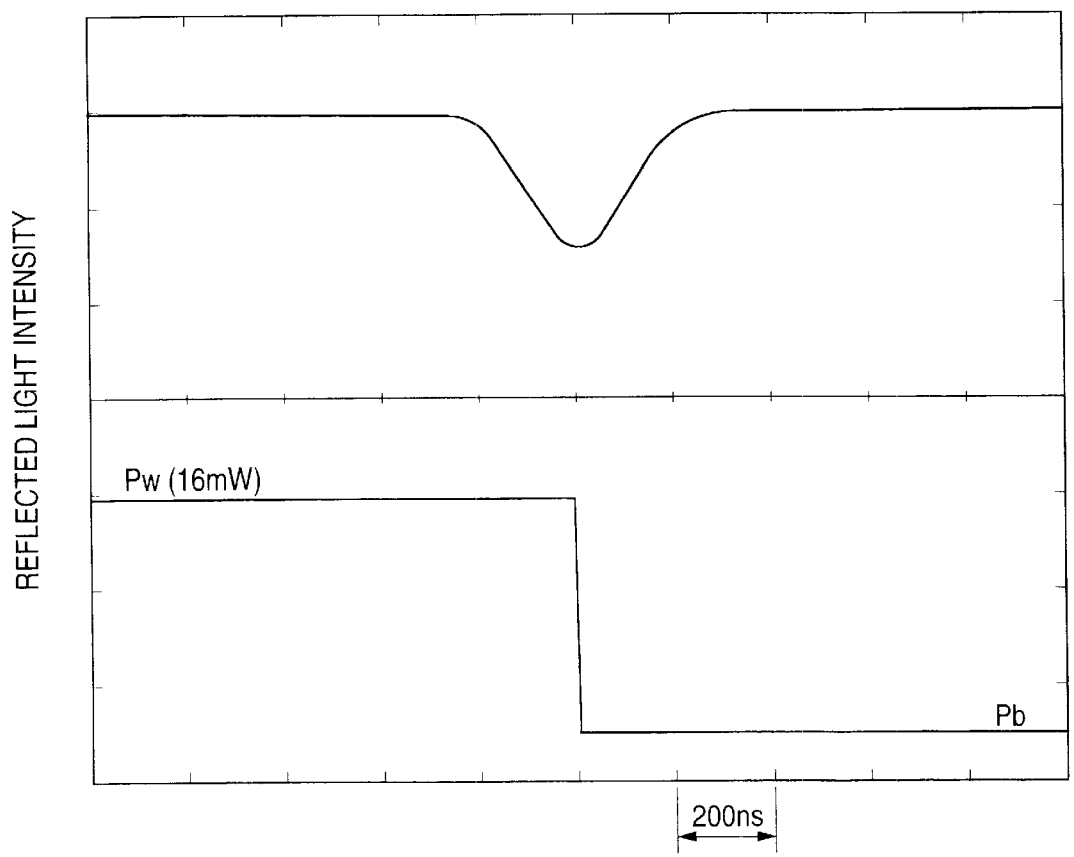
FIG. 32 is a diagram showing a radiation pattern and a reflected light intensity in Example 3.
Figure 33:
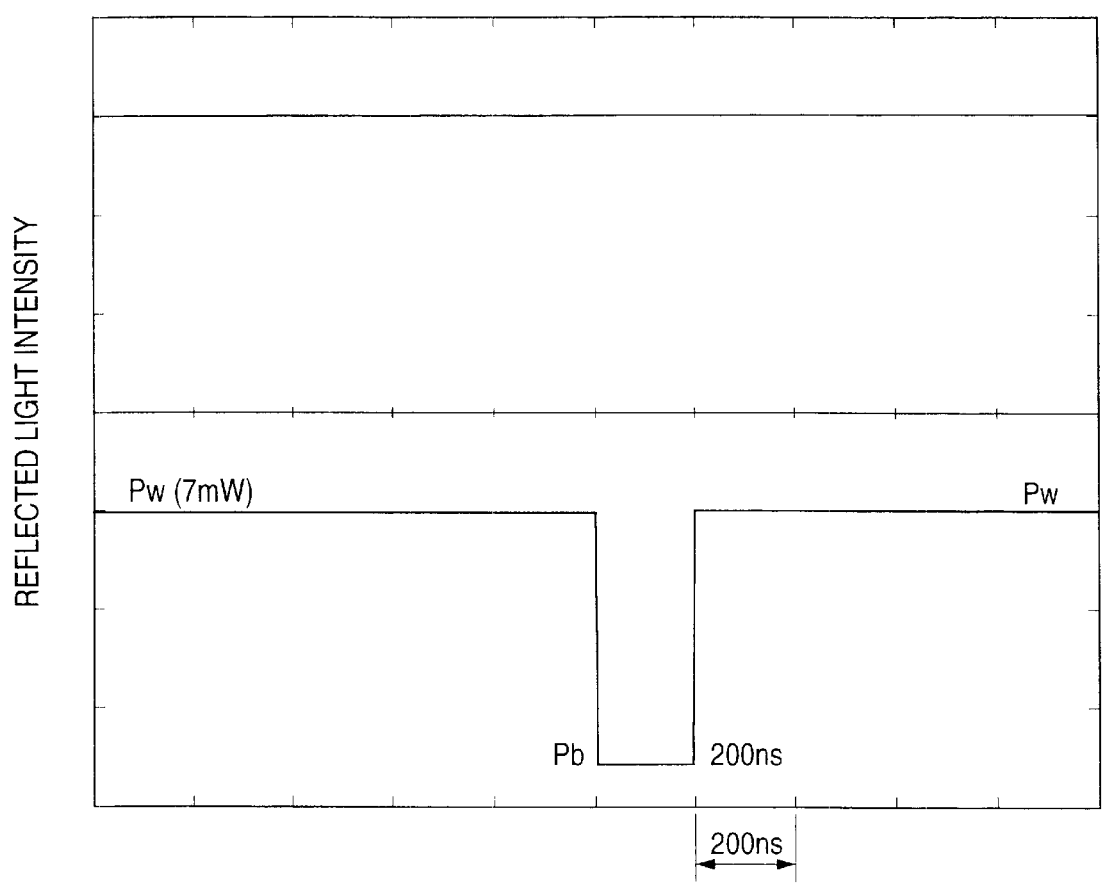
FIG. 33 is a diagram showing a radiation pattern and a reflected light intensity in another example of Example 3.
Figure 34:
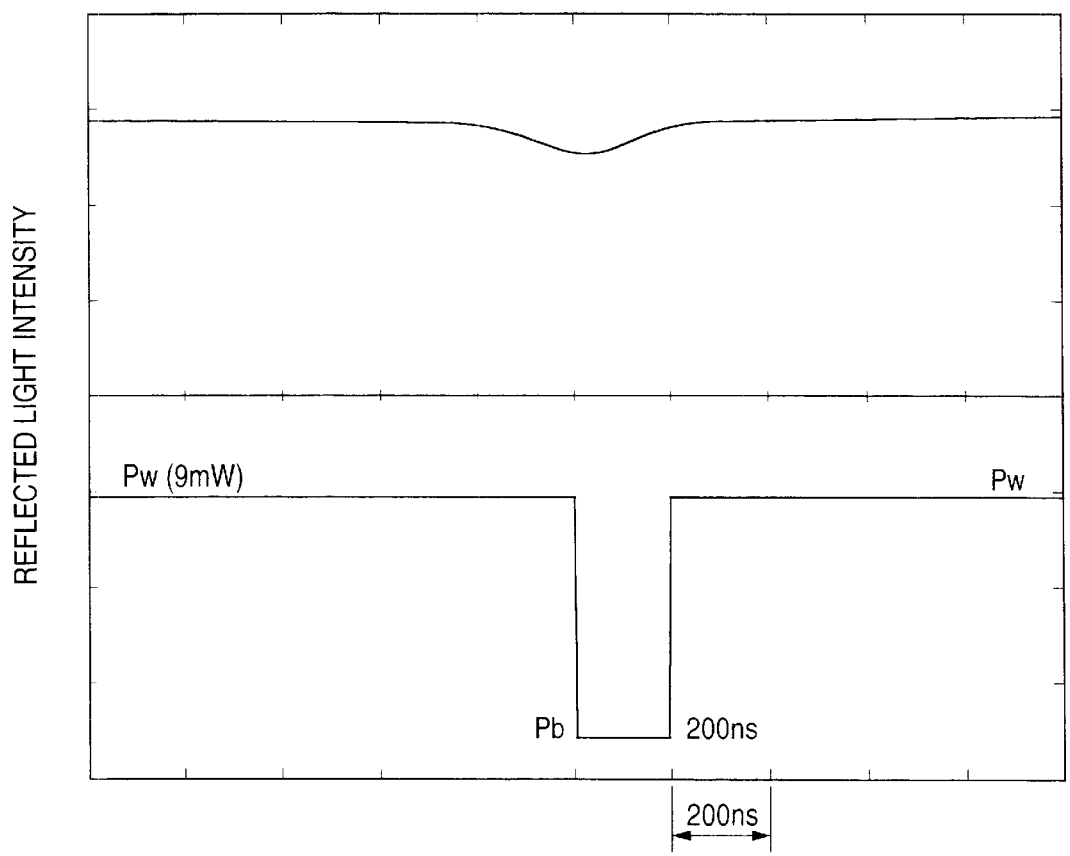
FIG. 34 is a diagram showing a radiation pattern and reflected light intensity in another example of Example 3.
Figure 35:
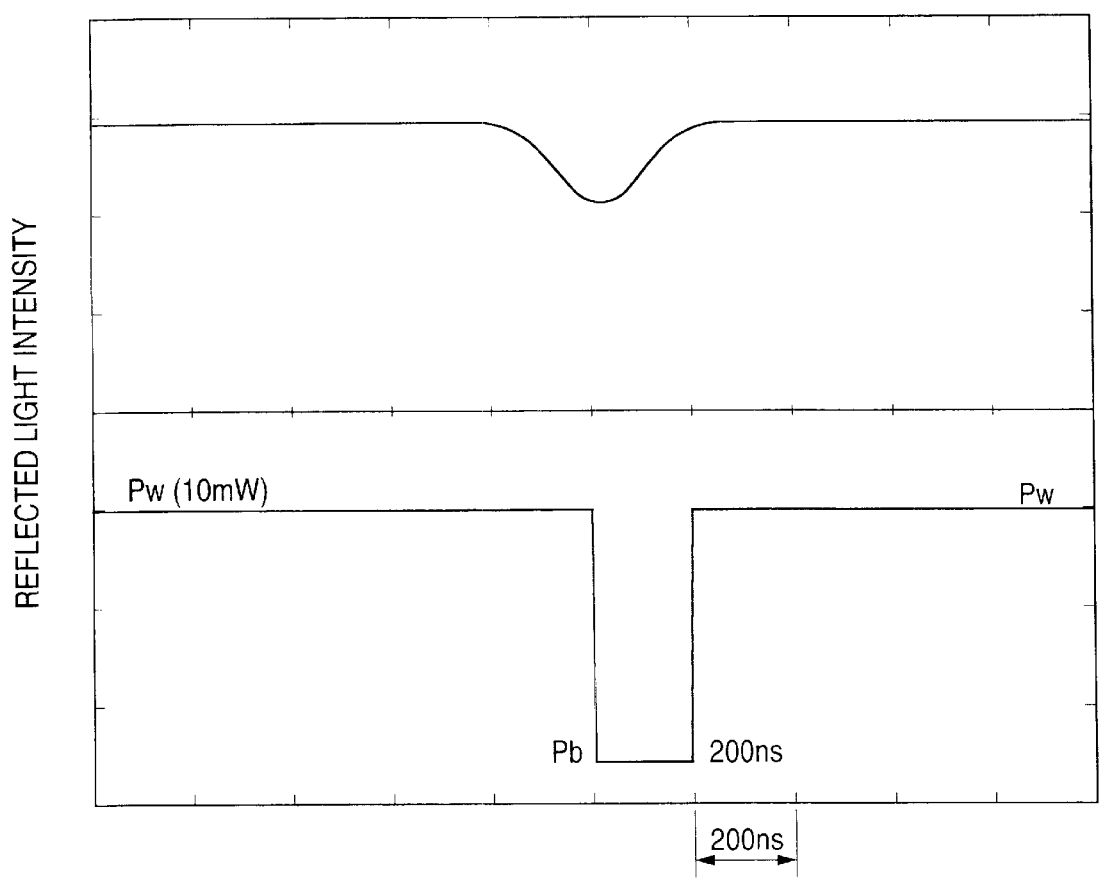
FIG. 35 is a diagram showing a radiation pattern and a reflected light intensity in another example of Example 3
Figure 36:
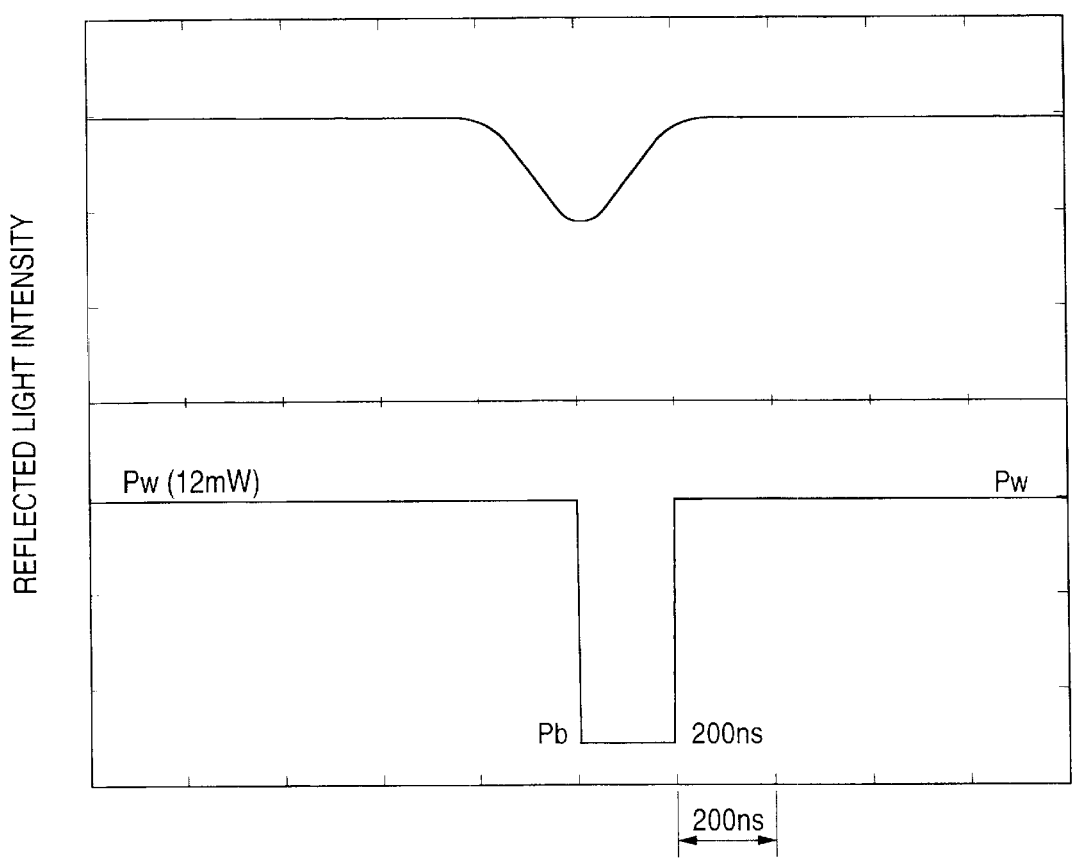
FIG. 36 is a diagram showing a radiation pattern and a reflected light intensity in another example of Example 3.
Figure 37:
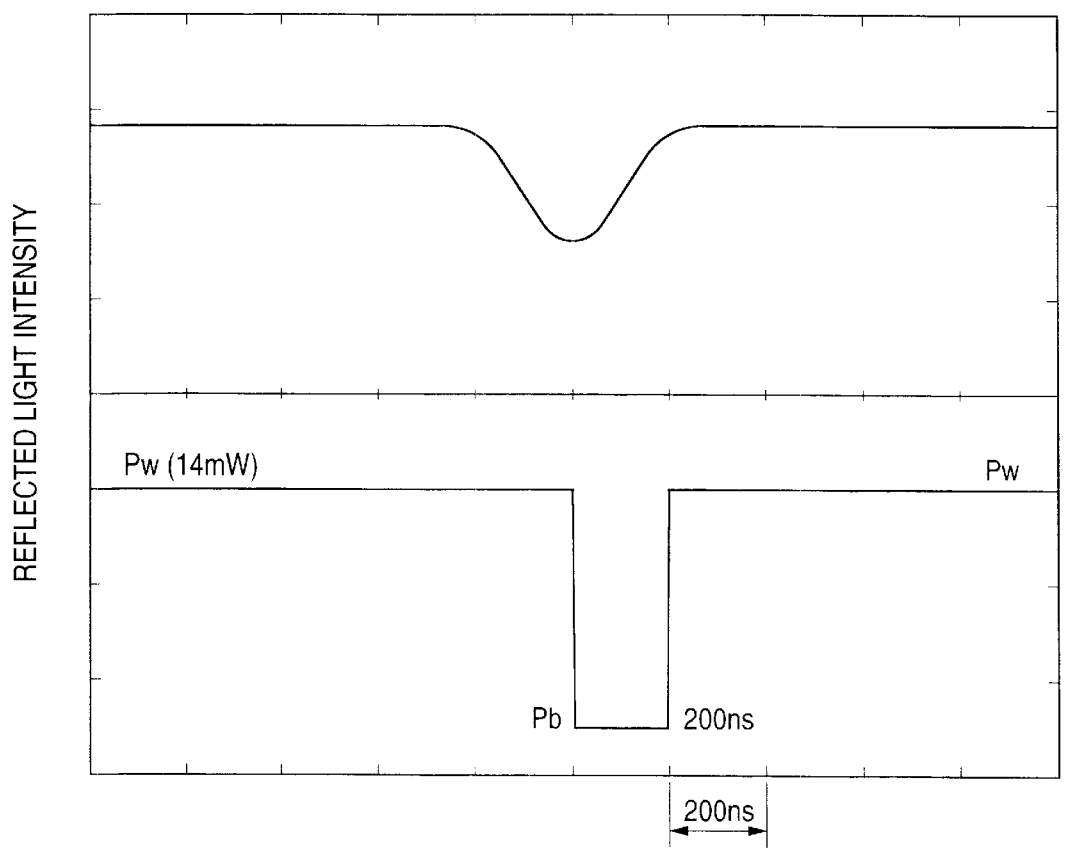
FIG. 37 is a diagram showing a radiation pattern and a reflected light intensity in another example of Example 3.
Figure 38:
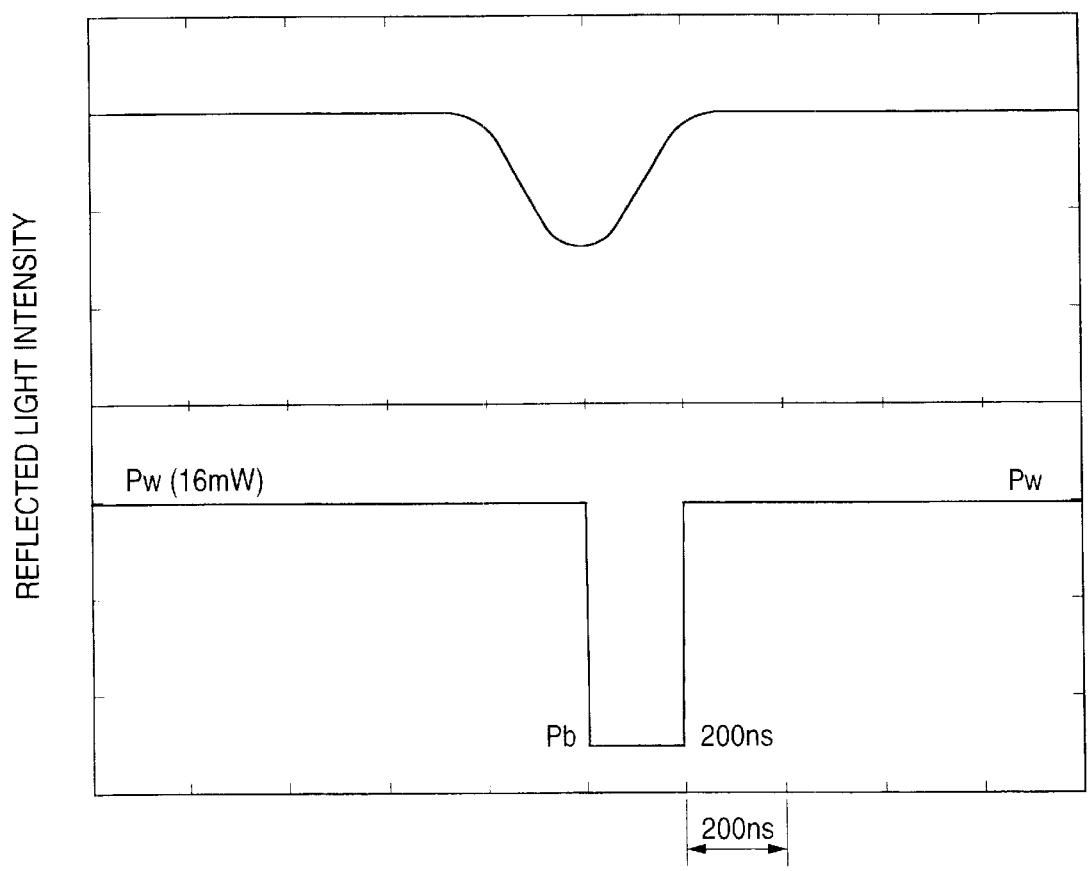
FIG. 38 is a diagram showing a radiation pattern and a reflected light intensity in another example of Example 3

In the multilevel recording method using such a very short recording level section, the amorphous mark is continuous in the scanning direction except where the reflected light intensity returns to the crystalline level. This method allows mainly the width of the amorphous mark to change or isolated amorphous marks to exist in one recording level section. In the case of the latter in particular, the amorphous mark need not be elliptical but may take an arrow feather shape as required. When the recrystallization during the solidifying process is governed by the progress of the crystalline growth in the peripheral crystalline region, the solidification proceeds from the rear end of the mark, making it likely for the amorphous mark to be formed into an arrow feather shape, as shown in FIG. 26. In the conceptual diagram of FIG. 26 illustrating the shape of the amorphous mark and the process of its formation, when we consider a case where the recording energy beam moves in the direction of scanning, a part of an initial crystallized region 1 is recrystallized as it solidifies from the melted state, thus forming a recrystallized region 2 along the scanning direction of the beam. Here let us consider the process in which the amorphous mark 3 is formed. The melted region itself is considered to be substantially elliptical. Influenced by the heat of the succeeding recording pulse, the crystalline growth will proceed relatively easily from the boundary with a solid phase crystalline region 262 at the rear end of the mark. At the front end part of the melted region, on the other hand, the cooling speed is secured by the escape of heat toward the front side and thus the melted region turns into an amorphous state while keeping substantially the shape of the melted region. As a result, the amorphous mark is shaped like an arrow feather.

The above method is effective in controlling the area of a high-density amorphous mark because the length of the arrow feather-shaped amorphous mark can be controlled well on the order of 0.01 μm. When one recording level section is smaller than the beam diameter, it is susceptible to the heat of the recording powers in the preceding and subsequent recording level sections and thus it may be necessary to correct the aforementioned duty ratio and also Pw, $Pw_1$, $Pw_2$ and Pb, etc. by considering the preceding and subsequent recording level sections. Adjusting the To finely according to the preceding and subsequent levels, rather than holding it constant, is also an effective correction means.

Although the multilevel recording/reproducing method of this invention can be applied to a medium hose recording layer in a crystalline state over the entire surface, it is preferably used for overwriting. In the repetitive recording, this method eliminates the need for performing the operation of erasing the formed amorphous mark in addition to the recording operation. More specifically, the overwriting of the amorphous mark is done by radiating the recording energy beam onto the region where the amorphous mark is already formed to melt the recording layer and thereby erase the amorphous mark and then by newly forming an amorphous region and a recrystallized region while being solidified.

Figure 11:
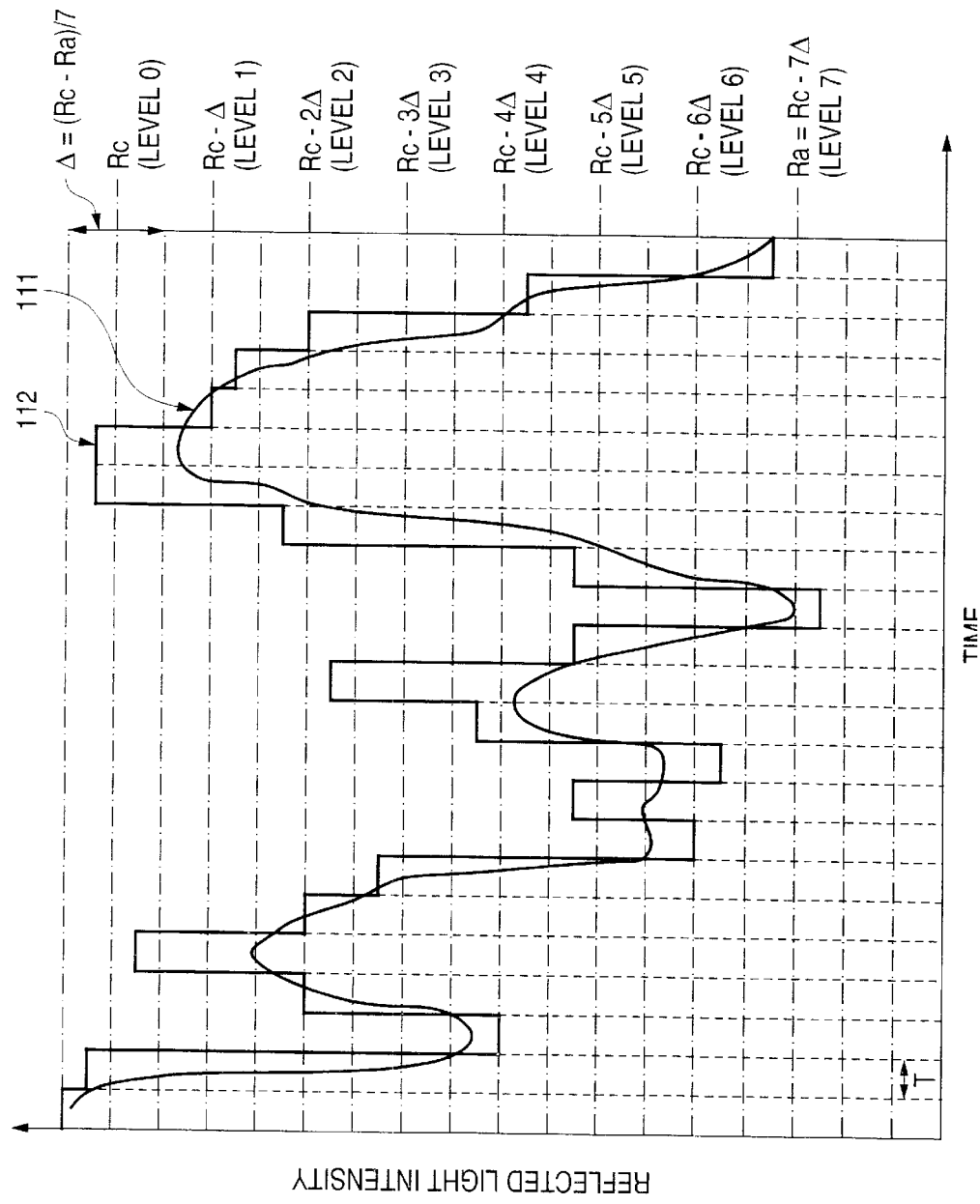
FIG. 11 is a schematic diagram showing a comparison between an example of actually reproduced signal waveform and a conceptual rectangular waveform.

The multilevel recording medium of this invention can be read by the already established multilevel recording/reproducing technology. The reflected light intensity generally is not represented as a perfect rectangular waveform as shown by a reference number 112 in FIG. 11 but, because of the the limit of optical resolution capability of the reading light beam, is represented as a dull waveform as indicated at 111. Even from such a dull waveform an original reflected light intensity level can be detected by passing the waveform through an appropriate reproducing circuit for correction, as is described in literatures (SPIE, Vol. 3109 (1997), pp8–14 and others)

After the optical dullness is corrected, the reflected light intensity levels are detected. Such a detecting method is basically identical to an analog-digital conversion method. The detail of the detection met-hod is found in JP-A 8-236693. The reproducing method wherein the length of one recording level section is less than the reading light beam diameter $r_b$ is described in U.S. Pat. No. 5,818,805.

The phase change medium for multilevel recording according to this invention has a recording layer that changes its phase between the crystalline state and the amorphous state A material selected for the recording layer preferably has a significant recrystallization capability during the resolidifying from the melted state. In particular, the suitable material should be such that the crystalline growth speed near the melting point is large and that the crystalline nucleus generation speed and the crystalline growth speed are slow at relatively low temperatures. The preferred material has a significant recrystallization capability such that, when the melted region of the recording layer is about the same size as the recording beam, the major portion of the melted region returns to the crystalline level by the recrystallization in this material, particularly when the recording power Pw strong enough to melt the recording layer is radiated continuously (in a manner like a DC current), the melted region substantially perfectly recrystallizes. Only when the off-power Pb, which heats the recording layer to a temperature well below the recrystallization temperature in a solid phase, is radiated following the recording power Pw, does the melted region turn into an amorphous state. Therefore, when only the cower Pw is emitted DC-wise, it can be verified that the reflected light intensity returns to substantially the same level as the unrecorded crystalline state.

In such a recording layer, it is preferred that the recrystallization from the melted state proceed substantially from the crystalline region by the crystalline growth.

Examples of materials for the recording layer include alloys containing Sb, especially eutectic alloys containing Sb. Particularly preferred materials are eutectic alloys containing Sb in excess of the eutectic point composition. More specifically, the material is based on a two-element alloy containing Sb in excess of the $Sb_{0.6}Te_{0.4}$ composition and includes as additive metals M, at least one of In, Ga, Zn, Ge, Sn, Si, Cu, Au, Ag, Pd, Pt, Pb, Bi, Cr, Co, O, S, N, Se, Ta, Nb, V, Zr, Hf and a rare earth metal Such a composition is typically expressed as $M_x(Sb_yTe_{1-y})_{1-x}$ ($0<x \leq 0.2$, $0.6 \leq y$). In this expression y preferably is in the range of $0.65 \leq y \leq 0.85$ and x is preferably in the range of 0.01 to 0.1. Too large x may induce a phase separation. Among the additive metals M listed above, Ag, In, Ga and Ge are p erred Of these, Ge is most preferred metal composition containing Ge, Sb and Te with Ge occupying 0.1 to 15 atomic percent of the total amount of additives Ge, Sb and Te is particularly preferred as it can enhance the stability over time of he amorphous state without impairing the high-speed recrystallization characteristic. Further, a composition containing Ge, Sb, Te, In and/or Ga, such as one expressed by $M'_\alpha Ge_\beta (Sb_yTe_{1-y})_{1-\alpha-\beta}$ (M' is In and/or Ga, $\alpha=0.001-0.1$, $\beta 0.001-0.15$, $\gamma=0.65-0.85$), is preferred as it can suppress noise of grain boundary.

A metal composition containing Ag, In, Sb and Te is also preferred because it has a low noise level. The element In has a capability of enhancing the time-elapse stability by raising the crystallization temperature. To provide a storage stability at room temperature, 3 or more atomic percent of In with respect to the total amount of Ag, In, Sb and Te is normally added. However, too much In will make the phase separation occur easily, causing a segregation as a result of repetitive overwriting. Hence, the normal content of In is 8 or less atomic percent. Ag has a capability of facilitating the initialization of the amorphous film immediately after the film is formed. Normally, its content is 10 or less atomic percent with respect to the above total of additives and too much Ag may degrade the time-elapse stability. It is preferred in suppressing the segregation during the repetitive overwritten that the content of Ag and In combined be set to 13 or less atomic percent of the above total amount.

A GeTe-Sb-Te-pseudo 2-element material, widely known as an overwritable phase change material of recording layer, has a crystallization temperature Tc of 150 to 200° C. and initiates recrystallization of an amorphous region only in the solid phase at a temperature above Tc but 50 to 100° C. lower than around the melting point (about 600° C.). In this material the recrystallization speed at around the melting point or during the melting/resolidifying process is very slow. Hence, in a medium using this material for the recording layer, the recrystallization of the amorphous mark will hardly proceed in many cases unless, after the amorphous mark has been formed, the energy beam is further radiated to heat the amorphous mark above the crystallization temperature in the solid phase but well below the melting point. It is also difficult to produce the amorphous mark shaped like an arrow feather as schematically illustrated in FIG. 26.

In this invention, the recording layer after being formed is normally in an amorphous state. Therefore, the entire surface of the recording layer is typically crystallized to provide an initialized state (unrecorded state). The above preferred recording layer has substantially no nucleus for crystalline growth immediately after the layer is formed, making it often difficult to crystallize the layer in a solid phase. But it can be initialized by the melting/recrystallization process. At this time, the time during which to melt the recording layer locally is preferably set to as short as about 1 millisecond or less. If the melted region is wide or the melted time or cooling time is too long, a part of the medium itself may be damaged or deformed.

To provide the recording layer with the thermal history described above, it is preferred that a high-power semiconductor laser beam with a wavelength of about 600 to 1000 nm, which is focused to a shape with a major axis of 100 to 300 $\mu$m and a minor axis of 1 to 3 $\mu$m, be radiated and scanned at a linear speed of 1 to 10 m/s with the minor axis oriented in the scanning direction. If the focused light beam is close to a circle, the melted region becomes too wide so that recrystallization will occur easily causing a greater damage to the medium.

The recording layer is normally 100 nm or less, preferably 30 nm or less, thick. Too thin a recording layer 3 makes it difficult to obtain a satisfactory contrast and tends to retard the recrystallization speed, which in turn renders the quick recording/erasing difficult. On the other hand, the recording layer is normally 1 nm or more, preferably 5 nm or more, thick. Too thick a recording layer makes it difficult to obtain an optical contrast and renders it more prone to crack.

Further, to gain a large contrast such that (Rc−Ra)/Rc $\geq$0.5, the practical thickness is particularly preferably in the range of 1–30 nm. To improve resistance against jitters at the mark ends and repetitive overwrite durability, the recording layer is most desirably set at 20 nm or less.

Further, the recording layer preferably has a bulk density $\rho$ of 80% or more, more preferably 90% or more. The bulk density referred to here may of course be measured by actually preparing a metal lump but it may be determined from the following equation (1).

$$\rho = \Sigma m_i \rho_i \tag{1}$$

(where mi is an atomic percent of a component i, and $\rho$i is an atomic weight of the component i).

To increase the density of the recording layer, it is preferred in the case of sputtering that the amount of high energy argon radiated against the recording layer be increased as by lowering the pressure of a sputter gas (rare gas such as Ar) during the deposition process or arranging a substrate close to the front of a target. The high energy Ar that reaches the substrate is either that part of the Ar ions radiated against the target for sputtering which is bounced toward the substrate, or Ar ions in plasma accelerated toward the substrate by the sheath voltage of the whole surface of the substrate. The effect of radiating such a high energy rare gas is called an atomic peening effect. In the sputtering of the commonly used Ar gas, the atomic peening effect causes Ar to penetrate into the sputtered film The atomic peening effect can be estimated by checking the amount of Ar in the film.

That is, a small amount of Ar means that the high-energy Ar radiation effect is small, making the formation of a coarse density film more likely. When the Ar amount is large, on the other hand, although the intense radiation of high-energy Ar increases the density, Ar trapped in the film precipitates in the form of voids during the repetitive overwriting, leading to a deteriorated durability for repetitive overwriting (J. Appl. Phys., Vol. 78 (1995), pp6980–6988).

An appropriate amount of Ar in the recording layer is 0.1–1.5 atomic percent. The use of a radio frequency sputtering is preferred over a DC sputtering as it reduces the incorporated Ar amount and produces a high-density film. Adding 0.1–5 atomic percent of O, N, S and Se at the same time allows a fine adjustment of the optical constants of the recording layer. However, the additive amount in excess of 5 atomic percent may lower the crystallization speed and degrade the erase performance.

Figure 10:
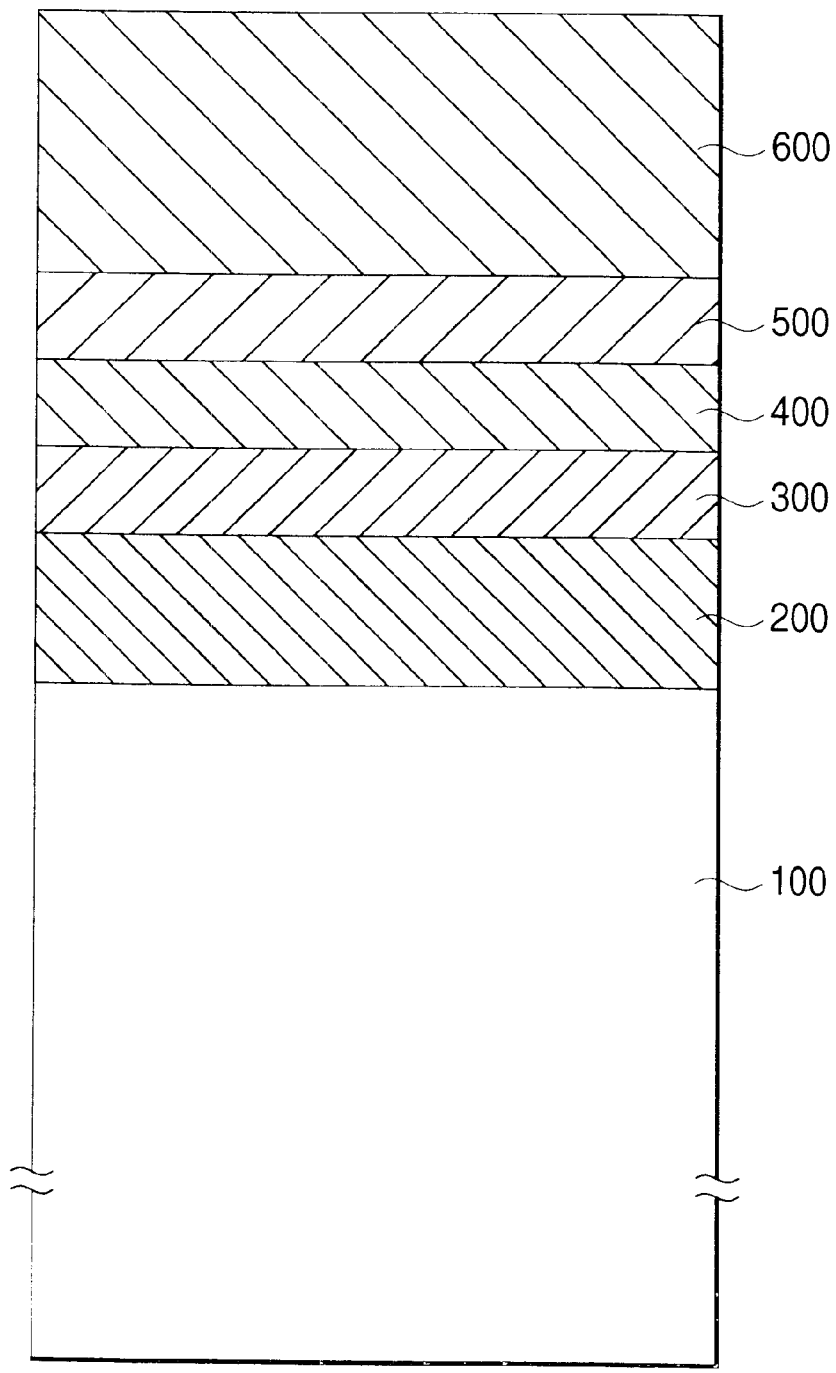
FIG. 10 is a schematic cross section showing an example layer structure in a medium of this invention.

An example of layer structure in a phase change medium used in this invention is described below. The recording layer is normally provided on the substrate. The substrates may use transparent resin such as polycarbonate, acrylic and polyolefin and a transparent glass. The polycarbonate resin is the most preferred because it is the most widely used on CD and inexpensive. More specifically, as shown in a schematic cross section of FIG. 10, the layer structure comprises a substrate 100, a lower protective layer (dielectric) 200, a recording layer 300, an upper protective layer (dielectric) 400, and a reflection layer 500. An ultraviolet curing or thermosetting resin or resin sheet (protective coat layer 600) is preferably coated over the layer structure.

The above construction is normally employed in a system where the read/write light beams are radiated through the substrate. It is also possible to use a layer structure in which the substrate is formed with the reflection layer, the lower protective layer, the recording layer and the upper protective layer in that order and finally with a protective coat normally about 0.1 $\mu$m to 0.1 mm thick over the upper protective layer. This structure is normally used in a system where the read/write light beams are radiated from the upper protective layer side.

The recording layer, the protective layer and the reflection layer are normally formed by sputtering. To prevent oxidation and contamination of the layers, the film making is preferably performed by using an in-line apparatus in which a recording film target, a protective film target and, if necessary, a reflection layer target are installed in the same vacuum chamber.

To prevent deformations due to high temperatures during recording, at least one of the surfaces, preferably both surfaces, of the recording layer is normally provided with a protective layer. Normally a reflection layer is provided for efficiently dissipating heat generated in the recording layer. That is, in a preferred layer structure, protective layers are provided over and below the recording layer and a reflection layer is arranged over that surface of one protective layer which is on the opposite side of the recording layer The protective layer between the recording layer and The reflection layer has a function of preventing the mutual diffusion of the recording layer and the reflection layer and efficiently releasing heat to the reflection layer while suppressing the deformation of the recording layer.

In this invention, a layer structure called a rapid-cooling structure is particularly preferred. With the rapid-cooling structure that can accelerate heat dissipation to enhance the cooling speed during the resolidifying of the recording layer, it is possible to realize a high erase ratio on the strength of the quick crystallization while avoiding the problem of recrystallization which is too excessive to be controlled. For this purpose, the film thickness between the recording layer and the reflection layer is normally set to 60 nm or less. Too thick a protective layer will increase the deformation due to the thermal expansion of the protective layer itself and a signal deterioration as a result of repetitive recording may become significant. When the protective layer is too thin, it is easily broken by its deformation during the melting of the recording layer and, due to an excessive heat dissipating effect, an unnecessarily large power is required for recording. The protective layer is therefore 5 nm or more thick.

The materials of the protective layer may generally be dielectrics made of oxides, sulfides, nitrides and carbides of metals or semiconductors with high transparency and high melting point, and fluorides of Ca, Mg, Li, etc., and mixtures of these. The protective layer preferably includes S atoms in the form of sulfides. More preferably, it is a composite dielectric made of a heat resistant compound which contains 50 to 90 mol % of ZnS, ZnO and $TaS_2$ or rare earth sulfides in the form of pure substance or mixture and has a melting point or decomposition point of 100° C. or higher. More specifically, the protective layer is preferably formed of a composite dielectric which contains 60 to 90 mol % of sulfides of rare earth elements such as La, Ce, Nd and Y. The contents of ZnS, ZnO or rare earth sulfides are preferably in the range of 70 to 90 mol %.

Examples of heat resistant compounds with a melting point or decomposition point of 1000° C. or higher which are mixed with the above compounds are oxides, nitrides and carbides of Mg, Ca, Sr, Y, La, Ce, Ho, Er, Yb, Ti, Zr, Hf, V, Nb, Ta, Zn, Al, Si, Ge and Pb, and fluorides of Ca, Mg and Li. Materials to be mixed with ZnO are preferably sulfides, or mixtures of sulfides and oxides, of rare earth elements such as Y, La, Ce and Nd. These oxides, sulfides, nitrides, carbides and fluorides need not take stoichiometric compositions and it is effective to control or mix the compositions for the control of refractive index.

Considering the repetitive recording characteristic, the density of the protective layer is preferably 80% or more of that of the bulk state from the standpoint of the mechanical strength (Thin Solid Films, No. 278 Vol. (1996), pp74–81). When a mixture dielectric thin film is to be used, a theoretical density defined by the next equation (1) is used as the bulk density ρ.

$$\rho = \Sigma m_i \rho_i \quad (1)$$

(mi: molar concentration; ρi: single bulk density).

The material of the reflection layer is preferably an alloy comprising Al, Ag or Au mainly. A particularly preferred material is an Al alloy or Ag alloy. These metals have high thermal conductivity and can effectively take heat from the recording layer through the protective layer and increase the cooling speed during the resolidifying of the recording layer to a level high enough to form amorphous marks. Further, in a layer structure combining the upper and lower protective layers and the recording layer, these metals are effective in increasing the modulation by the optical multiple interference effect because their reflected light intensities are high. The heat dissipating effect is defined by the film thickness and the thermal conductivity. The thermal conductivity of a thin reflection layer is often one or two orders of magnitude smaller than that of the bulk state and is also difficult to measure Thus, a sheet resistivity in which is easy to measure may be used as a criterion for the heat dissipating effect. The sheet resistivity is a volume resistivity characteristic of the material divided by the thickness of the film.

Because the volume resistivity is considered to be substantially inversely proportional to the thermal conductivity, the value obtained by dividing the volume resistivity by the film thickness is considered to be proportional to the thermal conductivity multiplied by the film thickness and can be used to directly evaluate the heat dissipating effect of the reflection layer. In this invention, it is desired to enhance the heat dissipating effect of the layer is preferably reduced. The sheet resistivity is normally in the range of 0.1 to 0.6 Ω/□.

Examples of preferable aluminum alloys that can be used for the reflection layer are aluminum alloys containing 0.2–2 atomic percent of at least one additive element selected from Ta, Ti, Co, Cr, Si, Sc, Hf, Pd, Pt, Mg, Zr, Mo, and Mn. These alloys have a volume resistivity that increases in proportion to thee concentration of the added element and are known to improve the hillock resistance (Nihon Kinzoku Gakkai Journal, Vol. 59 (1995), P673–676 and J. Vac. Sci. Tech., A14 (1996), pp.2728–2733). When the amount of the added element is less than 0.2 atomic percent, the hillock resistance is often not sufficient. When it is greater than 2 atomic percents, a high thermal conductivity necessary for the formation of the amorphous mark may not be obtained.

To enhance the time-elapse stability the additive element is preferably Ta. When the reflection layer is in contact with the protective layer containing ZnS in particular, an AlTa alloy containing 0.5 to 0.8 atomic percent of Ta is preferred because it meets all the requirements of corrosion resistance, intimate contact and high thermal conductivity with good balance. When Ta is used, its addition of only 0.5 atomic percent produces a preferable effect of raising the deposition rate by 30 to 40% compared with the pure Al and Al-Mg-Si alloy.

When the above Al alloy is used as the reflection layer, a preferred thickness is 50 to 300 nm. When the film thickness is too small, to be a pure Al cannot produce a sufficient heat dissipating effect. When it is too thick, heat escapes in a vertical direction rather than in a horizontal direction, and this does not contribute to an improvement of the heat distribution in the horizontal direction. Another problem of the too large thickness is that the heat capacity of the reflection layer itself is large, retarding the cooling speed of the recording layer, which may in turn block the formation of the amorphous marks.

Examples of preferred Ag alloys that can be used for the reflection layer are Ag alloys that contain 0.2 to 5 atomic percents of at least one additive element selected from Ti, V, Ta, Nb, W, Co, Cr, Si, Ge, Sn, Sc, Hf, Pd, Rh, Au, Pt, Mg, Zr, Mo and Mn. Preferred additive elements for enhancing the time-elapse stability are Ti, Mg and Pd.

When the above Ag alloys are used as the reflection layer, a preferred thickness is 20–150 nm. When the film thickness is too small, even a pure Ag cannot produce a sufficient heat dissipating effect. When it is too thick, heat escapes in a vertical direction rather than in a horizontal direction, and this does not contribute to an improvement of the heat distribution in the horizontal direction. Furthermore, an unnecessarily thick film lowers productivity.

The additive elements to Al and the additive elements to Ag increase the volume resistivity in proportion to the additive element concentrations. Addition of impurities is generally considered to reduce the crystalline growth sizes to increase the electron scattering at the grain boundary and thus reduce the thermal conductivity. Adjusting the amount of impurities added is effective in securing a high thermal conductivity inherent in the material itself by increasing the crystalline growth size.

The reflection layer is normally formed by sputtering and vacuum evaporation. It is preferred that even after and oxygen that are mixed during deposition process be included in the total impurity amount in addition to the impurities of the target and the deposition material themselves and that the total impurity amount be set to 2 atomic percents or less. For this purpose, the ultimate pressure in the process chamber is preferably set to $1 \times 10^{-3}$ Pa or less.

Although the impurity amount is preferably set small to obtain a high thermal conductivity as described above, because the pure metal such as Al and Ag tends to provide insufficient Swag corrosion resistance and hillock resistance, a balance of these factors should be considered in determining the optimum composition.

To obtain a higher heat conductivity and reliability, it is effective to form the reflection layer in a multiple layers. In this case, at least one layer is preferably formed of the Al alloy, Ag alloy or Au alloy to work virtually as a heat dissipating layer, with other layers used to improve the corrosion resistance, the intimate contact with the protective layer and the hillock resistance. In this case, the thickness of the at least one layer is preferably 50% or more of the entire thickness of the reflection layer.

Ag, which has the highest thermal conductivity and the lowest volume resistivity among the metals, does rot interface well with the protective layer containing S and has tendencies that deterioration of the reflection layer caused by repetitive overwriting is somewhat fast and that the reflection layer easily corrodes under an accelerated test environment at high temperature and high humidity. Thus, a preferred multilayer reflection layer may advantageously use the Ag and provide a layer formed mainly of Al as an interface layer between the Ag layer and the protective layer. The Al alloy may be similar to the one described above.

When the interface layer is too thick, the protective effect may become insufficient. When it is too thin, the heat dissipating effect may be insufficient. Hence, the interface layer thickness is preferably in the range of 5 to 100 nm. Further, when a multilayer reflection layer is formed of an Ag alloy and an Al alloy, because Ag and Al relatively easily diffuse into each other, the Al surface should preferably be oxidized to provide an interface oxidized layer. If the interface oxidized layer is too thick, it produces a thermal resistance and may impair the heat dissipating capability. Hence, the thickness of the interface oxidized layer is normally 10 nm or less, preferably 5 nm or less.

Forming the reflection layer in a multilayer structure is effective in combining a material with a high volume resistivity and a material with a low volume resistivity to produce a desired sheet resistivity for a desired layer thickness. When the volume resistivity is to be adjusted by using an alloy, it may raise the target manufacturing cost and the material cost ratio of the medium. For example, combining a pure Al or Ag layer and the above-described additive element layer in a multilayer structure is also an effective method for obtaining a desired volume resistivity. This may be able to limit the medium cost.

The medium of this invention is not limited in terms of shape and it may be formed in a rectangular card or a circular disc. For reading and writing, the write energy beam and the read energy beam are required to move relative to the medium. If the medium is shaped like a disc, this relative motion can easily be accomplished by rotating the medium. In this way, the light intensity is modulated while moving the write beam to form a series of amorphous marks.

The present invention will be described in further detail by referring to the examples. It is noted that this invention is not limited to the following examples as long as the spirit of the invention is not exceeded.

EXAMPLE 1

An injection-molded polycarbonate resin substrate 1.2 mm thick, having a tracking groove with a track pitch of 1.6 $\mu$m, a groove width of 0.5 $\mu$m and a groove depth of 37 nm, was sputtered successively with a lower protective layer 110 nm thick made of $(ZnS)_{85}(SiO_2)_{15}$, a phase change recording layer 17 nm thick made of $Ag_5In_5Sb_{61}Te_{29}$, an upper protective layer 46 nm thick made of $(ZnS)_{80}(SiO_2)_{20}$, and a reflection layer 220 nm thick made of $Al_{99.5}Ta_{0.5}$ by sputtering. An ultraviolet curing resin was applied by the spin coat method over the reflection layer to a thickness of 4 $\mu$m to form a protective layer. Then, a semiconductor laser beam focused to a spot with a major axis of about 70$\mu$m and a minor axis of about 1 $\mu$m and having a wavelength of about 830 nm was radiated and scanned over the recording layer in the minor axis direction at a linear speed of 2.5 m/s to crystallize (initialize) the recording layer.

For the read/write evaluation, a DDU1000 tester of Pulstec Industrial Co., Ltd. (laser wavelength of 780 nm, NA=0.55) was used to write into and read from the grooves at a linear speed of 2.4 m/s. The spot of the laser beam on the recording layer surface was an ellipse 1.27 $\mu$m long in the scanning direction and 1.23 $\mu$m wide in a direction perpendicular to the scanning direction. A level 0 represented by the maximum reflected light intensity was taken as an erase level (crystalline state). The recording level was successively changed from the level 0 to shift the reflected light intensity toward lower levels, thus performing an 8-step multilevel modulation from level 0 to level 7.

The level 0 was produced as a crystalline level by radiating a laser beam with an erase power Pe=6.5 mW. Other levels were produced by changing a radiation pattern such as shown in FIG. 7(a) by using a recording cower Pw=3 mW and a bias power Pb=0.8 mW. A pulse width Tw during which to radiate a laser with the recording power of 18 mW and a pulse width Tb during which to radiate a laser with the bias power Pb were changed according to the level as shown in Table 1. The length of the recording level section T was set substantially constant at 1 $\mu$s (mark length: 2.4 $\mu$M). As for the number of recording pulse sections and the interrupt pulse sections, Tw and Tb were e combined and counted as one set and the number of sets N was adjusted in the range of about 14–50 so that N(Tw+Tb) was nearly 1 $\mu$s.

TABLE 1

| Level No. | Tw (ns) | Tb (ns) |
|---|---|---|
| 0 | — | — |
| 1 | 10 | 10 |
| 2 | 25 | 15 |
| 3 | 20 | 15 |
| 4 | 15 | 15 |
| 5 | 20 | 20 |
| 6 | 25 | 25 |
| 7 | 35 | 35 |

Figure 12:
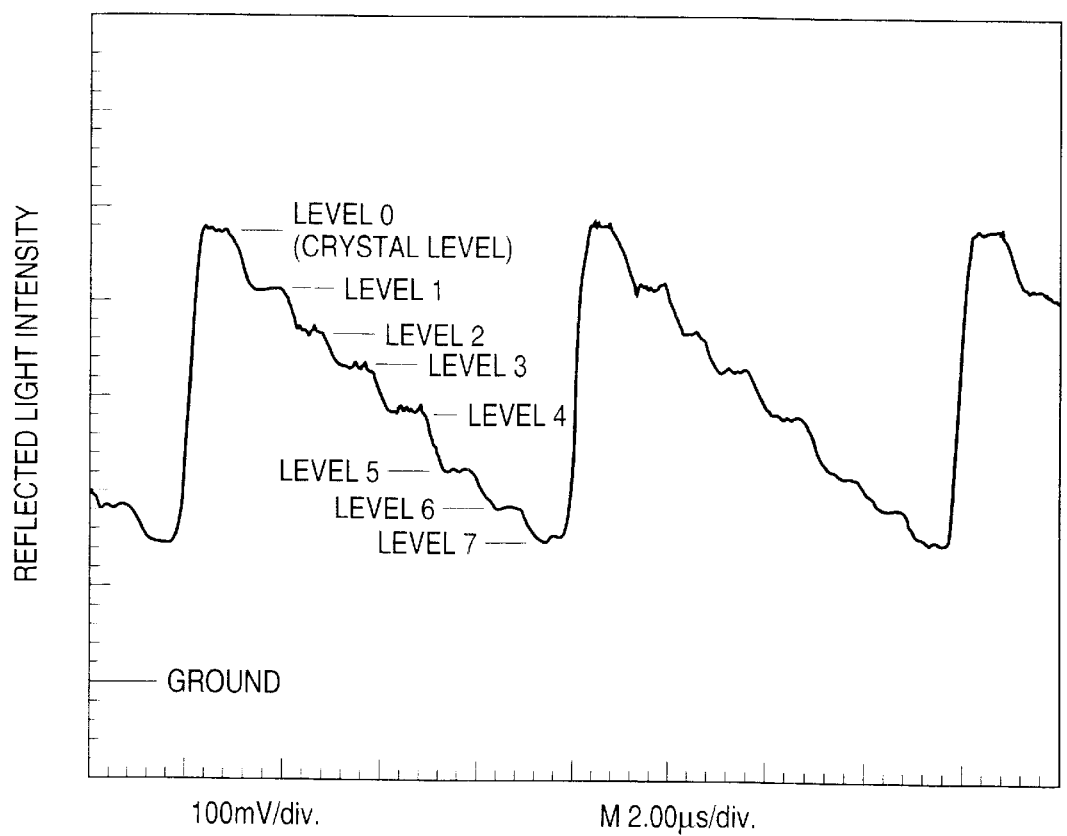
FIG. 12 is a diagram showing a reproduced waveform obtained in Example 1.
Figure 13:
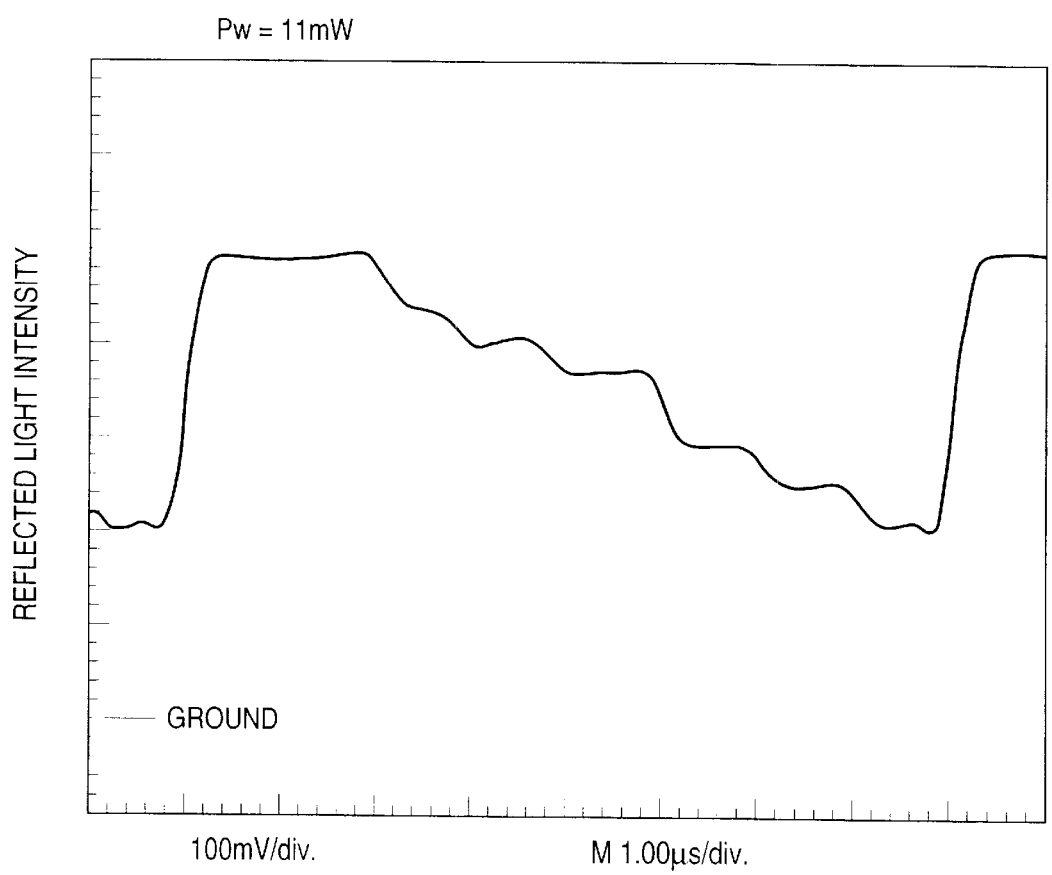
FIG. 13 is a diagram showing a reproduced waveform obtained in Example 1 (Pw=11 mW).
Figure 14:
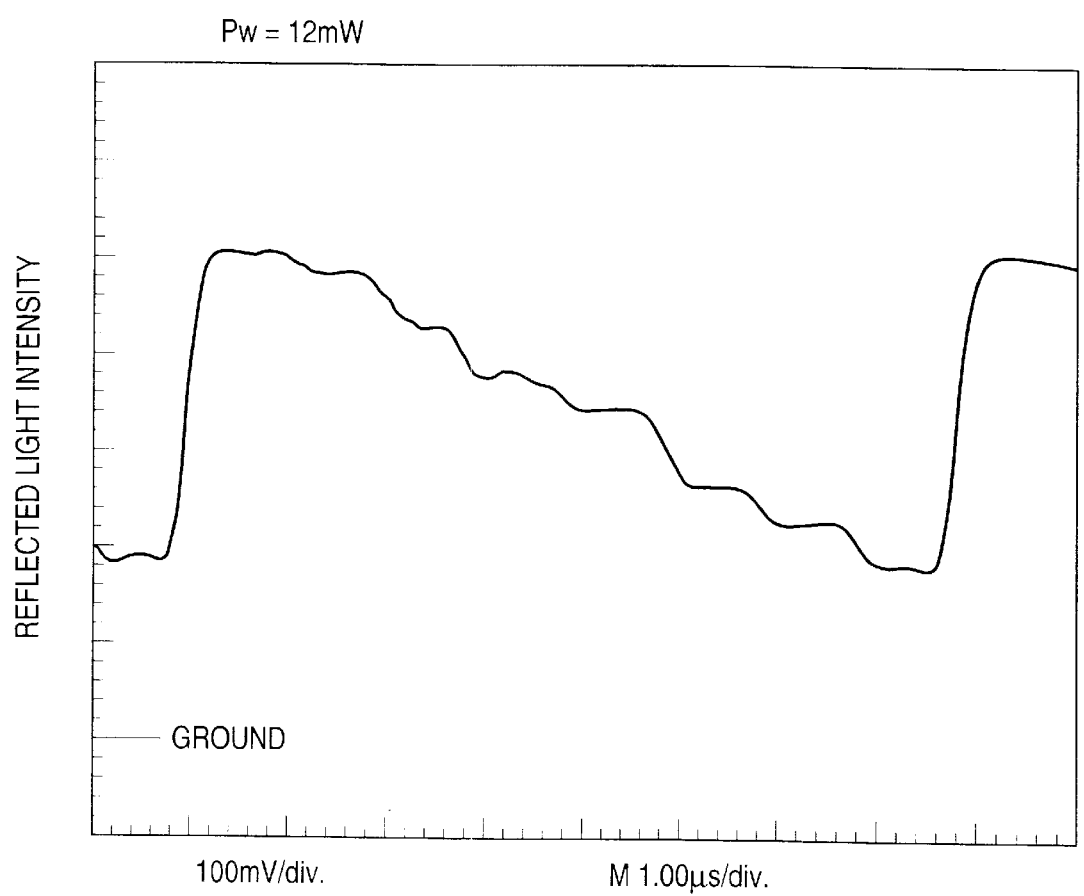
FIG. 14 is a diagram showing a reproduced waveform obtained in Example 1 (Pw=12 mW).
Figure 15:
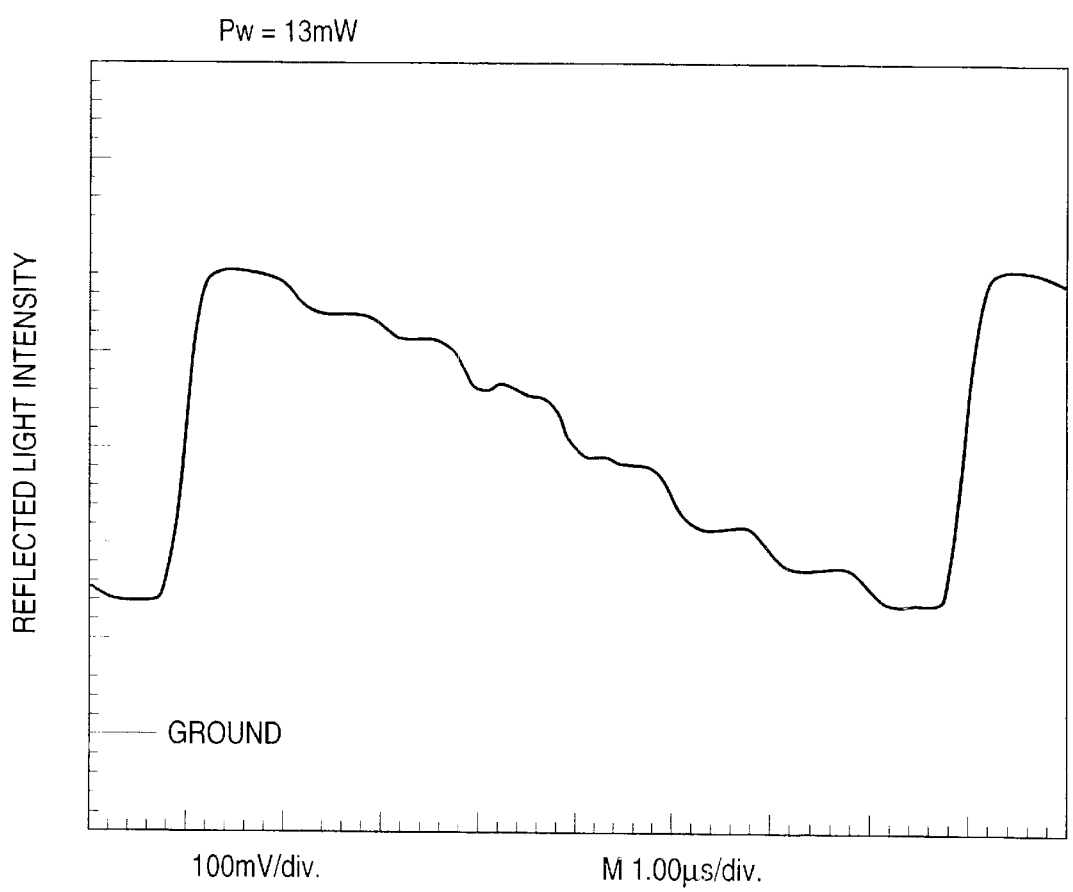
FIG. 15 is a diagram showing a reproduced waveform obtained in Example 1 (Pw=14 mW).
Figure 16:
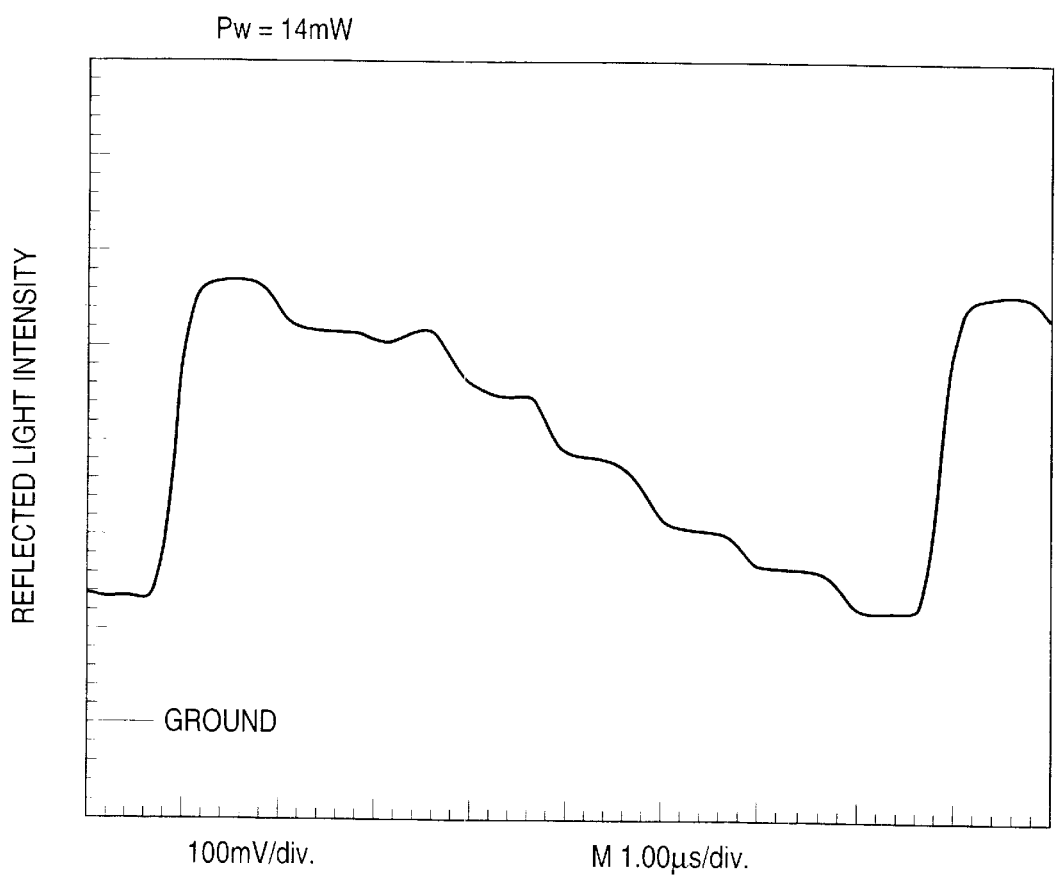
Figure 17:
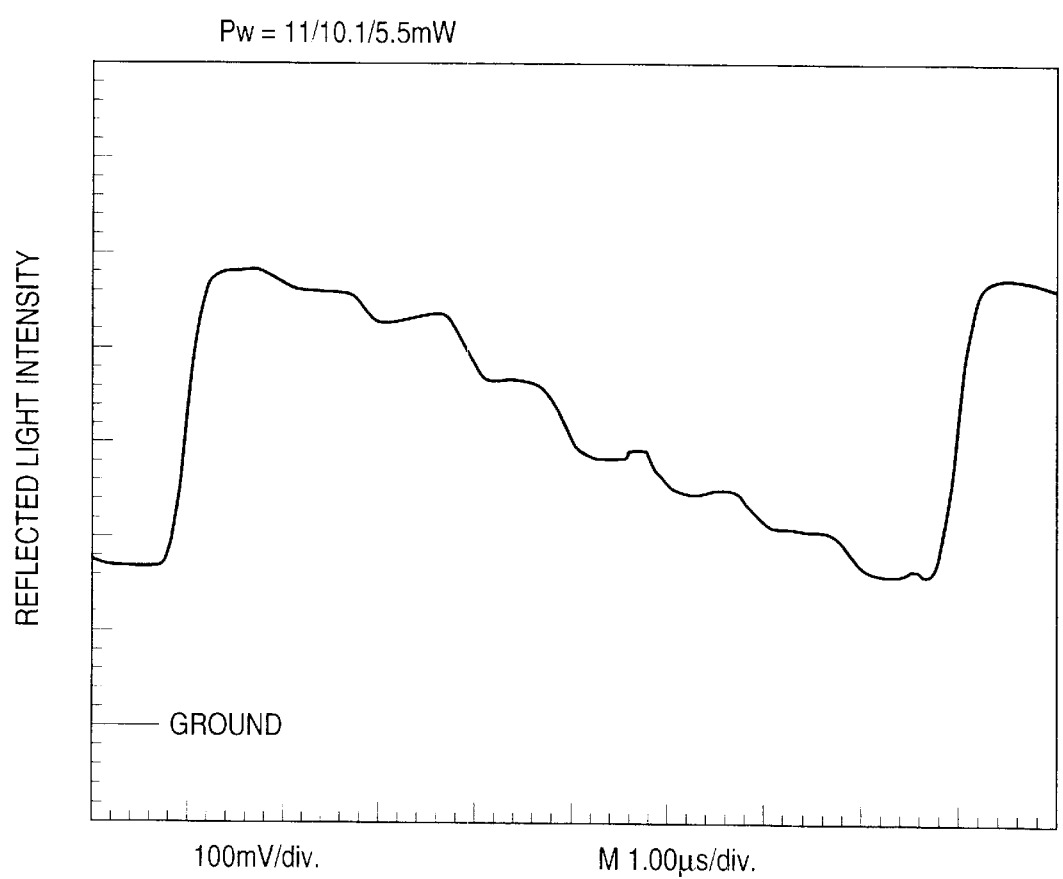
FIG. 17 is a diagram showing a reproduced waveform obtained in another example of Example 1 (Pw=11/10.1/5.5 mW).
Figure 18:
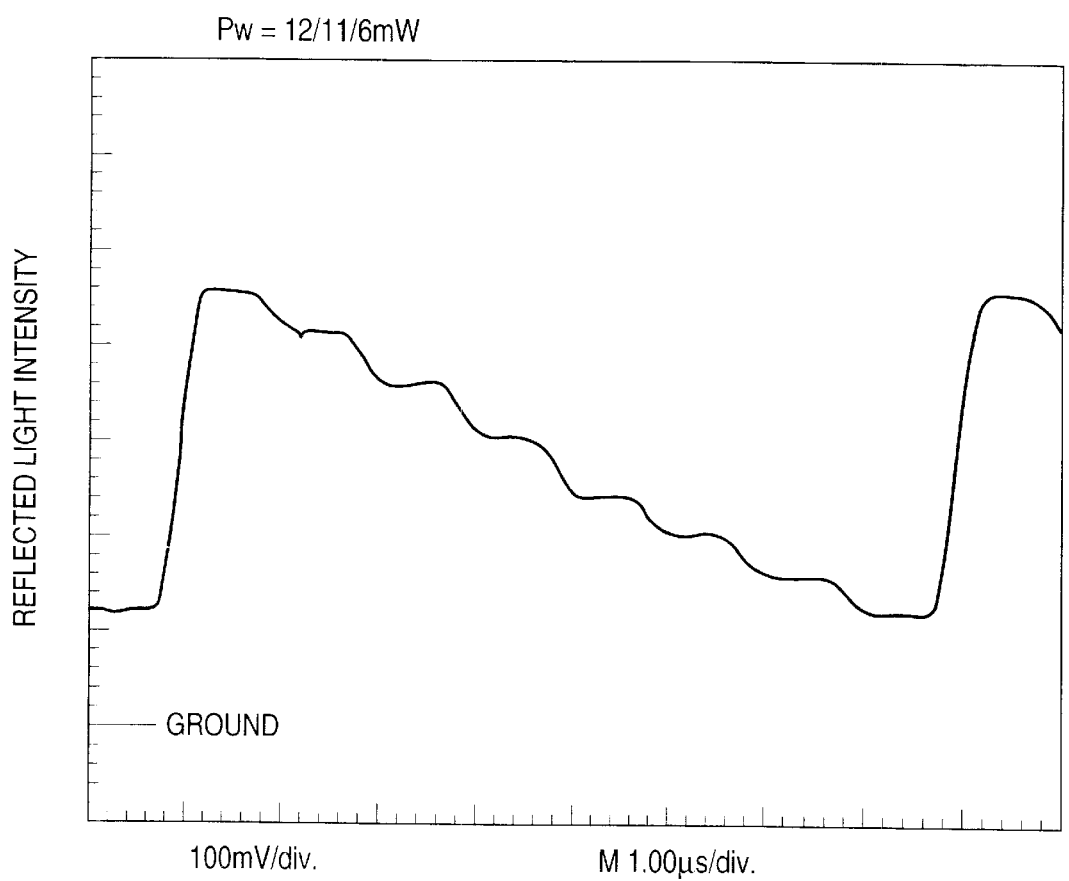
FIG. 18 is a diagram showing a reproduced waveform obtained in another example of Example 1 (Pw=12/11/6 mW).
Figure 19:
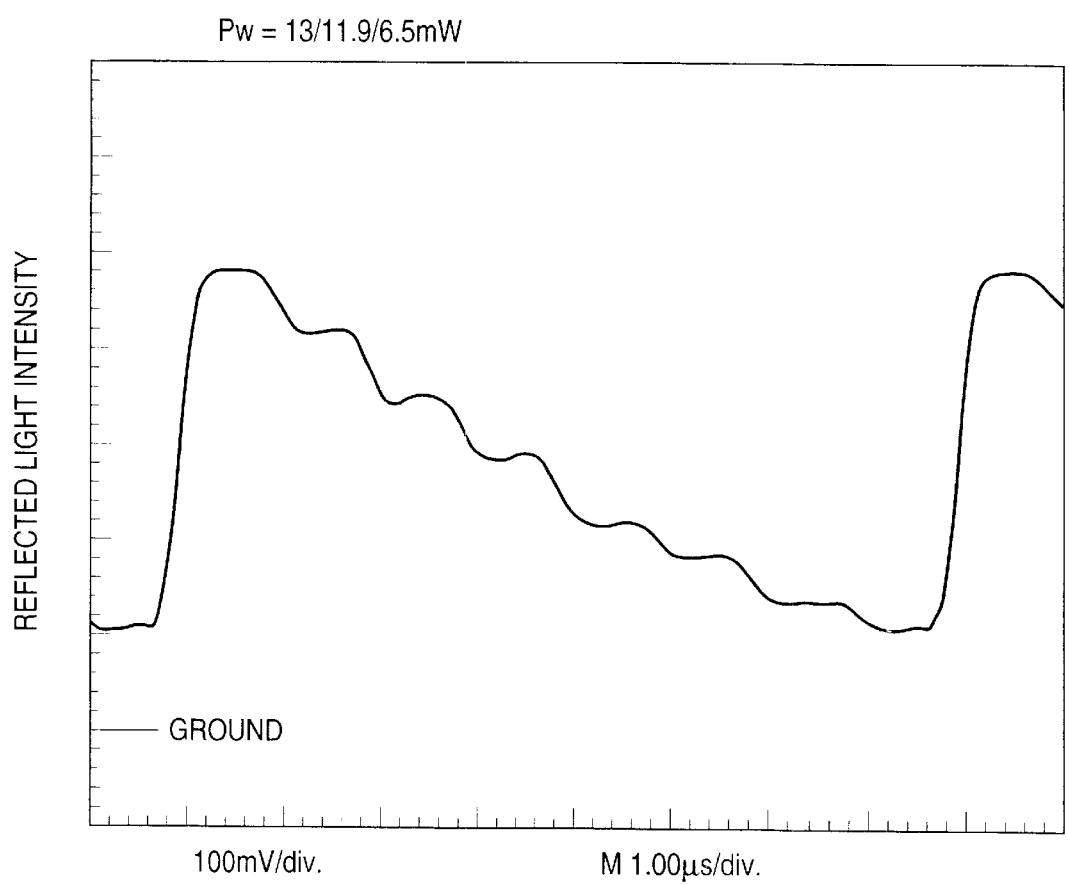
FIG. 19 is a diagram showing a reproduced waveform obtained in another example of Example 1 (Pw=13/11.9/6.5 mW).
Figure 20:
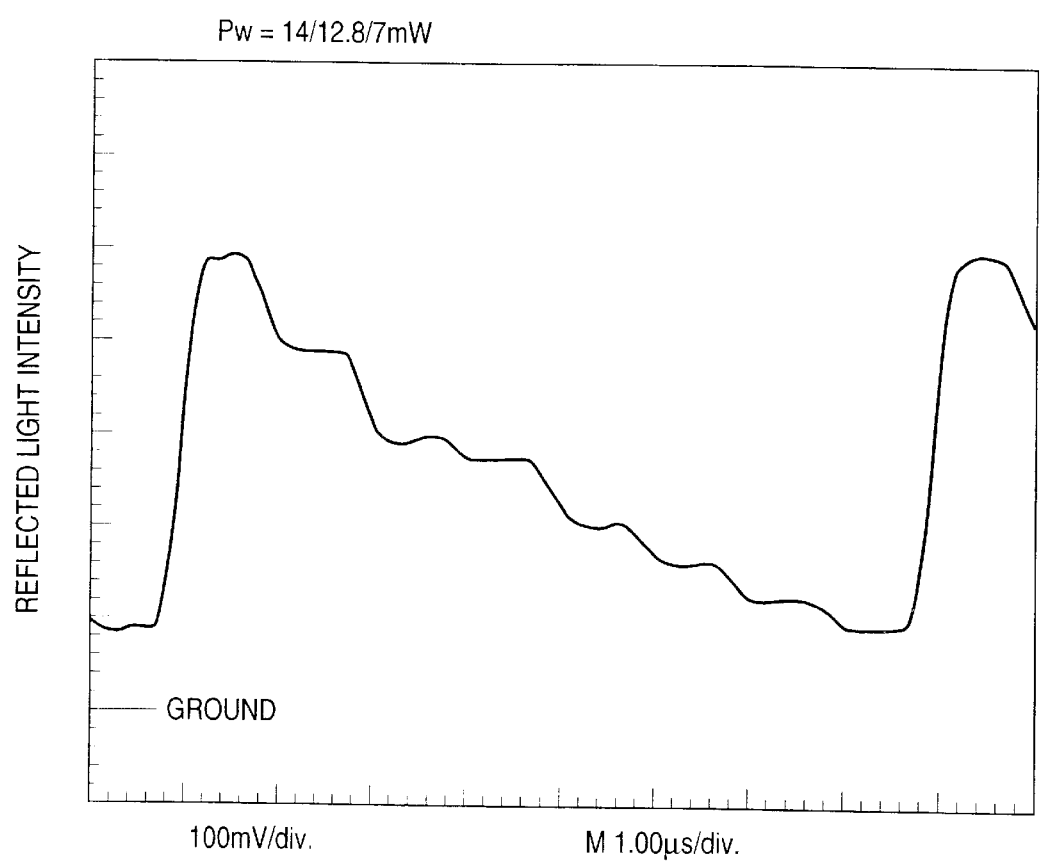
FIG. 20 is a diagram showing a reproduced waveform obtained in another example of Example 1 (Pw=14/12.8/7 mW).
Figure 21:
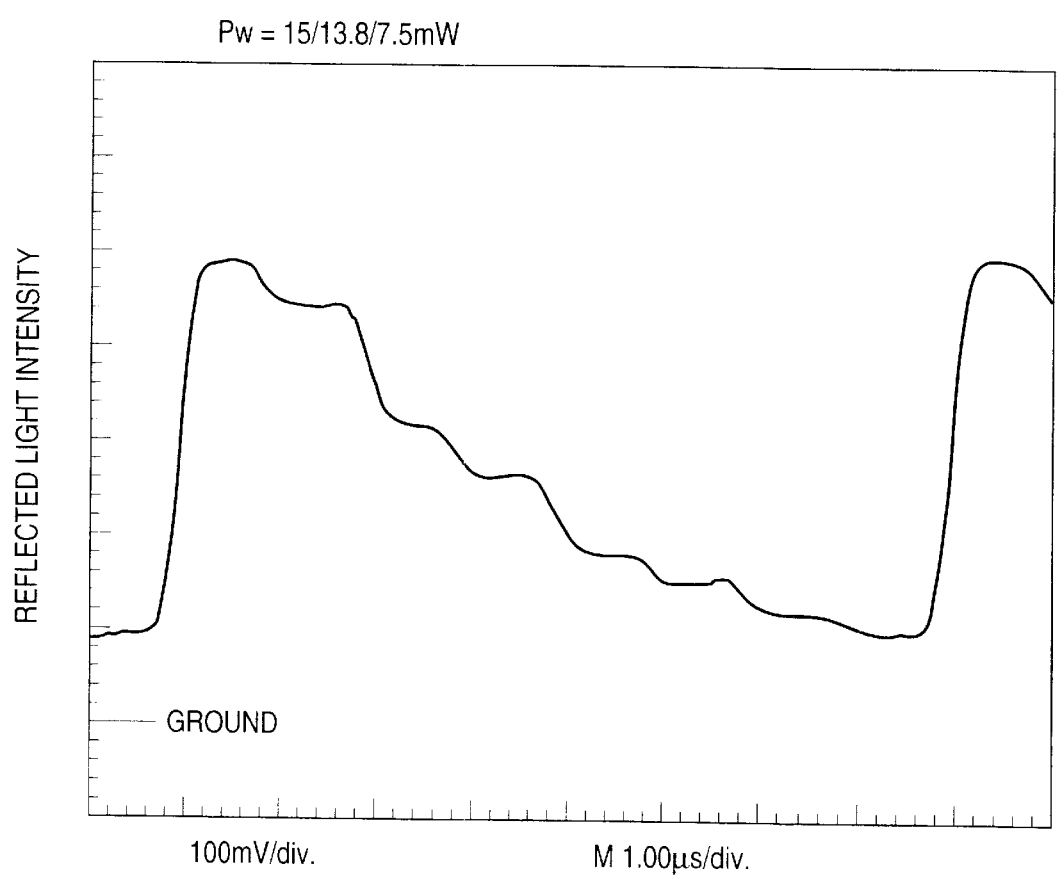
FIG. 21 is a diagram showing a reproduced waveform obtained in another example of Example 1 (Pw=15/13.8/7.5 mW).

FIG. 12 shows a reproduced waveform obtained from the above.

As shown in FIG. 12, 8-valued recording levels from level 0 corresponding to Rc to level 7 corresponding to Ra were observed in an orderly manner. This waveform was obtained after 10 overwrites.

The recording layer that was recorded in this manner was peeled off and observed with transmission electron microscope. It was found than an amorphous mark ran in the scanning direction without interruption, with the width of the amorphous mark changing every about 2.4 $\mu$m, which corresponded to one recording level section T. The observation also found that the amorphous mark and a polycrystalline region were clearly separated and that they were not a mixture of the amorphous and polycrystalline states.

While maintaining the pulse division method of Table 1, the recording pulse power Pw was changed and the similarly reproduced waveform was observed. The results are shown in FIGS. 13 to 16. In the case of Pw=13 mW (FIG. 15), 8 levels were clearly observed. When Pw=11 mW (FIG. 13) Pw=12 mW1 (FIG. 14) and Pw=14 mW (FIG. 16), it is seen that the waveform is distorted near Rc or Ra rendering the distinction between the adjacent levels unclear. The closer to the level 0, the larger the ratio of the recrystallized region becomes and the larger the variations are. Next, the recording power for the level 1 and level 2 was taken as $Pw_1$, the recording power for the level 3 to level 7 as $Pw_2$, and the recording (erasing) power for level 0 as Pe. They were set constant such that $Pw_2/Pw_1=12/11$ and $Pe/Pw_2=0$. and the pulse division method of Table 1 was used to change one recording power. The reproduced waveforms thus obtained are shown in FIGS. 17 to 21. As indicated by the caption of each figure, the $Pw_1/Pw_2$ and Pe for recording beam used in each example are: 11/0.1/5.5, 12/11/6,13/11.9/6.5, 14/12.8/7, and 15/13.8/7.5 ($Pw_1/Pw_2$/Pe in mW). These figures show that, compared with the waveforms of FIGS. 13–16, clearly defined 8-value levels are maintained in a wider range ($Pw_2=12$ to 14 mW) for changes in Pw.

When any of the Pw values used in Example 1 was radiated DC-wise against the medium, the reflected light intensity obtained was substantially equal to that of the initial unrecorded crystalline state because of the recrystallization after melting. Here, the expression "substantially equal" means that the reflected light intensities agree within a range of ±30%.

EXAMPLE 2

An injection-molded polycarbonate resin substrate 0.6 mm thick, having a tracking groove with a track pitch of 0.74 μm, a groove width of 0.3 μm and a groove depth of 35 nm, was sputtered successively with a lower protective layer 64 nm thick made of $(ZnS)_{80}(SiO_2)_{20}$, a phase change recording layer 18 nm thick made of $Ge_5Sb_{69}Te_{26}$, an upper protective layer 20 nm thick made of $(ZnS)_{85}(SiO_2)_{15}$, and a reflection layer 200 nm thick made of $Al_{99.5}Ta_{0.5}$. An ultraviolet curing resin was applied by the spin coat method over the reflection layer to a thickness of 4 μm to form a protective layer. Another substrate 0.6 mm thick with a similar layer structure was prepared and the two substrates were bonded together, with the recording layer surfaces disposed, inside, by using a retarded ultraviolet curing adhesive (Sony Chemical SK7000) Then, a semi-conductor laser beam focused to a spot with a major axis of about μm and a minor axis of about 1 μm and having a wavelength of about 830 nm was radiated and scanned over the both recording layers in the minor axis direction at a linear speed of 2.5 m/s to crystallize (initialize) the recording layers.

For the read/write evaluation, a DDU1000 tester produced by Pulstec Industrial Co., Ltd. (laser wavelength of 637 nm, NA=0.63) was used to write into and read from the grooves at a linear speed of 2.4 m/s. The laser beam spot on the recording layer surface was 0.87 μm wide both in the scanning direction and in a direction perpendicular to the scanning direction. A level 0 was taken as an erase level (crystalline state). The recording level was successively changed from the level 0 to shift the reflected light intensity toward lower levels, thus performing an 8-step multilevel modulation from level 0 to level 7.

The level 0 was produced as a crystalline level by radiating a laser beam with an erase power Pe=6.0 mW. Other levels were produced by changing a radiation pattern such as shown in FIG. 7(a) according to the pulse division method of Table 2. That is, the recording power was set to Pw=9.7 mW for levels 2, 2, 3 and 4 and Pw=13 mW for levels 6 and 7, and a bias cower was set to Pb=0.5 mW for all levels. The length T of the recording level section was set substantially constant at 400 nm (mark length: 0.96 μm). As for the number of recording pulse sections and the interrupt pulse sections, Tw and Tb were combined and counted as one set and the number of sets N was adjusted in the range of about 7–14 so that N (Tw+Tb) was nearly 400 ns.

TABLE 2

| Level No. | Tw (ns) | Tb (ns) |
|---|---|---|
| 0 | — | — |
| 1 | 15 | 15 |
| 2 | 20 | 20 |
| 3 | 25 | 25 |
| 4 | 30 | 30 |
| 5 | 15 | 15 |
| 6 | 20 | 20 |
| 7 | 30 | 30 |

Figure 22:
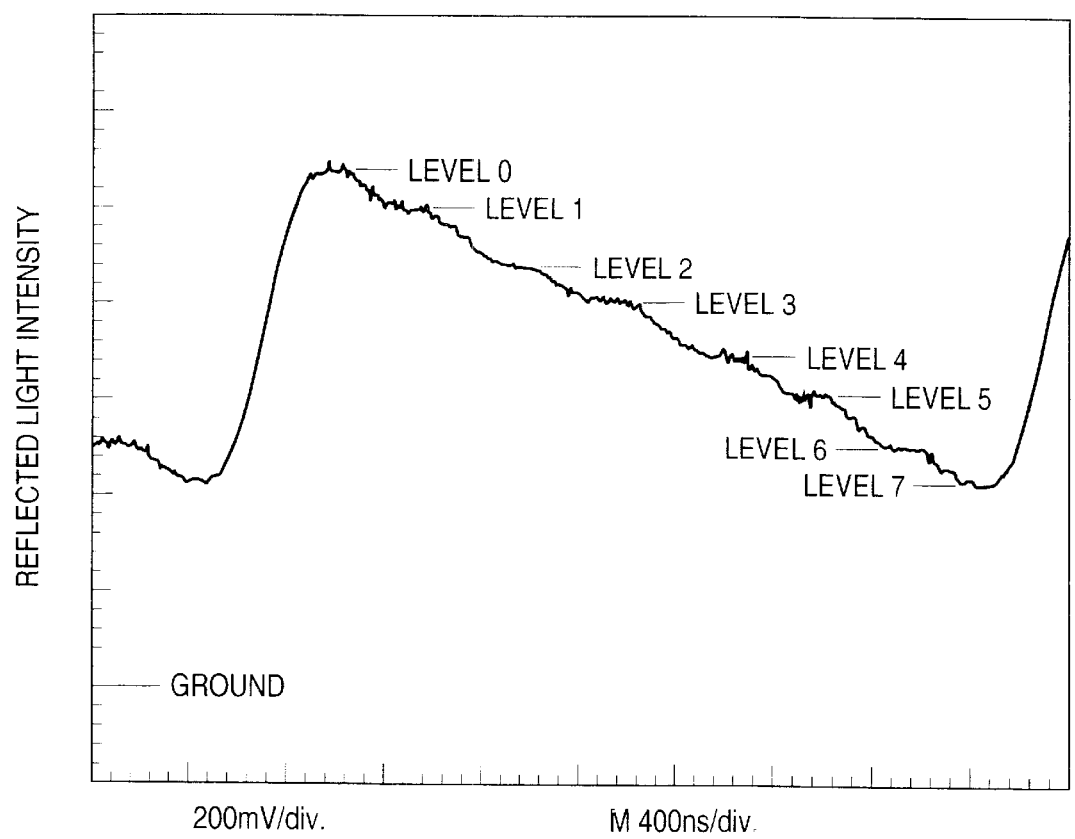
FIG. 22 is a diagram showing a reproduced waveform obtained in Example 2.

FIG. 22 shows a reproduced waveform obtained from the above.

As shown in FIG. 22, 8-valued recording levels from level 0 corresponding to Rc to level 7 corresponding to Ra were observed in an orderly manner. This waveform was obtained after 10 overwrites.

When any of the Pw values used in Example 2 was radiated DC-wise against the medium, the reflected light intensity obtained was substantially equal to that of the initial unrecorded crystalline state because of the recrystallization after melting.

Here, the expression "substantially equal" means that the reflected light intensities agree within a range of ±30%.

EXAMPLE 3

This example will show that the recording medium and the recording method actively utilize the recrystallization during the melting/resolidifying process of the recording layer and that the area of an amorphous mark is controlled by the competition between the recrystallization process and the amorphization process in the resolidifying process when, forming the amorphous marks.

An injection-molded polycarbonate resin substrate 1.2 mm thick, having a tracking groove with a track pitch of 1.6 μm, a groove width of 0.5 μm and a groove depth of 37 nm, was sputtered successively with a lower protective layer 92 nm thick made of $(ZnS)_{80}(SiO_2)_{20}$, a phase change recording layer 19 nm thick made of $In_8Ge_5Sb_{64}Te_{23}$, an upper protective layer 35 nm thick made of $(ZnS)\, 80\, (SiO_2)_{20}$, and a reflection layer 250 nm thick made of $Al_{99.5}Ta_{0.5}$. An ultraviolet curing resin was applied by the spin coat method over the reflection layer to a thickness of 4 μm to form a protective layer. Then, a semiconductor laser beam focused to a spot with a major axis of about 70 μm and a minor axis of about 1 μm and having a wavelength of about 830 nm and a power of about 700 mW was radiated over the recording layer through the substrate while moving the beam at about 3 nm/s to crystallize (initialize) the recording layer. The reflected light intensity of the initial crystallized state was substantially equal to that obtained when the recording layer was melted and recrystallized by the following tester. In practice, the recording layer, after being melted, was recrystallized and initialized during the resolidifying process. The sheet resistivity of the reflection layer was 0.5 Ω/□. The measurement of the resistivity was made using toresza MP produced by Dia Instruments Co., Ltd. The measurement method complies with JIS K7194.

For the read/write evaluation, a DDU1000 tester produced by Pulstec Industrial Co., Ltd. (wavelength of 780 nm, NA=0.55) was used for writing and reading at a linear speed of 4.8 m/s. A laser as a light source with a wavelength of about 780 nm is focused by a lens of NA=0.55 and radiated over the recording layer surface through the substrate. A spot of the focused light beam is 1.27 $\mu$m long in the groove direction and 1.23$\mu$m wide in the direction perpendicular to the groove (radial direction).

The recording power Pw was radiated DC-wise on to the medium. A tracking servo was activated to radiate the focused light beam on a groove continuously formed on a disc at a radial position 30–50 mm from a center. At the same time the Pw was set constant while the disc completes one turn and the focused light beam was moved relative to the disc at a linear speed of 4.8 m/s. Pw, when viewed from the beam diameter, is radiated continuously for a substantially infinite length. At only one point the recording power was interrupted and lowered to Pb=0.8 mW for a duration of Tb. The power Pb is sufficiently small so that the recording layer is heated only to a temperature well below the crystallization temperature in a solid phase. The reading light power was set to 0.3 mW which is the same as Pb.

FIGS. 27–32, 33–38 and 41–46 show radiation patterns and variations of the reflected light intensity. The horizontal line represents a time axis. A lower half of the ordinate represents a timing signal for switching the radiated laser power from Pw to Pb and an upper half represents an output voltage proportional to the intensity of the reproduced reflected light. When the timing signal level is low, Pb is radiated; and when it is high, Pw is radiated. It should be noted here that although the radiation of the recording power/bias power and the reading based on the reproduced light are not performed simultaneously, the reproduced waveform is synchronized with the bias power Pb radiated position. Hence, a change in the recording layer caused by radiating the light beam of power Pb for a duration Tb is detected synchronously as a change in the reproduced, reflected light intensity.

FIGS. 27–32 show radiation patterns and reflected light intensities when the power is instantaneously reduced at one position from Pw to Pb with the bias power Pb radiated thereafter. FIGS. 33–38 show radiation patterns and reflected light intensities when Pw is changed with Tb kept constant at Tb=200 nsec. Here the time taken to switch the popover from Pw to Pb, the rise time of the laser beam power, shorter than about 2 ns and thus the switching can be deemed to be performed substantially instantly. FIGS. 27–32 and FIGS. 33–38 each correspond to Pw=7, 8, 10, 12, 14 and 16 mW in that order. In either case, only when Pw is 8 mW or higher, is a reduction in the reflected light intensity due to the amorphous state formation observed. The recording layer is considered to be melted for at least 8 mW or higher.

In FIGS. 27–32, only when Pw is 8 mW or higher, does a reflected light intensity reduction occur near where the power is switched from Pw to Pb. Here, before and after the reduction in the reflected light intensity, the reflected light intensity in either case of FIGS. 27–32 and FIGS. 33–38 remain at a substantially constant level. Particularly in the case of FIGS. 27–32 where a beam with a power Pb is radiated DC-wise, a portion in the recording layer where only the Pb power is radiated is considered to produce no change and maintain the initial crystalline state.

Figure 39:
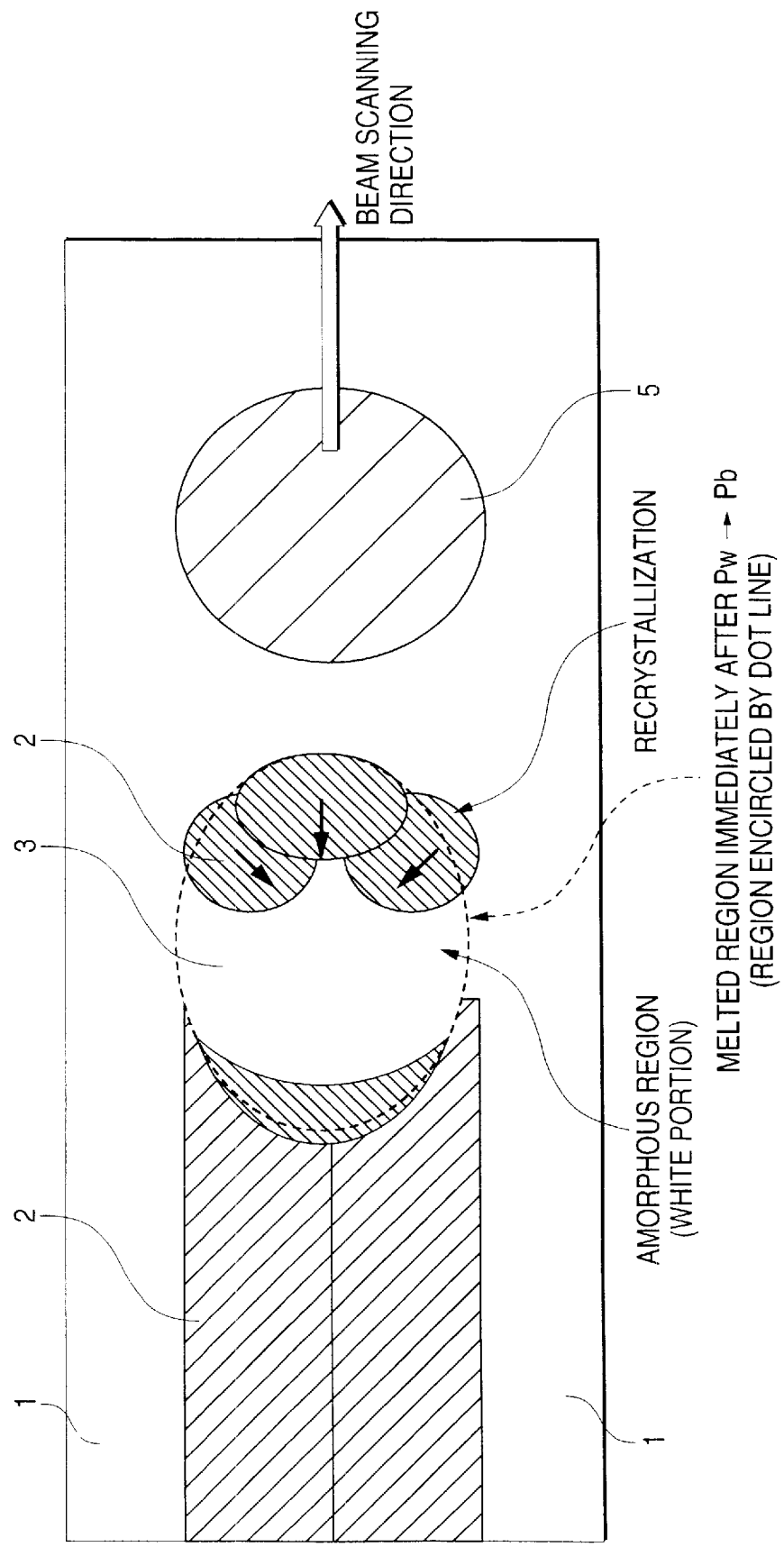
FIG. 39 is schematic diagram showing a process of recrystallization.
Figure 40:
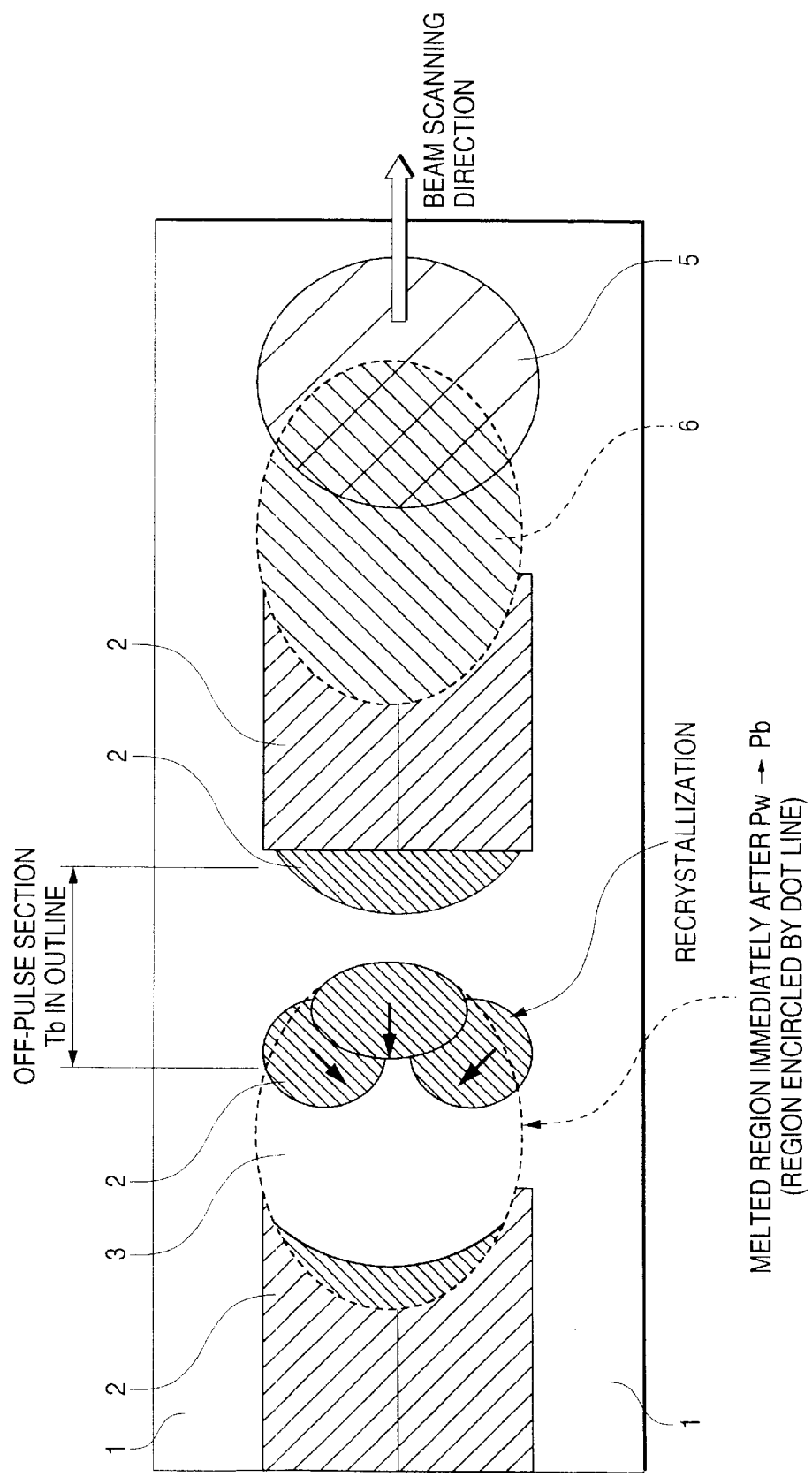
FIG. 40 is schematic diagram showing a process of recrystallization.
Figure 41:
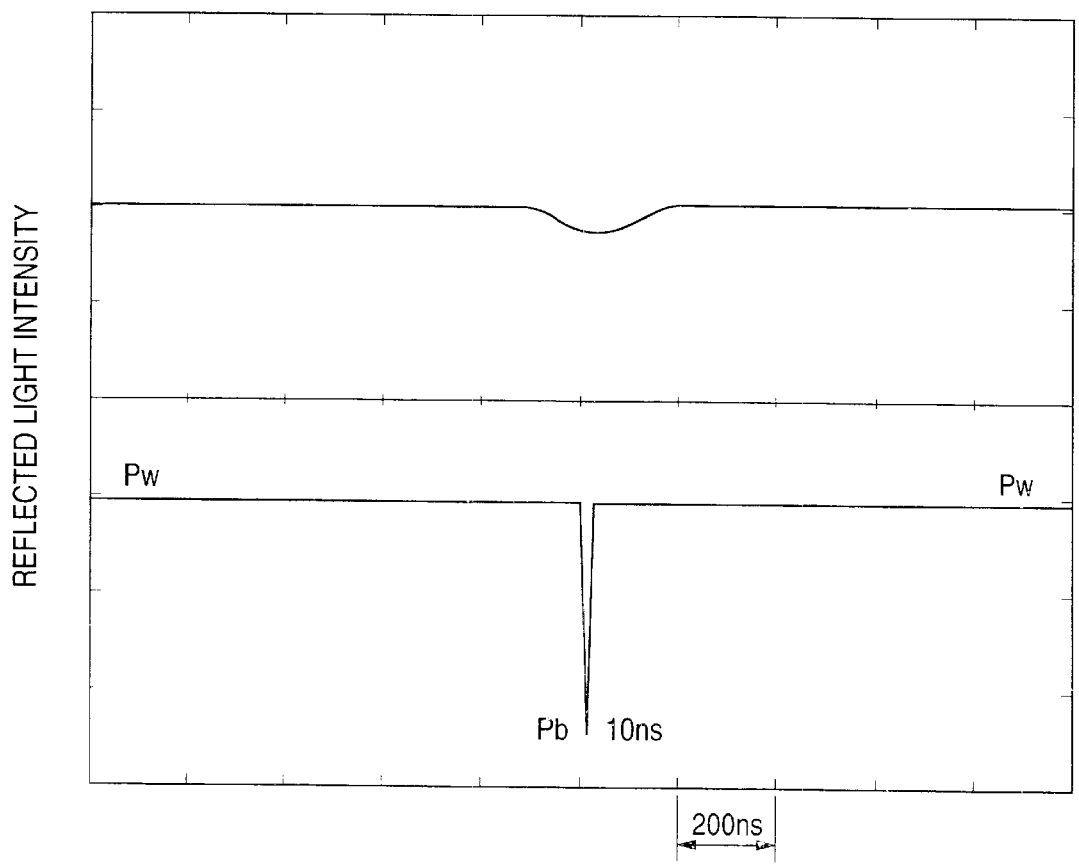
FIG. 41 is a diagram showing a radiation pattern and a reflected light intensity in a further example of Example 3.
Figure 42:
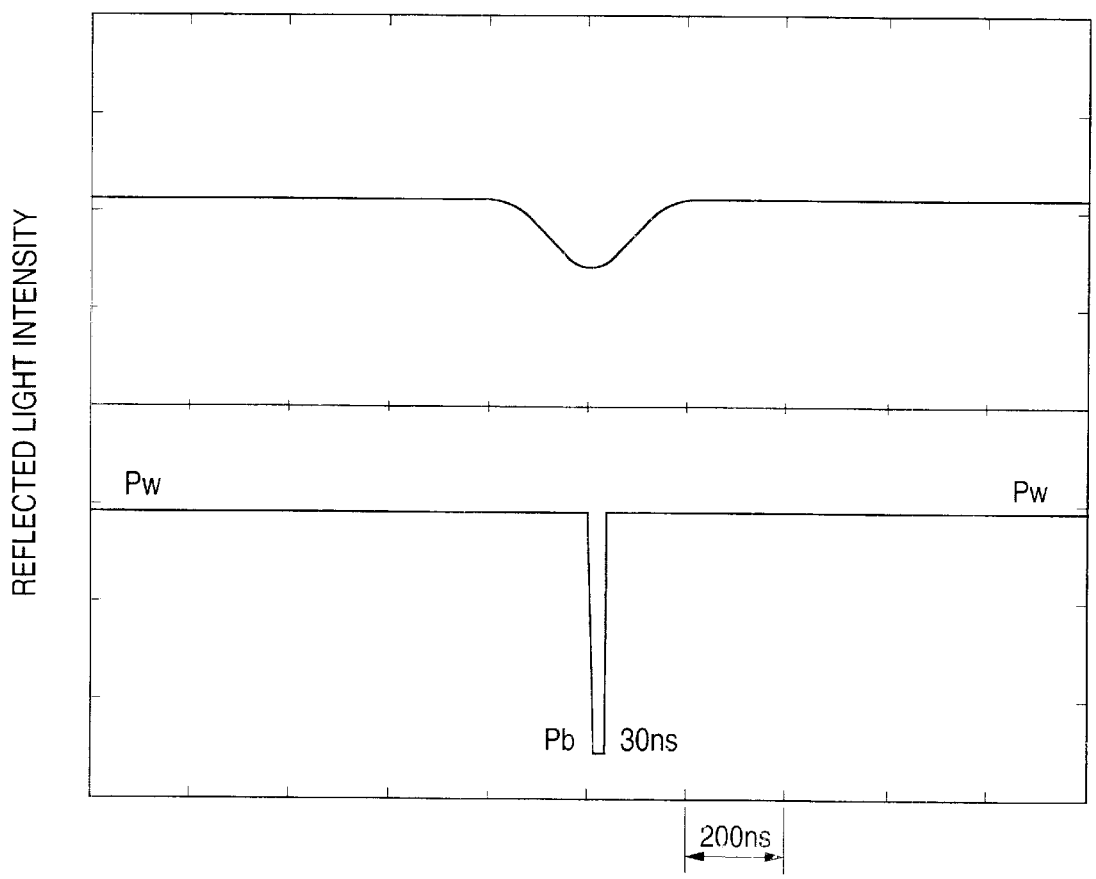
FIG. 42 is a diagram showing a radiation pattern and a reflected light intensity in a further example of Example 3.
Figure 43:
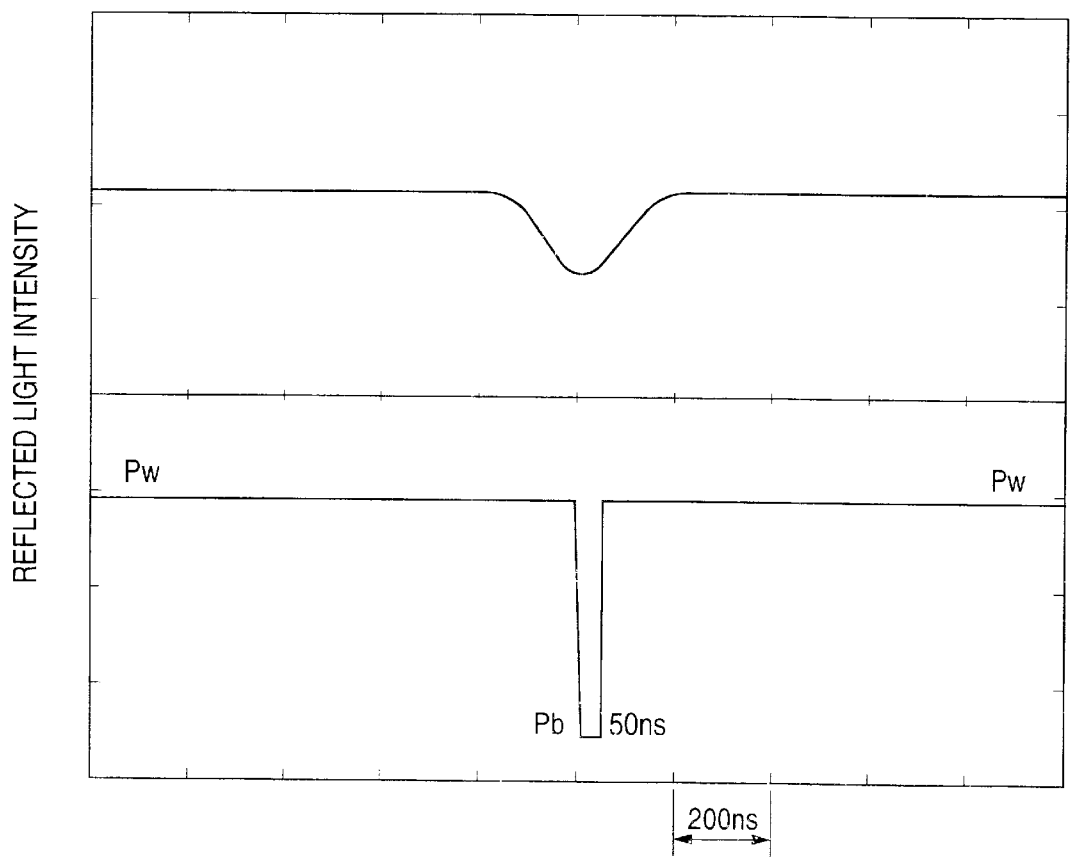
FIG. 43 is a diagram showing a radiation pattern and a reflected light intensity in a further example of Example 3.
Figure 44:
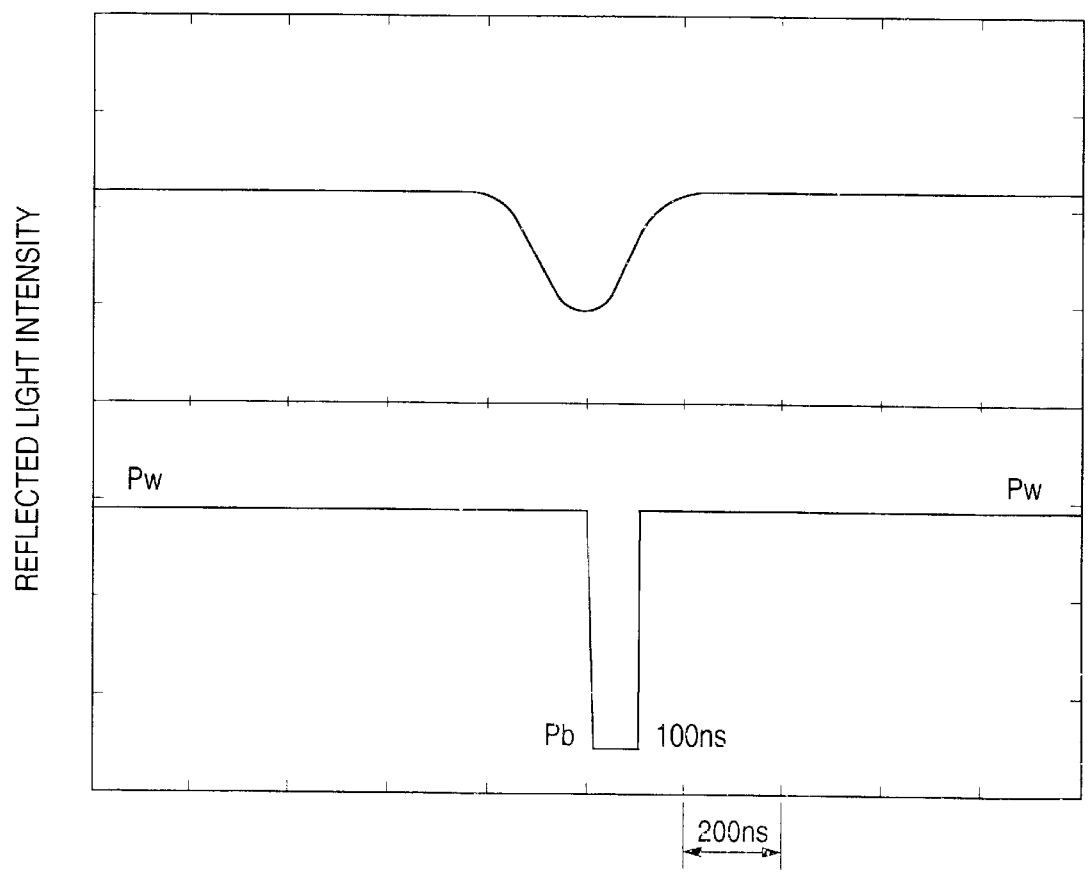
FIG. 44 is a diagram showing a radiation pattern and a reflected light intensity in a further example of Example 3.
Figure 45:
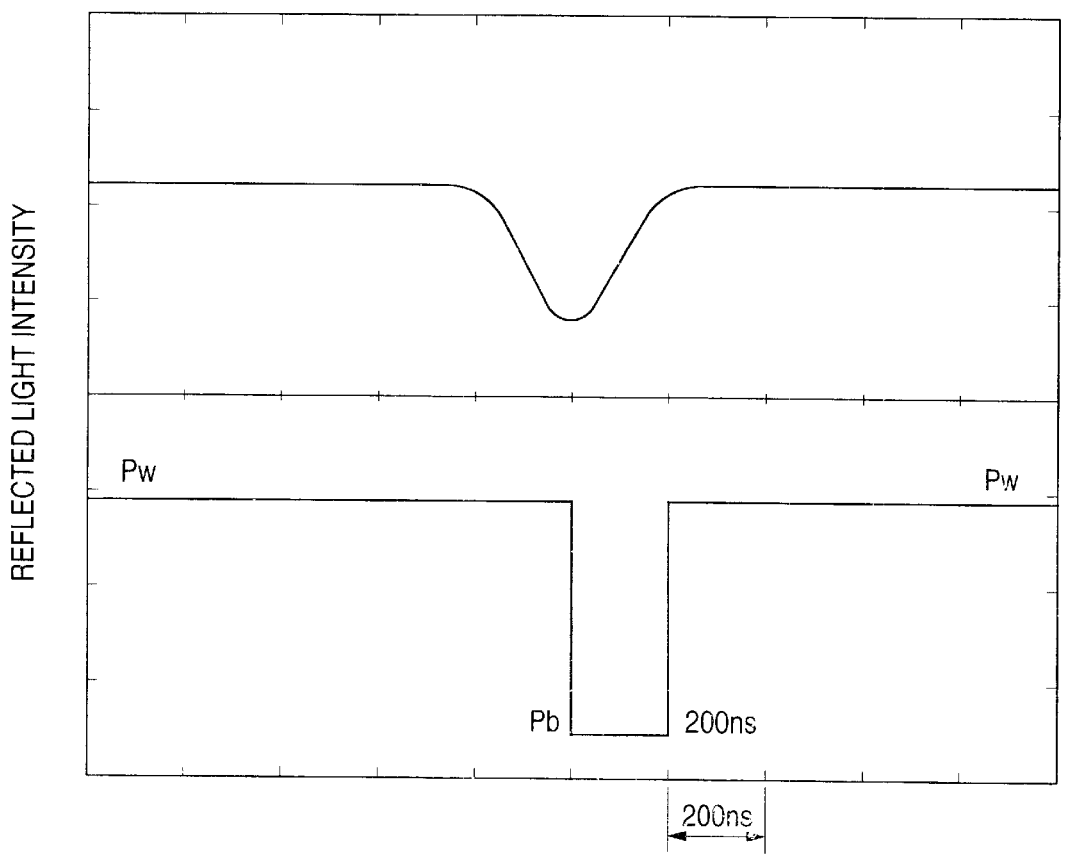
FIG. 45 is a diagram showing a radiation pattern and a reflected light intensity in a further example of Example 3.
Figure 46:
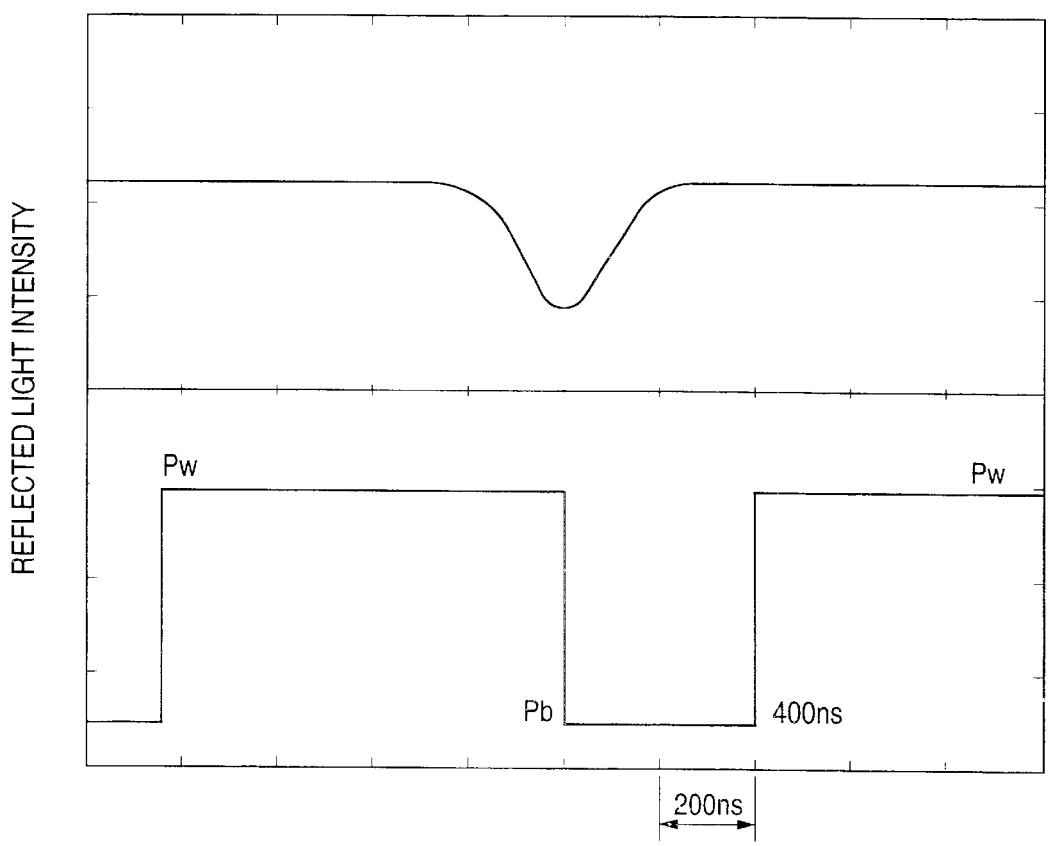
FIG. 46 is a diagram showing a radiation pattern and a reflected light intensity in a further example of Example 3.

The fact that the DC-like radiation of Pw and the DC-like radiation of Pb both produce the same reflected light intensities indicates that in the case of the DC-like radiation of Pw the melted recording layer are all recrystallized during the resolidifying and returned to the same crystalline state as the initial crystalline state to such an extent that the difference cannot be identified at least optically. The process of this recrystallization is schematically shown in FIG 39 and FIG. 40. FIG. 39 represents a case where the power is reduced from Pw to Pb and thereafter left at Pb. Even when the Pw power beam is radiated DC-wise, a region melted at a certain instant is about the size of a diameter of the radiated beam and the melted region with its shape kept constant is considered to move from left to right in the figure in the scanning direction following the beam. In a region where the Pw is radiated DC-wise, the melted region is all recrystallized into a recrystallized region 2 as a part of the initial crystallized region 1 after having been melted resolidifies. Near a point where the power is instantaneously switched from Pw to Pb, the cooling speed of the recording layer becomes temporarily large in excess of the critical cooling speed for the formation of amorphous state and thus the recording layer at that portion is turned into the amorphous state, forming an amorphous mark 3. In a region 5 where Pb power beam is radiated DC-wise, the melting itself does not occur in the recording layer and therefore the region 5 remains to be the initial crystallized region 1. In FIG. 39 although the recrystallized region and the initial crystallized region are shown distinguished in different patterns, these two crystalline states are practically not distinguishable as long as they have nearly the same reflected light intensities.

FIG. 40 on the other hand schematicaly shows a case where the power is changed from Pw to Pb for only a duration of Tb and thereafter returned to Pw. In this case, the rear end of the amorphous mark tends to be somewhat shorter than in the case of FIG. 39. This is considered due to the fact that the heating effect of the power Pw that is again radiated after Tb suppresses an increase in the cooling speed generated by the Tb. The region that follows the amorphous mark differs from that shown in FIG. 39 in that it is formed into the recrystallized region 2. That is, in FIG. 40 the current melted region 6" moves to the right in the figure as the beam scan proceeds but, as in the case of FIG. 39, is all crystallized into the recrystallized region 2 by the self recrystallization during the solidifying.

FIGS. 41–46 show radiation patterns and reflected light intensities when Tb is changed while keeping Pw and Pb constant at Pw=12 mW and Pb=0.8 mW. FIGS. 41–46 correspond respectively to Tb=10, 30, 50, 100, 200 and 400 ns in that order. When Tb is roughly 5 ns or longer, the cooling speed of the recording layer at the rear end of the melted region was at the critical cooling speed and thus an amorphous mark was formed. As the Tb increases, the area of the melted region itself increases, increasing the area of the amorphous mark (resulting in a significant reduction in the reflected light intensity). For the Tb larger than 200 ns, the amorphous mark remains constant From this it is seen that in the Tb range of about, 200 ns or less, only a part of the melted region that exits immediately before the power changes from Pw to Pb turns into an amorphous state and that the area of the amorphous state is governed by the cooling speed determined by the off-power Pb and its duration Tb. When Tb is about 230 ns or more, the area affected by the temperature change control using the off-pulse is considered limited, so that even if the cooling speed is increased, the size of the recrystallized region at the rear end of the amorphous mark remains constant.

It is clearly seen that the area of the amorphous mark is governed by a mechanism that partly limits the "self recrystallization" inherent in the recording layer itself by using the cooling speed during the off-pulse section Tb and thereby controls the recrystallization region, and that the amorphous mark that was formed and solidified is not erased separately by the subsequent recording pulse.

The observation by a transmission electron microscope has found that the region where the reflected light intensity falls in FIGS. 27–32, FIGS. 33–38 and FIGS. 41–46 is an amorphous mark 0.01–1 µm long in the scanning direction of the read/write beams. In either case, the rear end of the mark is close in shape to an arrow feather. The TEM microscopic observation also showed that the provision of one off-pulse Pb produces one amorphous mark that occupies a continuous region. This indicates that the recrystallization during the resolidifying process proceeds by the crystalline growth using the crystalline region in the peripheral area of the melted region as a nucleus. This basically differs from the multilevel recording system that controls he crystallization degree by the nucleus generation and nucleus growth within the melted region or from inside the solidified amorphous mark.

Further, a multilevel recording was performed by using a medium similar to those described above and utilizing the "self recrystallization" based on the Pw/Pb 2-value modulation. At this time, the reflected light intensity level was controlled in multiple levels by changing the Pb radiation time Tb and at the same time the intervals between the Pb power beam radiation sections were also changed to modulate the intervals between isolated peaks.

Figure 47:
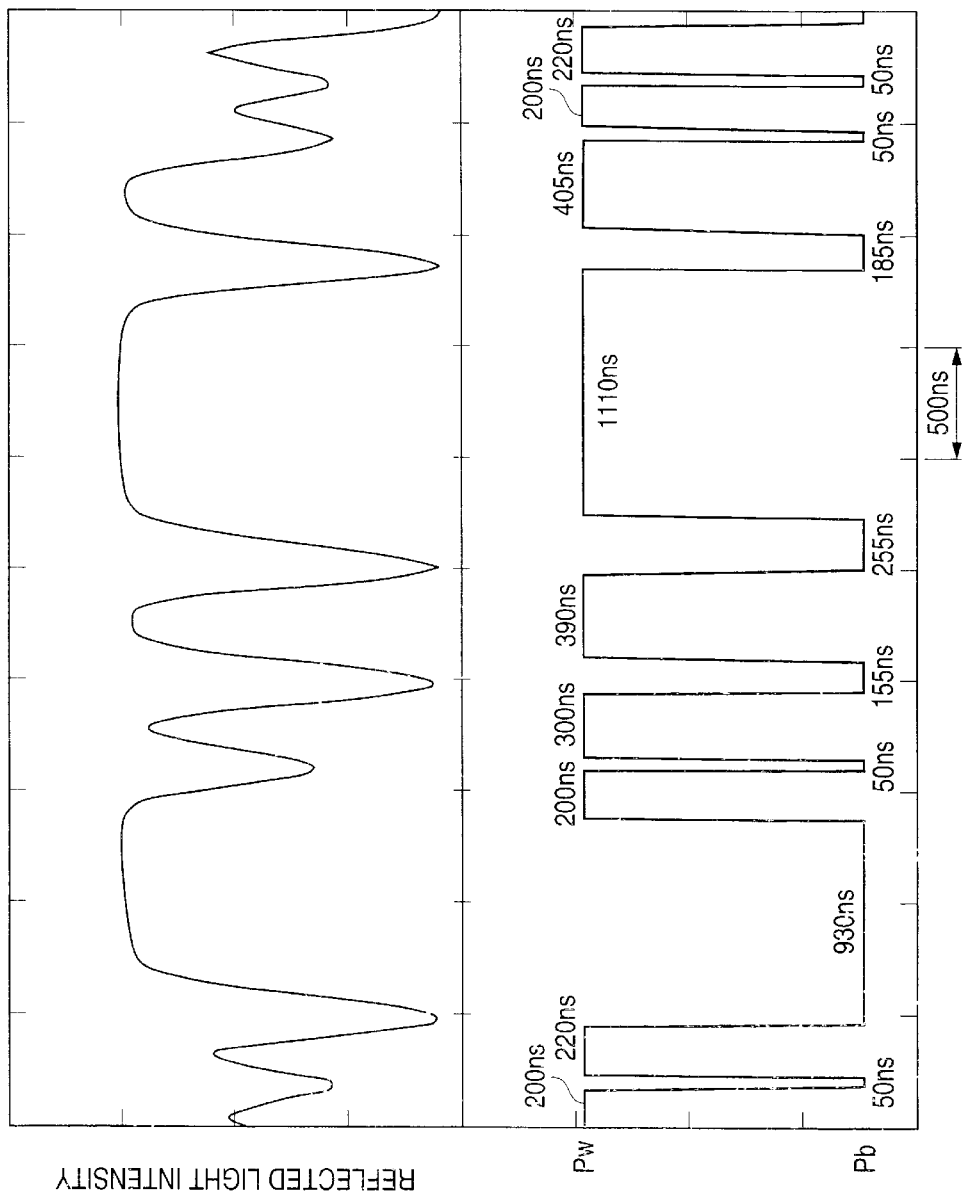
FIG. 47 is a diagram showing a radiation pattern of a recording beam and a reflected light intensity in a multilevel recording of Example 3.

The read/write beams were scanned at a speed of 4.8 m/s, and the time length and spatial length of the recording level section T were set to 1000 ns and 4.8 µm, respectively. The radiation pattern of paired Pw/Pb recording beams was provided with recording pulse sections and interrupt sections as shown in the lower half of FIG. 47, with Pw set constant at 12 mW and Pb at 0.8 mW.

A total time to as one recording pulse section including its accompanying interrupt section was set constant at $T_{r0}=125$ ns and $8T_{r0}$ forms one recording level section The reflected light intensity level was changed by changing only the ratio of the Pw radiation time to $T_{r0}$, i.e., the duty ratio. Resulting changes in the reflected light intensity are shown in the upper half of FIG. 47.

Figure 48:
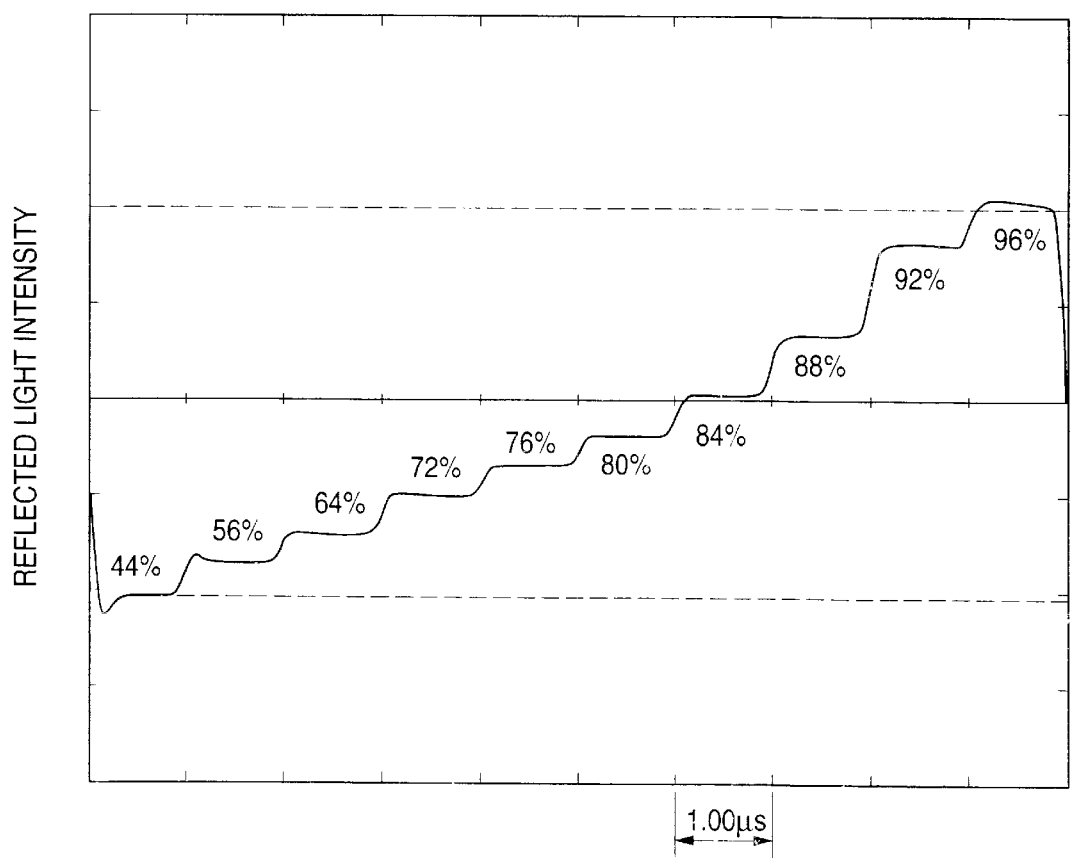
FIG. 48 is a diagram showing a reproduced waveform in an example of multilevel recording of Example 3.

FIG. 48 shows an example case in which an 8-value multilevel recording is performed by the duty ratio control described above. One recording level section includes eight isolated amorphous marks that are formed by eight sets of Pw and Pb. In one recording level section the reflected light intensity can be kept substantially constant at an average value of these eight reflected light intensities (by the averaging that utilizes the dullness of the optical spatial resolution capacity of the reproducing light beam).

Figure 49:
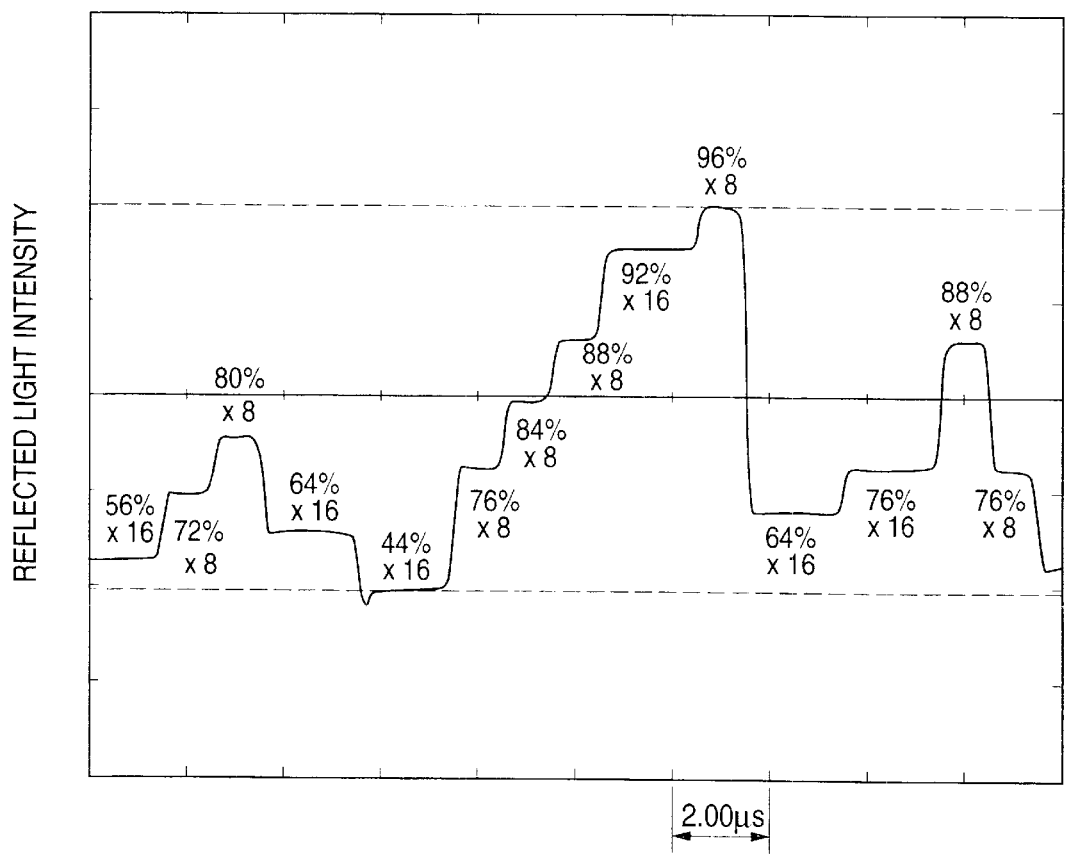
FIG. 49 is a diagram showing a reproduced waveform in another example of multilevel recording of Example 3.

The duty ratio used to form individual recording levels is shown in FIG. 48 as a ratio (%) of the Pw radiation section to the time $T_{r0}$. It is seen that simply alternating the two-step Pw/Pb recording power levels to control its duty ratio can realize an 8-value multilevel recording in an orderly manner. It is also found that the duty ratio of 95% or more can cause the reflected light intensity to return substantially completely to the initial crystalline level. It is seen that the duty ratio producing the minimum reflected light intensity is 44% and the duty ratio producing the maximum reflected light intensity is 96% and that the reflected light intensity changes in the duty ratio range of 50% or more FIG. 49 shows a reproduced waveform when the length of one recording level section is changed by changing the number of T, based on the above 8-value levels. In the figure are shown duty ratios (%) used to produce associated levels and the number of ids (represented by a multiplication figure following %). 64%×16, for example, indicates that a section $T_{r0}$ in which Pw is radiated with a duty ratio of 64% is formed successively 16 times. In this example, repetitive overwriting was executed 100 times and each reflected light intensity maintained the initial state.

EXAMPLE 4

An injection-molded polycarbonate resin substrate 0.6 mm thick, having a tracking groove with a track pitch of 0.74 µm, a groove width of 0.3 µm and a groove depth of 30 nm, was sputtered successively with a lower protective layer 68 nm thick made of $(ZnS)_{80}(SiO_2)_{20}$, a phase change recording layer 18 nm thick made of $In_3Ge_5Sb_{69}Te_{23}$, an upper protective layer 20 nm thick made of $(ZnS)_{85}(SiO_2)_{15}$ and a reflection layer 250 nm thick made of $Al_{99.5}Ta_{0.5}$. An ultraviolet curing resin was applied by the spin coat method over the reflection layer to a thickness of 4 µM to form a protective layer. Another substrate 0.6 mm thick with a similar layer structure was prepared and the two substrates were bonded together, with the recording layer surfaces disposed inside, by using a hot-melt adhesive. Then, a semiconductor laser beam focused to a spot with a major axis of about 830 nm was radiated and scanned over the both recording layers at a linear speed of 3–4 m/s to crystallize, initialize the recording layers.

For the read/write evaluation, a DDU1000 tester produced by Pulstec Industrial Co., Ltd. (wavelength of 66° C. nm, NA=0.6) was used to write into and read from the grooves at a linear speed of 3.5 m/s. The read beam power Pr was set to 0.7 mW. The read/write beams have a soot 0.97 µm long in the scanning direction and 0.94 µm wide in a direct-on perpendicular to the scanning direction.

Figure 50:
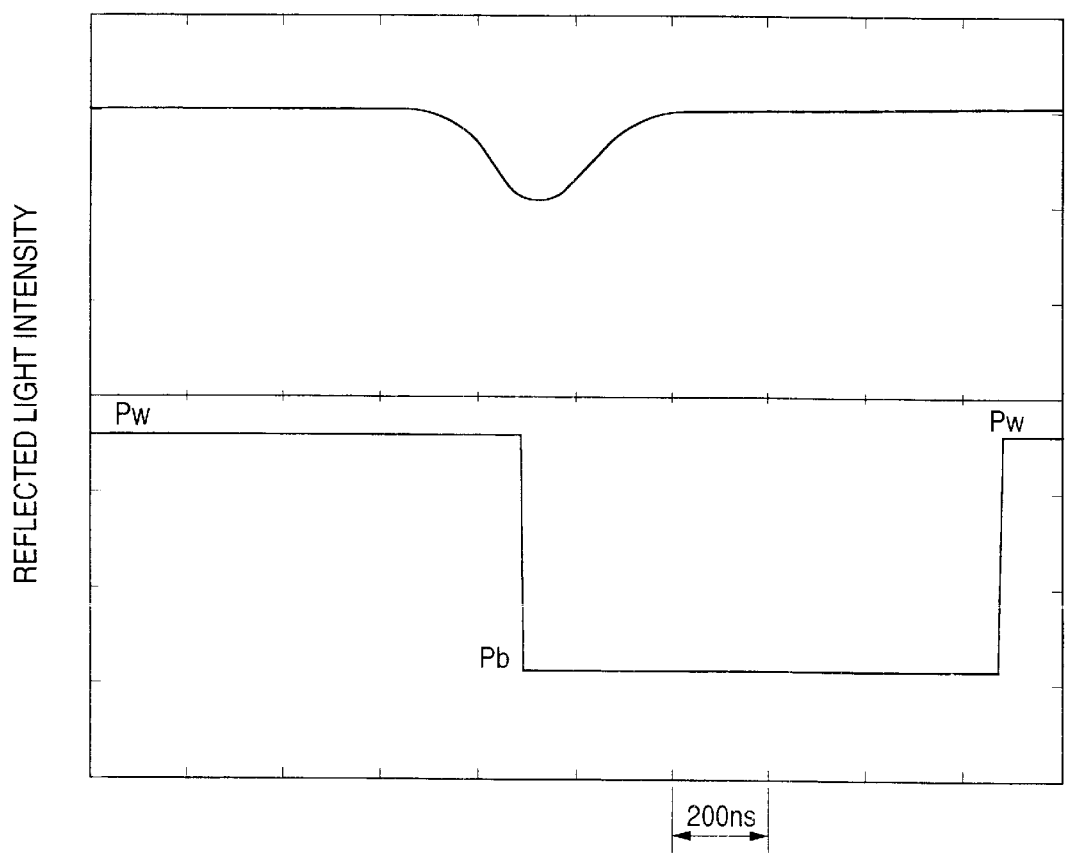
FIG. 50 is a diagram showing a radiation pattern ant a reflected light intensity in Example 4.

FIG. 50 shows a reflected light intensity (in an upper half) and a radiation pattern (in a lower half) when Pw is radiated DC-wise with the recording power Pw set to 12 mW and the bias power Pb to 0.7 mW and the power is switched to Pb at a certain instant. It is seen that only immediately after the power is changed, does the reflected light intensity fall and an amorphous mark is formed. When the Pw power continues to be radiated, the reflected light intensity is restored to the level of the initial crystalline state after melting, indicating that this medium has a high "self recrystallization" capability.

Figure 52:
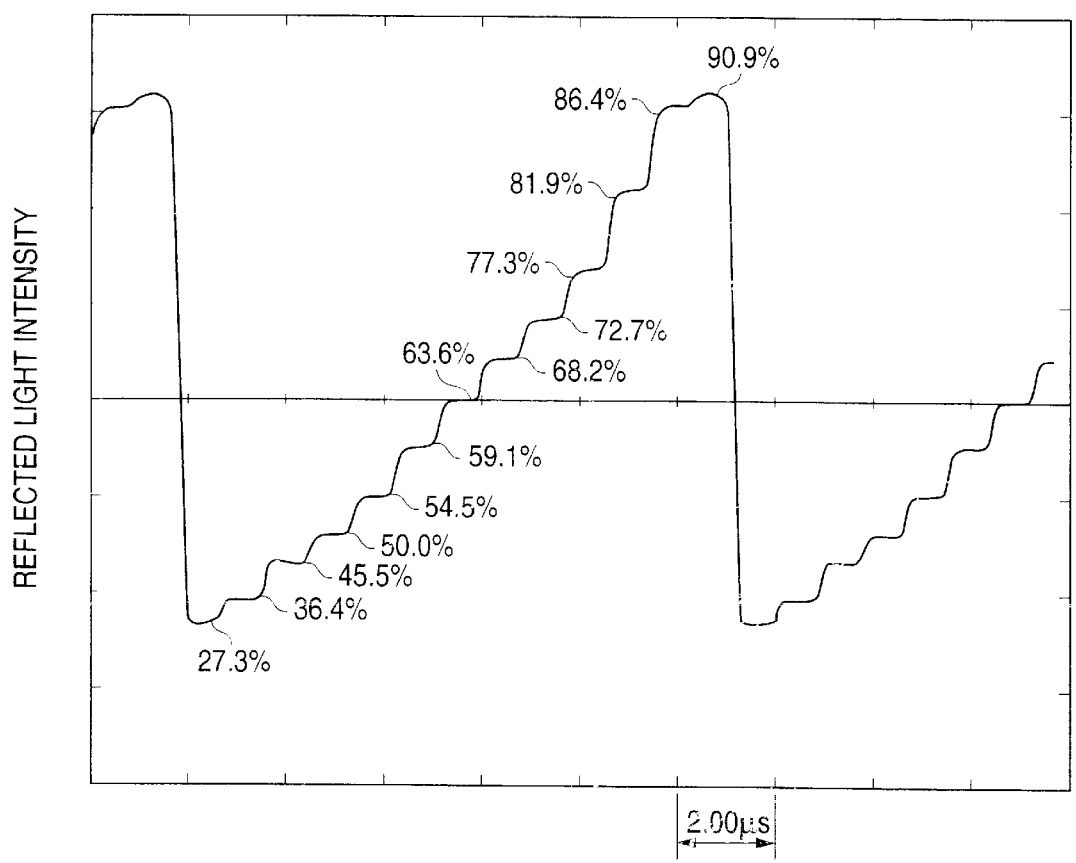
FIG. 52 is a diagram showing a reproduced waveform in another example of multilevel recording of Example 4.

This medium was recorded with the following radiation pattern. That is, the reflected light intensity was controlled by using two powers of Pw=13 mW and Pb=0.7 mW and changing the ratio between the recording pulse section during which to radiate the Pw power and a interrupt section during which to radiate the Pb power. The recording pulse section and the interrupt section are combined to form one recording level section which is $T_0=110$ ns (length: 0.385 µm). FIG. 52 shows reflectances obtained. Thirteen levels of reflected light intensity were obtained. Each level is produced by repeating the $T_0$ recording eight times and thus the recording level section can be regarded as having the length of $8T_0=880$ ns. That is, the recording level section can be regarded to be 3.08 µm long and formed by using a combination of eight pairs of recording pulse and off-pulse.

The duty ratio for each recording pulse section used to generate the corresponding level is shown in FIG. 52. More specifically, the duties to produce the individual recording levels, from the lowest recording level L1 to the highest recording level L13, are: 27.3% for L1, 36.4% for L2, 45.5% for L3, 50.0% for L4, 54.5% for L5, 59.1% for L6, 63.6% for L7, 68.2% for L8, 72.7% for L9, 77.3% for L10, 81.93 for L11, 86.4% for L12, and 90.9% for L13. In this case, the TEM microscopic observation verified that each amorphous mark is shaped like an arrow feather as shown in FIG. 39 and that the majority of the amorphous marks are isolated, surrounded by the crystalline region. In the case of larger amorphous marks, a part of their rear end is found to connect with another amorphous mark in the adjoining recording level section.

Figure 51:
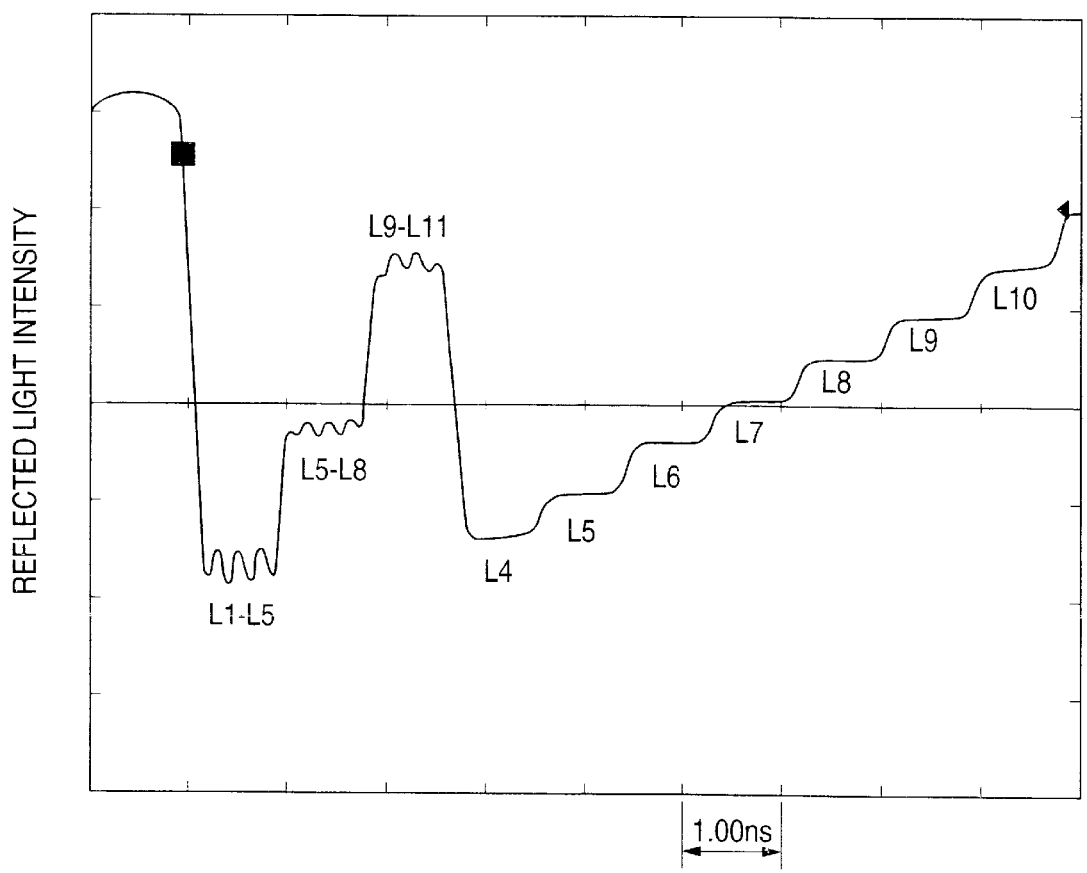
FIG. 51 is a diagram showing a reproduced waveform an example of multilevel recording of Example 4.

FIG. 51 shows changes in the reflectance when in the above example the duty ratio is changed for every $T_0=110$ ns to shift the recording level. Portions denoted, from left to right, L1–L5, L5–L8, L9–L11 each correspond to regions where the recording level is shifted between two levels L1 and L5, between L5 and L8, and between L9 and L11 alternately for every $T_0$. In the right half of the figure, the portions denoted L4, L5, L6, . . . , L10 are those where the recording level is shifted every $8T_0$, starting with L4 and shifting up to L10. The recording levels formed for every $8T_0$ are reproduced as average levels as a result of optical interference with the preceding and subsequent levels. When the recording level is changed every 110 ns, on the other hand, it is found that individual levels are changed but their reflected light intensities do not necessarily agree with those in the case where the recording level is changed every $8T_0$. As described above, the reproduced light waveform from the recording level section smaller than the diameter of the reproducing bear is dull. Hence, it is possible to prepare an electronic circuit considering an inverse function of the optical modulation transfer function or a software-based filter, as described in the above U.S. Pat. No. 5,818,806, and to pass raw waveforms through this filter for reproduction in order to have them allocated to appropriate reflected light intensities L1–L13 and restore the original signals.

In this example, the modulation (in this case (Rc-Ra)/Rc× 10) was 50% or more.

INDUSTRIAL APPLICABILITY

According to the present invention described above, there is provided a multilevel recording/reproducing method and a phase change multilevel recording medium based on a novel principle that utilizes the phase change medium in the multilevel recording system. This multilevel recording/reproducing method stabilizes the amorphous mark and can increase an optical characteristic difference among multiple recording levels and clarify the boundary of the amorphous mark, which in run allows the amorphous mark to be formed in smaller sizes.

What is claimed is:

1. A multilevel recording method comprising the steps of:
   radiating a recording energy beam against an information recording medium having a recording layer to locally melt the recording layer, the recording layer being adapted to produce a phase change between a crystalline state and an amorphous state upon being radiated with an energy beam; and
   forming an amorphous mark by cooling during a solidifying process to record information in the medium;
   wherein the size of the amorphous mark in a single recording layer is controlled mainly by a balance of competition between the crystalline growth speed in the peripheral crystalline region and the cooling speed of the melted region during the solidifying process in three or more multiple recording levels.

2. A method according to claim 1, wherein a recording energy beam is radiated onto a region formed with the amorphous mark to melt the recording layer and thereby erase the amorphous mark and, during he solidifying process, an amorphous region and a recrystallized region are newly formed to overwrite the amorphous mark.

3. A method according to claim 1, wherein the recording energy beam and the reproducing energy beam have spot diameters on a recording layer surface of 2 μm or less.

4. A method according to claim 3, wherein the recording and reproducing light beams have elliptical spots on the recording layer surface with their major axes oriented in a direction substantially perpendicular to the direction of beam scan.

5. A method according to claim 1, wherein when the recording energy beam is scanned relative to the recording medium to form melted regions to form amorphous marks along the scanning direction, the size of the amorphous mark is controlled by changing a width, with respect to the scanning direction, of the amorphous mark and the width of the amorphous mark is made smaller than the width, with respect to the scanning direction, of the reproducing energy beam at any of the multiple recording levels.

6. A method according to claim 1, wherein when the recording energy beam is scanned relative to the recording medium to form melted regions to form amorphous marks along the scanning direction, the size of the amorphous mark is controlled by changing a length, with respect to the scanning direction, of the amorphous mark and the length of the amorphous mark is made smaller than the length, with respect to the scanning direction, of the reproducing energy beam at any of the multiple recording levels.

7. A method according to claim 1, wherein when a transition is made from one recording level section to another, the transition passes through a recording level section that corresponds to a crystalline state.

8. A method according to claim 7, wherein the amorphous marks are isolated, surrounded by a crystalline region and intervals between reflected light intensity peaks corresponding to the isolated amorphous marks are made constant at a reference length T.

9. A method according to claim 8, wherein the interval between isolated reflected light intensity peaks is an integer times the reference length T, and a multilevel recording is performed by using two variables consisting of a peak-to-peak Interval LT (L is n kinds of integers) and an m-step recording level.

10. A method according to claim 7, wherein the recording level section has a trapezoidal waveform within kinds of lengths, and at least the length of the trapezoidal section or an interval between the trapezoidal sections is modulated.

11. A method according to claim 1, wherein when a transition is made from one recording level section to another, the transition is made continuously without passing through a reference recording level.

12. A method according to claim 1, wherein a part or all of a recording energy beam radiation time in one recording level section is divided into one or more recording pulse sections and one or more interrupt sections, the power of the recording energy beam in the recording level section is set to a power Pw strong enough to melt the recording layer during the recording pulse section and to a power Pb, including 0, smaller than Pw during the interrupt section, and the size of the amorphous mark is controlled by changing a radiation pattern of the recording energy beam in the radiation time.

13. A method according to claim 12, wherein the power Pb of the recording energy beam radiated during the interrupt section meets a condition of $0 \leq Pb \leq 0.2$ Pw.

14. A method according to claim 12, wherein the radiation pattern of the recording energy beam in the radiation time is changed by changing the magnitudes of powers Pb and Pw.

15. A method according to claim 12, wherein the radiation pattern of the recording energy beam in the radiation time is changed by changing the lengths of the recording pulse section and/or the interrupt section.

16. A method according to claim 1, wherein a diameter $r_b$ of the reproducing light beam is set to be at least equal to a spatial length Ts of the recording section.

17. A method according to claim 16, wherein a part or all of a recording energy beam radiation time for forming one recording levels section is divided into one recording pulse section and one interrupt section accompanying the recording pulse section before or after it, the power of the recording energy beam in the recording level section is set to a cower Pw strong enough to melt the recording layer during the recording pulse section and to a power Pb, including 0, smaller than Pw during the interrupt section, and the size of the amorphous mark is controlled by changing Pw, Pb, the recording pulse section length and/or the interrupt section length.

18. A method according to claim 17, wherein a length of the recording level section is constant at a reference length T and the size of the amorphous mark is controlled by changing a duty ratio of the recording pulse section to the recording level section.

19. A method according to claim 1, wherein the number of recording levels is at least four.

20. A method according to claim 1, wherein a reflected light intensity range including a strongest reflected light intensity Rc and a weakest reflected light intensity Ra is divided into m sub-ranges (m>1), the in sub-ranges are set so that a sub-range having a maximum reflected light intensity includes the strongest reflected light intensity Rc and a sub-range having a minimum reflected light intensity includes the weakest reflected light intensity Ra, and which level a reflected light intensity obtained corresponds to is determined by checking which of the M sub-ranges the reflected light intensity belongs to.

21. A method according to claim 20, wherein the m sub-ranges nave equal magnitudes to each other in the reflected light intensity.

22. A method according to claim 20, wherein the magnitude of each of the m sub-ranges increases as the sub-range comes closer to Rc.

23. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region.

24. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region, and wherein the recording layer has an alloy composition containing Sb.

25. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region, wherein the recording layer has an alloy composition containing Sb, and having an SbTe alloy composition containing Sb in excess of an eutectic point.

26. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region, wherein the recording layer has an alloy composition containing Sb, and wherein the recording layer includes the following composition

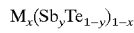
$M_x(Sb_yTe_{1-y})_{1-x}$ where $0<x\leq0.2$, $0.6\leq y$, and M is at least one element selected from the group consisting of In, Ga, Zn, Ge, Sn, Si, Cu, Au, Ag, Pd, Pt, Pb, Bi, Cr, Co, O, S, N, Se, Ta, Nb, V, Zr, Hf and rare earth metals.

27. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region, wherein the recording layer has an alloy composition containing Sb, and wherein the recording layer includes the following composition

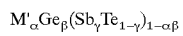
$M'_\alpha Ge_\beta(Sb_yTe_{1-y})_{1-\alpha-\beta}$ where M' is In and/or Ga, $0.001\leq\alpha\leq0.1$, $0.001\leq\beta\leq0.15$, and $0.65\leq\gamma\leq0.85$.

28. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region, and wherein protective layers are provided over and under the recording layer, and a reflection layer is provided over that surface of one of the protective layers which is on the opposite side of the recording layer.

29. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region, and wherein protective layers are provided over and under the recording layer, and a reflection layer is provided over that surface of one of the protective layers which is on the opposite side of the recording layer, and wherein the recording layer has a thickness of 1 nm to 30 nm, the dielectric protective layer provided between the recording layer and the reflection layer has a thickness of 60 nm or less, and the reflection layer is an alloy comprising Al, Ag or Au mainly.

30. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region, and wherein protective layers are provided over and under the recording layer, and a reflection layer is provided over that surface of one of the protective layers which is on the opposite side of the recording layer, and wherein the reflection layer has a sheet resistivity of 0.1–0.6 Ω/□.

31. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region, and wherein the reflected light intensity exhibits a substantially linear change responsive to a change in the duty ratio used.

32. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region, and wherein when the duty ratio is 95% or more, the amorphous mark is not formed.

33. A method according to claim 1 using a prescribed medium having a recording layer, wherein the recording layer changes its phase between a crystalline state and an amorphous state upon being radiated with an energy beam, and a recrystallization from a melted state in the recording layer proceeds substantially by a crystalline growth from a crystalline region, wherein the reflected light intensity exhibits a substantially linear change responsive to a change in the duty ratio used, and wherein when the duty ratio at which the minimum reflected light intensity Ra is obtained is Da (%) and the duty ratio at which the maximum reflected light intensity Rc is obtained is Dc (%), then Dc−Da≧50%.

34. A multilevel recording and reproducing method, wherein when a reproducing light beam is radiated to the amorphous mark recorded according to the multilevel recording method according to claim 1, an intensity of reflected light from a reproducing light beam radiated region is controlled in three or more multiple recording levels according to an optical characteristic difference between a crystalline region and an amorphous region and their areas.

35. The method according to claim 1, wherein the information recording medium is a medium in which the recrystallization process from the melted state in the recording layer proceeds substantially from a crystalline region by crystalline growth.

36. The method according to claim 1, wherein the information recording medium is a medium in which a condition for the multilevel recording, i) when recording power Pw strong enough to melt the recording layer is radiated continuously, the melted region substantially perfectly recrystallizes, and ii) only when off-power Pb, which heats the recording layer to a temperature below the recrystallization temperature in a solid phase, is radiated following the recording power Pw, the melted region turns into an amorphous state.

* * * * *